United States Patent
Wang et al.

(10) Patent No.: US 12,010,635 B2
(45) Date of Patent: Jun. 11, 2024

(54) COMMUNICATION METHOD AND APPARATUS, AND DEVICE

(71) Applicant: HUAWEI TECHNOLOGIES CO., LTD., Guangdong (CN)

(72) Inventors: Ting Wang, Shanghai (CN); Hao Tang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 357 days.

(21) Appl. No.: 17/591,749

(22) Filed: Feb. 3, 2022

(65) Prior Publication Data

US 2022/0159588 A1 May 19, 2022

Related U.S. Application Data

(63) Continuation of application No. PCT/CN2019/100867, filed on Aug. 15, 2019.

(51) Int. Cl.
*H04W 72/04* (2023.01)
*H04W 52/14* (2009.01)
*H04W 52/36* (2009.01)
*H04W 92/18* (2009.01)

(52) U.S. Cl.
CPC ........ *H04W 52/367* (2013.01); *H04W 52/14* (2013.01); *H04W 92/18* (2013.01)

(58) Field of Classification Search
None
See application file for complete search history.

(56) References Cited

U.S. PATENT DOCUMENTS

2019/0132802 A1* 5/2019 Kusashima ......... H04W 72/044

FOREIGN PATENT DOCUMENTS

| CN | 104936126 A | 9/2015 |
|---|---|---|
| CN | 106375930 A | 2/2017 |
| CN | 108174438 A | 6/2018 |
| CN | 109803363 A | 5/2019 |
| WO | 2018199707 A1 | 11/2018 |

OTHER PUBLICATIONS

Extended European Search Report issued in European Application No. 19941550.6 on Jun. 13, 2022, 8 pages.

(Continued)

*Primary Examiner* — Gary Lafontant
(74) *Attorney, Agent, or Firm* — Fish & Richardson P.C.

(57) ABSTRACT

The disclosure describes example methods. One example method includes obtaining sidelink transmit power and uplink transmit power, where the sidelink transmit power is transmit power of a sidelink in a first time unit, and the uplink transmit power is transmit power of an uplink in the first time unit. An actual transmit power of the sidelink in the first time unit based on the sidelink transmit power, the uplink transmit power, and maximum transmit power. The first time unit includes N first time subunits, M second time subunits in the N first time subunits overlap uplink resources, M is less than or equal to N. The N first time subunits are time subunits used for sidelink transmission in the first time unit, and the actual transmit power of the sidelink is constant in the N first time subunits.

20 Claims, 30 Drawing Sheets

(56) References Cited

OTHER PUBLICATIONS

Huawei, HiSilicon, "Correction on sidelink power control for simultaneous UL and SL transmissions," 3GPP TSG-RAN1 Meeting #90, R1-1713822, Prague, Czech Republic, Aug. 21-25, 2017, 3 pages.

Huawei, HiSilicon, "Discussion on other requirements for V2X," 3GPP TSG-RAN WG4 Meeting #83, R4-1705550, Hangzhou, China, May 15-19, 2017, 4 pages.

Huawei, HiSilicon, "Power control and power sharing for V2X sidelink," 3GPP TSG RAN WG1 Meeting #97, R1-1906598, Reno, USA, May 13-17, 2019, 6 pages.

LG Electronics, "Discussion on D2D transmission power," 3GPP TSG RAN WG1 Meeting #80, R1-150492, Athens, Greece, Feb. 9-13, 2105, 5 pages.

3GPP TS 36.213,V15.6.0, "3rd Generation Partnership Project; Technical Specification Group Radio Access Network; Evolved Universal Terrestrial Radio Access (E-UTRA); Physical layer procedures (Release 15)," 3GPP Standard, Technical Specification, Jun. 2019, pp. 8-58.

3GPP TS 36.213,V15.6.0, "3rd Generation Partnership Project; Technical Specification Group Radio Access Network; Evolved Universal Terrestrial Radio Access (E-UTRA); Physical layer procedures (Release 15)," 3GPP Standard, Technical Specification, Jun. 2019, pp. 477-533.

EP Communication Pursuant to Article 94(3) EPC in European Appln No. 19941550.6, dated May 26, 2023, 6 pages.

Huawei, HiSilicon, "Sidelink physical layer procedures for NR V2X," 3GPP TSG RAN WG1 Meeting #97, R1-1906008, Reno, USA, May 13-17, 2019, 23 pages.

NEC, "Physical layer structure for NR V2X," 3GPP TSG RAN WG1 Meeting #95, R1-1812648, Spokane, USA, Nov. 12-16, 2018, 6 pages.

PCT International Search Report and Written Opinion issued in International Application No. PCT/CN2019/100867 on May 9, 2020, 12 pages (partial English translation).

\* cited by examiner

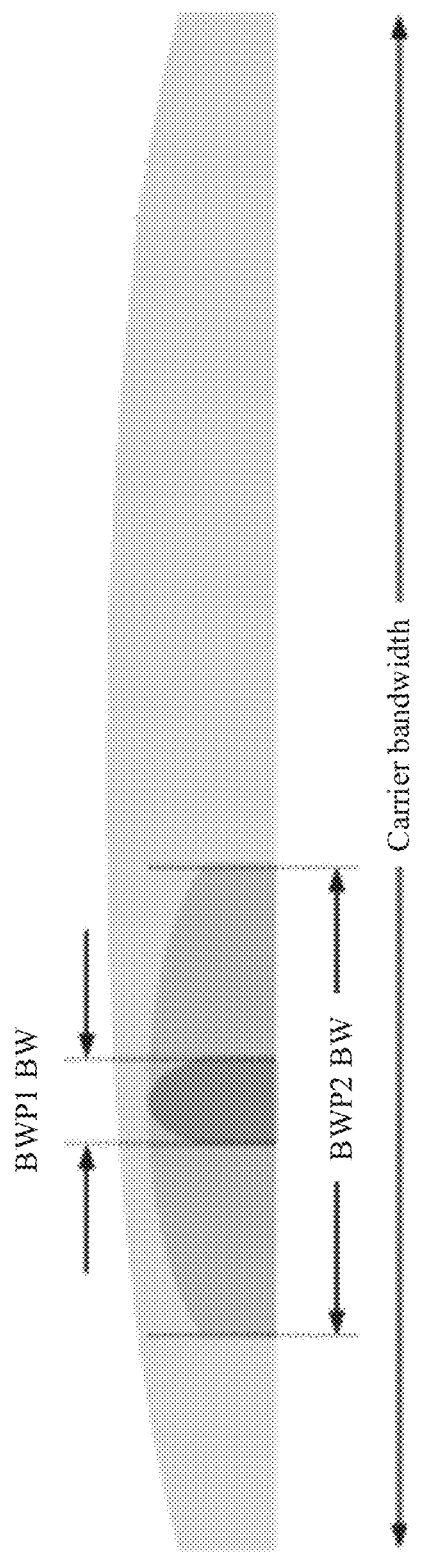

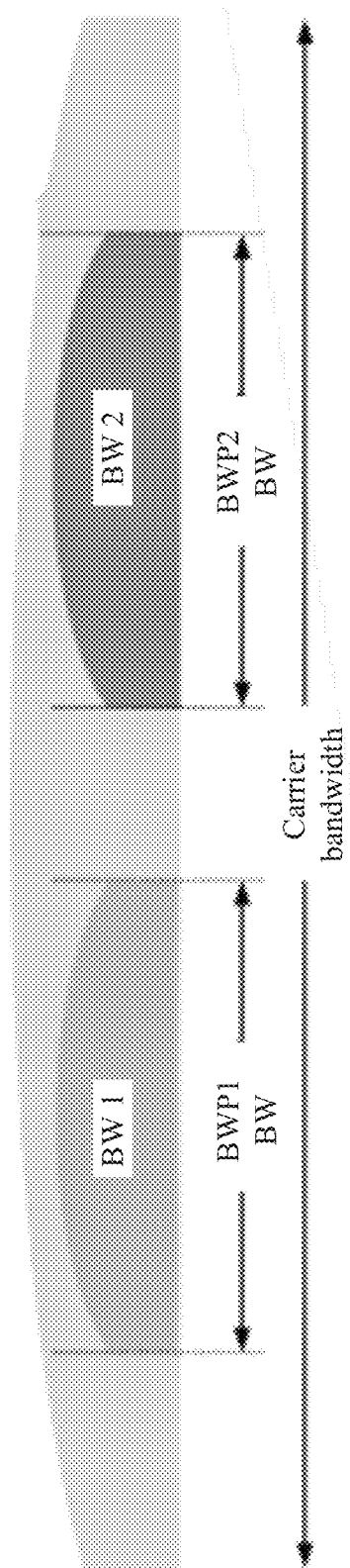

COMMUNICATION METHOD AND APPARATUS, AND DEVICE

CROSS-REFERENCE TO RELATED APPLICATIONS

This application is a continuation of International Application No. PCT/CN2019/100867, filed on Aug. 15, 2019, the disclosure of which is hereby incorporated by reference in its entirety.

TECHNICAL FIELD

This application relates to the field of communication technologies, and in particular, to a communication method and apparatus, and a device.

BACKGROUND

Sidelink communication means communication between terminal devices. A channel in the sidelink communication includes a physical sidelink shared channel (PSSCH) and a physical sidelink control channel (PSCCH). The PSSCH is used to carry a data signal, and the PSCCH is used to carry a control signal.

In an actual application process, before transmitting a sidelink signal (including a data signal and a control signal), a terminal device usually calculates first transmit power of a PSCCH and second transmit power of a PSSCH separately, transmits the control signal based on the first transmit power, and transmits the data signal based on the second transmit power. In a new radio (NR) system, a PSSCH and a PSCCH may occupy resources on different symbols in one slot. In this case, a terminal device may transmit a sidelink signal on different symbols in one slot with different power. Consequently, signal receiving performance of a receive end is relatively poor.

SUMMARY

Embodiments of this application provide a communication method and apparatus, and a device, to improve signal receiving performance of a receive end.

According to a first aspect, an embodiment of this application provides a communication method. The method includes: obtaining sidelink transmit power and uplink transmit power, and determining actual transmit power of a sidelink in a first time unit based on the sidelink transmit power, the uplink transmit power, and maximum transmit power. The sidelink transmit power is transmit power of the sidelink in the first time unit, and the uplink transmit power is transmit power of an uplink in the first time unit. The first time unit includes N first time subunits, M second time subunits in the N first time subunits overlap uplink resources, N is an integer greater than 1, M is a positive integer less than or equal to N, the N first time subunits are time subunits used for sidelink transmission in the first time unit, and the actual transmit power of the sidelink is constant in the N first time subunits.

The communication method may be performed by a terminal device (for example, a first terminal device shown in embodiments), or may be an apparatus (for example, a processor or a chip) disposed in a terminal device.

In this application, a time unit may be a slot, and a time subunit may be a symbol. Alternatively, a time unit may be a subframe, and a time subunit may be a slot or a symbol.

In the foregoing process, before the sidelink signal is transmitted on the N first symbols in the first slot, if the M second symbols in the N first symbols overlap the uplink resources, the transmit power of the sidelink in the first slot and the uplink transmit power of the uplink in the first slot are first obtained, and then the actual transmit power of the sidelink in the first slot is determined based on the sidelink transmit power, the uplink transmit power, and the maximum transmit power, so that the actual transmit power of the sidelink is constant on the N first symbols. Therefore, power switching does not need to be performed in the first slot, thereby reducing processing complexity for a terminal device; and/or a symbol required for power switching does not need to be reserved in the first slot, thereby reducing a resource waste and improving signal transmission performance. Because the actual transmit power of the sidelink is constant on the N first symbols, a change of a signal phase caused by power switching is avoided, so that a second terminal device can accurately perform channel estimation based on a received pilot, and therefore can accurately receive the sidelink signal sent by the first terminal device on the N first symbols. This improves signal receiving performance of the second terminal device.

In a possible implementation, the sidelink transmit power includes first transmit power and second transmit power, the first transmit power is transmit power of a first channel of the sidelink, and the second transmit power is transmit power of a second channel of the sidelink.

The first channel may be a PSCCH, and the second channel may be a PSSCH.

In a possible implementation, the actual transmit power of the sidelink in the first time unit may be determined based on the sidelink transmit power, the uplink transmit power, and the maximum transmit power in the following implementation: determining third transmit power of the sidelink in the first time unit based on the first transmit power and the second transmit power; and determining the actual transmit power based on the third transmit power, the uplink transmit power, and the maximum transmit power. The third transmit power of the sidelink is constant in the N first time subunits.

In the foregoing process, the third transmit power is first determined based on the first transmit power and the second transmit power, so that the third transmit power is constant on the N first symbols; and then the actual transmit power of the sidelink is determined based on the third transmit power and the maximum transmit power, so that a sum of the actual transmit power of the sidelink and actual transmit power of the uplink is less than or equal to the maximum transmit power. In this way, on a basis of ensuring that the sum of the actual transmit power of the sidelink and the actual transmit power of the uplink is less than or equal to the maximum transmit power, the actual transmit power of the sidelink may be constant on the N first symbols. Therefore, power switching does not need to be performed in the first slot, thereby reducing complexity for a terminal device; and/or a symbol required for power switching does not need to be reserved in the first slot, thereby reducing a resource waste and improving signal transmission performance. Because the actual transmit power of the sidelink is constant on the N first symbols, a change of a signal phase caused by power jumping is avoided, so that the second terminal device can accurately perform channel estimation based on a received pilot, and therefore can accurately receive the sidelink signal sent by the first terminal device on the N first symbols. This improves signal receiving performance of the second terminal device.

In a possible implementation, the first channel and the second channel occupy different time subunits in the N first time subunits.

The third transmit power meets one of the following:

the third transmit power is the first transmit power or the second transmit power;

the third transmit power is a largest value in the first transmit power and the second transmit power;

the third transmit power is a smallest value in the first transmit power and the second transmit power; or there is a first correspondence between the third transmit power and the first transmit power and second transmit power.

In the foregoing process, when the first channel and the second channel occupy different symbols in the N first symbols, by using the foregoing method, the determined third transmit power of the sidelink may be constant on the N first symbols, and the third transmit power is less than or equal to the maximum transmit power. In addition, the foregoing manner of determining the third transmit power is simple and convenient, so that efficiency of determining the third transmit power is relatively high.

In a possible implementation, the first channel and the second channel occupy different frequency domain resources.

The third transmit power is a sum of the first transmit power and the second transmit power.

In the foregoing process, through resource multiplexing, by using the foregoing method, the determined third transmit power of the sidelink may be constant on the N first symbols, and the third transmit power is less than or equal to the maximum transmit power. In addition, the foregoing manner of determining the third transmit power is simple and convenient, so that efficiency of determining the third transmit power is relatively high.

In a possible implementation, the N first time subunits include N1 third time subunits and N2 fourth time subunits, where a sum of N1 and N2 is N, N1 is a positive integer less than N, and N2 is a positive integer less than N.

The first channel occupies the N1 third time subunits, and the second channel occupies the N first time subunits.

Frequency domain resources of the first channel overlap some frequency domain resources of the second channel.

The second transmit power includes fourth transmit power and fifth transmit power, the fourth transmit power is transmit power of the second channel in the N1 third time subunits, and the fifth transmit power is transmit power of the second channel in the N2 fourth time subunits.

The third transmit power meets one of the following:

the third transmit power is the fifth transmit power or sixth transmit power, and the sixth transmit power is a sum of the first transmit power and the fourth transmit power;

the third transmit power is a largest value in the fifth transmit power and the sixth transmit power;

the third transmit power is a smallest value in the fifth transmit power and the sixth transmit power; or there is a second correspondence between the third transmit power and the first transmit power, fourth transmit power, and fifth transmit power.

In the foregoing process, through resource multiplexing, by using the foregoing method, the determined third transmit power of the sidelink may be constant on the N first symbols, and the third transmit power is less than or equal to the maximum transmit power. In addition, the foregoing manner of determining the third transmit power is simple and convenient, so that efficiency of determining the third transmit power is relatively high.

In a possible implementation, the actual transmit power of the sidelink may be determined based on the third transmit power, the uplink transmit power, and the maximum transmit power in the following manner:

When a sum of the third transmit power and the uplink transmit power is less than or equal to the maximum transmit power, it is determined that the actual transmit power of the sidelink is the third transmit power, and the actual transmit power of the uplink is the uplink transmit power.

Alternatively, when a sum of the third transmit power and the uplink transmit power is greater than the maximum transmit power, the actual transmit power of the sidelink may be determined in one of the following possible implementations.

In a possible implementation, the actual transmit power of the sidelink is determined based on a priority of a sidelink signal, a priority of an uplink signal, the third transmit power, the uplink transmit power, and the maximum transmit power. When the priority of the sidelink signal is greater than or equal to (or greater than) the priority of the uplink signal, it is determined that the actual transmit power of the sidelink is the third transmit power, and it may be further determined that the actual transmit power of the uplink is a difference between the maximum transmit power and the third transmit power. When the priority of the sidelink signal is less than (or less than or equal to) the priority of the uplink signal, it is determined that the actual transmit power of the sidelink is a difference between the maximum transmit power and the uplink transmit power, and it may be further determined that the actual transmit power of the uplink is the uplink transmit power.

In this possible implementation, transmit power of a signal with a higher priority can be preferably ensured based on the priority of the sidelink signal and the priority of the uplink signal, so that transmission performance of the signal with a higher priority is better. For example, transmission correctness of a signal with a high priority may be relatively high, so that a transmission requirement of a service with a high priority, for example, a low-delay and high-reliability requirement, can be ensured.

In another possible implementation, the actual transmit power of the sidelink is a first product of the third transmit power and a first weight value, and it is determined that the actual transmit power of the uplink is a second product of the uplink transmit power and a second weight value. The uplink signal corresponds to the second weight value, and a sum of the first product and the second product is less than or equal to the maximum transmit power.

In this possible implementation, the third transmit power is reduced based on a preset proportion to obtain the actual transmit power of the sidelink, and the uplink transmit power is reduced based on a preset proportion to obtain the actual transmit power of the uplink. This can avoid a case in which the actual transmit power of the sidelink or the actual transmit power of the uplink is excessively small.

In still another possible implementation, the actual transmit power of the sidelink is the third transmit power or a first difference, and the first difference is a difference between the maximum transmit power and the uplink transmit power.

In this possible implementation, the actual transmit power of the sidelink and the actual transmit power of the uplink are predefined or indicated by using indication information, so that the actual transmit power of the sidelink and the actual transmit power of the uplink can be quickly determined.

In a possible implementation, the actual transmit power of the sidelink in the first time unit may be determined based on the sidelink transmit power, the uplink transmit power, and the maximum transmit power in the following manner: determining, based on the first transmit power, the second transmit power, the uplink transmit power, and the maximum transmit power, seventh transmit power corresponding to the first transmit power and eighth transmit power corresponding to the second transmit power; and determining the actual transmit power of the sidelink based on the seventh transmit power and the eighth transmit power.

In the foregoing process, the seventh transmit power corresponding to the first transmit power and the eighth transmit power corresponding to the second transmit power are determined based on the first transmit power, the second transmit power, the uplink transmit power, and the maximum transmit power, so that a total sum of transmit power corresponding to each first symbol is less than or equal to the maximum transmit power; and then the actual transmit power is determined based on the seventh transmit power and the eighth transmit power, so that the actual transmit power is constant on the N first symbols. In this way, on a basis of ensuring that the sum of the actual transmit power of the sidelink and the actual transmit power of the uplink is less than or equal to the maximum transmit power, the actual transmit power of the sidelink may be constant on the N first symbols. Therefore, power switching does not need to be performed in the first slot, thereby reducing processing complexity for a terminal device; and/or a symbol required for power switching does not need to be reserved in the first slot, thereby reducing a resource waste and improving signal transmission performance. Because the actual transmit power of the sidelink is constant on the N first symbols, a change of a signal phase caused by power jumping is avoided, so that the second terminal device can accurately perform channel estimation based on a received pilot, and therefore can accurately receive the sidelink signal sent by the first terminal device on the N first symbols. This improves signal receiving performance of the second terminal device.

In a possible implementation, the first channel and the second channel occupy different time subunits in the N first time subunits.

The actual transmit power meets one of the following:
the actual transmit power is the seventh transmit power or the eighth transmit power;
the actual transmit power is a largest value in the seventh transmit power and the eighth transmit power;
the actual transmit power is a smallest value in the seventh transmit power and the eighth transmit power; or
there is a third correspondence between the actual transmit power and the seventh transmit power and eighth transmit power.

In the foregoing process, when the first channel and the second channel occupy different symbols in the N first symbols, by using the foregoing method, the determined actual transmit power of the sidelink may be constant on the N first symbols. In addition, the foregoing manner of determining the actual transmit power of the sidelink is simple and convenient, so that efficiency of determining the actual transmit power of the sidelink is relatively high.

In a possible implementation, the first channel and the second channel occupy different frequency domain resources.

The actual transmit power is a sum of the seventh transmit power and the eighth transmit power.

In the foregoing process, through resource multiplexing, by using the foregoing method, the determined actual transmit power of the sidelink may be constant on the N first symbols. In addition, the foregoing manner of determining the actual transmit power of the sidelink is simple and convenient, so that efficiency of determining the actual transmit power of the sidelink is relatively high.

In a possible implementation, the N first time subunits include N3 fifth time subunits and N4 sixth time subunits, where a sum of N3 and N4 is N, N3 is a positive integer less than N, and N4 is a positive integer less than N.

The first channel occupies the N3 fifth time subunits, and the second channel occupies the N first time subunits.

Frequency domain resources of the first channel overlap some frequency domain resources of the second channel.

The eighth transmit power includes ninth transmit power and tenth transmit power, the ninth transmit power is transmit power of the second channel in the N3 fifth time subunits, and the tenth transmit power is transmit power of the second channel in the N4 sixth time subunits.

The actual transmit power meets one of the following:
the actual transmit power is the tenth transmit power or eleventh transmit power, and the eleventh transmit power is a sum of the seventh transmit power and the ninth transmit power;
the actual transmit power is a largest value in the tenth transmit power and the eleventh transmit power;
the actual transmit power is a smallest value in the tenth transmit power and the eleventh transmit power; or
there is a fourth correspondence between the actual transmit power and the seventh transmit power, ninth transmit power, and tenth transmit power.

In the foregoing process, through resource multiplexing, by using the foregoing method, the determined actual transmit power of the sidelink may be constant on the N first symbols. In addition, the foregoing manner of determining the actual transmit power of the sidelink is simple and convenient, so that efficiency of determining the actual transmit power of the sidelink is relatively high.

According to a second aspect, an embodiment of this application provides a communication method. A second terminal device receives a sidelink signal from a first terminal device in a first time subunit in a first time unit. Actual transmit power of the sidelink signal is related to sidelink transmit power, uplink transmit power, and maximum transmit power, the sidelink transmit power is transmit power of a sidelink of the first terminal device in the first time unit, the uplink transmit power is transmit power of an uplink of the first terminal device in the first time unit, the first time unit includes N first time subunits, M second time subunits in the N first time subunits overlap uplink resources, N is an integer greater than 1, M is a positive integer less than or equal to N, and the actual transmit power of the sidelink signal is constant in the N first time subunits. The second terminal device processes the sidelink signal.

In the foregoing process, before the sidelink signal is transmitted on the N first symbols in the first slot, if the M second symbols in the N first symbols overlap the uplink resources, the first terminal device first obtains the transmit power of the sidelink in the first slot and the uplink transmit power of the uplink in the first slot, determines the actual transmit power of the sidelink in the first slot based on the sidelink transmit power, the uplink transmit power, and the maximum transmit power, and sends the sidelink signal to the second terminal device in the first time subunit in the first time unit based on the actual transmit power, so that the actual transmit power of the sidelink is constant on the N first symbols. Therefore, power switching does not need to be performed in the first slot, thereby reducing processing complexity for a terminal device; and/or a symbol required for power switching does not need to be reserved in the first slot, thereby reducing a resource waste and improving signal transmission performance. Because the actual transmit power of the sidelink is constant on the N first symbols, a change of a signal phase caused by power switching is avoided, so that the second terminal device can accurately perform channel estimation based on a received pilot, and therefore can accurately receive the sidelink signal sent by the first terminal device on the N first symbols. This improves signal receiving performance of the second terminal device.

The communication method may be performed by a terminal device (for example, the second terminal device shown in embodiments), or may be an apparatus (for example, a processor or a chip) disposed in a terminal device.

In a possible implementation, the sidelink transmit power includes first transmit power and second transmit power, the first transmit power is transmit power of a first channel of the sidelink, and the second transmit power is transmit power of a second channel of the sidelink.

According to a third aspect, an embodiment of this application provides a communication apparatus. The apparatus is configured to perform the method according to the first aspect and any possible implementation of the first aspect.

According to a fourth aspect, an embodiment of this application provides a communication apparatus. The apparatus is configured to perform the method according to the second aspect and any possible implementation of the second aspect.

According to a fifth aspect, an embodiment of this application provides a communication apparatus, including a processor. The processor is coupled to a memory, the memory is configured to store programs or instructions, and when the programs or the instructions are executed by the processor, the apparatus is enabled to perform the method according to the first aspect and any possible implementation of the first aspect.

According to a sixth aspect, an embodiment of this application provides a communication apparatus, including a processor. The processor is coupled to a memory, the memory is configured to store programs or instructions, and when the programs or the instructions are executed by the processor, the apparatus is enabled to perform the method according to the second aspect and any possible implementation of the second aspect.

According to a seventh aspect, an embodiment of this application provides a storage medium. The storage medium stores computer programs or instructions, and when the computer programs or the instructions are executed, a computer is enabled to perform the method according to the first aspect and any possible implementation of the first aspect.

According to an eighth aspect, an embodiment of this application provides a storage medium. The storage medium stores computer programs or instructions, and when the computer programs or the instructions are executed, a computer is enabled to perform the method according to the second aspect and any possible implementation of the second aspect.

According to a ninth aspect, an embodiment of this application provides a communication system, including the apparatus according to the third aspect and/or the apparatus according to the fourth aspect.

According to a tenth aspect, an embodiment of this application provides a communication system, including the apparatus according to the fifth aspect and/or the apparatus according to the sixth aspect.

According to the power determining method, apparatus, and the device provided in the embodiments of this application, before the sidelink signal is transmitted on the N first symbols in the first slot, if the M second symbols in the N first symbols overlap the uplink resources, the transmit power of the sidelink in the first slot and the uplink transmit power of the uplink in the first slot are first obtained, and then the actual transmit power of the sidelink in the first slot is determined based on the sidelink transmit power, the uplink transmit power, and the maximum transmit power, so that the actual transmit power of the sidelink is constant on the N first symbols. Therefore, power switching does not need to be performed in the first slot, thereby reducing processing complexity for a terminal device; and/or a symbol required for power switching does not need to be reserved in the first slot, thereby reducing a resource waste and improving signal transmission performance. Because the actual transmit power of the sidelink is constant on the N first symbols, a change of a signal phase caused by power switching is avoided, so that the second terminal device can accurately perform channel estimation based on a received pilot, and therefore can accurately receive the sidelink signal sent by the first terminal device on the N first symbols. This improves signal receiving performance of the second terminal device.

BRIEF DESCRIPTION OF DRAWINGS

FIG. 5A to FIG. 5C show several BWP application scenarios according to an embodiment of this application;

DESCRIPTION OF EMBODIMENTS

Figure 1:
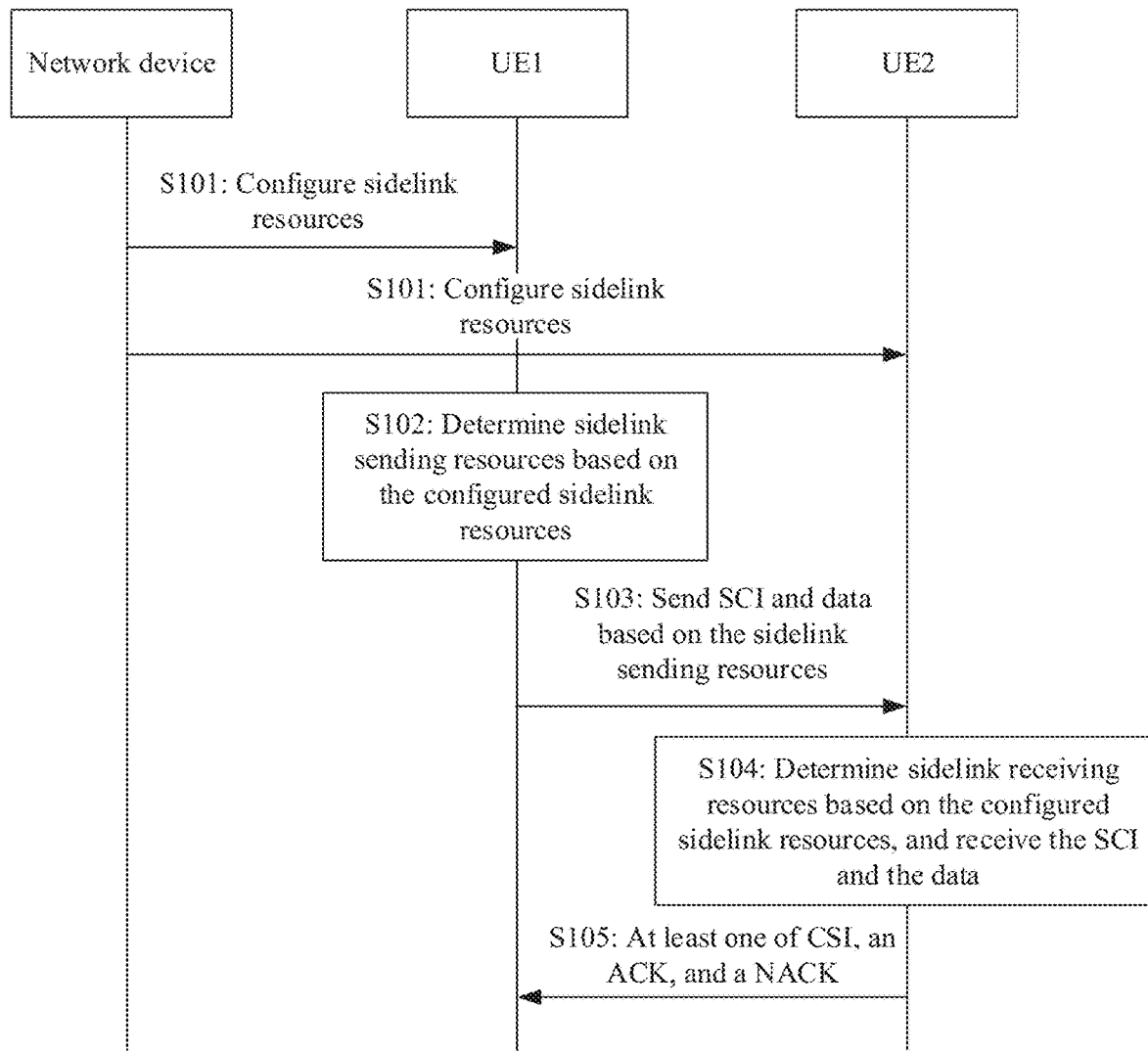
FIG. 1 is a schematic diagram of sidelink communication according to an embodiment of this application.

For ease of understanding, concepts in this application are first described.

A terminal device is a device having a wireless transceiver function. The terminal device may be deployed on land, including an indoor device, an outdoor device, a handheld device, or a vehicle-mounted device, or may be deployed on a water surface (such as a ship), or may be deployed in the air (for example, on an aircraft, a balloon, or a satellite). The terminal device may be a mobile phone, a pad, a computer having a wireless transceiver function, a virtual reality (VR for short) terminal device, an augmented reality (AR for short) terminal device, a wireless terminal in industrial control, a vehicle-mounted terminal device, a wireless terminal in self driving, a wireless terminal device in remote medical, a wireless terminal device in a smart grid, a wireless terminal device in transportation safety, a wireless terminal device in a smart city, a wireless terminal device in a smart home, a wearable terminal device, or the like. The terminal device in the embodiments of this application may be further referred to as a terminal, user equipment (UE), an access terminal device, a vehicle-mounted terminal, an industrial control terminal, a UE unit, a UE station, a mobile station, a mobile console, a remote station, a remote terminal device, a mobile device, a UE terminal device, a wireless communication device, a UE agent, a UE apparatus, or the like. The terminal device may also be fixed or mobile.

A network device is a device having a wireless transceiver function. The network device includes but is not limited to an evolved NodeB (eNB or eNodeB) in long term evolution (LTE), a next generation NodeB (gNodeB or gNB) or a transmission reception point (TRP) in a new radio (NR) technology, a base station in a subsequent evolved system, an access node in a wireless fidelity (Wi-Fi) system, a radio relay node, a radio backhaul node, and the like. The base station may be a macro base station, a micro base station, a picocell base station, a small cell, a relay station, a balloon station, or the like. A plurality of base stations may support the foregoing networks using a same technology, or may support the foregoing networks using different technologies. The base station may include one or more co-site or non-co-site TRPs. The network device may alternatively be a radio controller, a centralized unit (CU), and/or a distributed unit (DU) in a cloud radio access network (CRAN) scenario. Alternatively, the network device may be a server, a wearable device, a vehicle-mounted device, or the like. The following provides descriptions by using an example in which the network device is a base station. The plurality of network devices may be base stations of a same type, or may be base stations of different types. The base station may communicate with the terminal, or may communicate with the terminal by using a relay station. The terminal may communicate with a plurality of base stations that support different technologies. For example, the terminal may communicate with a base station that supports an LTE network, or may communicate with a base station that supports a 5G network, or may support dual connections to a base station that supports an LTE network and a base station that supports a 5G network, or may support dual connections to base stations that support a 5G network.

A time unit is a time domain resource, and one time unit may include a plurality of time subunits. For example, a time unit may be a slot, and a time subunit may be a symbol. For another example, a time unit may be a subframe, and a time subunit may be a slot or a symbol. For ease of description, an example in which a time unit is a slot and a time subunit is a symbol is used for description below.

Sidelink communication is communication between terminal devices. A link between terminal devices is referred to as a sidelink. The sidelink may also be referred to as a device-to-device (D2D) link, a sidelink, or the like. This is not limited in this application. With reference to FIG. 1, an example in which sidelink communication between UE 1 and UE 2 is used to describe sidelink communication below. FIG. 1 is a schematic diagram of sidelink communication according to an embodiment of this application. As shown in FIG. 1, the method includes the following steps.

S101: A network device separately configures sidelink resources for the UE 1 and the UE 2.

A sidelink may include a plurality of channels. For example, the sidelink may include a first channel and a second channel. For example, the first channel may be a physical sidelink control channel (PSCCH), a physical sidelink shared channel (PSSCH), or a physical sidelink feedback channel (PSFCH), and the second channel may be a PSCCH, a PSSCH, or a PSFCH. For ease of description, an example in which the first channel is a PSCCH and the second channel is a PSSCH is used for description below.

The sidelink resources include a PSSCH resource and a PSCCH resource. The PSSCH is used to carry data information, in other words, the PSSCH resource is used to transmit data information. The PSCCH is used to carry sidelink control information (SCI), in other words, the PSCCH resource is used to transmit the SCI. Information in the SCI may be referred to as SA (scheduling assignment). The SA is information related to data scheduling. For example, the SA may be used to indicate a resource allocation manner and a modulation and coding scheme of the PSSCH. The PSSCH resource may also be referred to as a data resource, and the PSCCH resource may also be referred to as an SA resource.

Optionally, the network device may configure a resource for UE in the following two possible implementations. The following manners are merely examples, and are not used to limit this application.

In a possible implementation, an SA resource and a data resource configured by the network device for the UE are adjacent in frequency domain.

In this possible implementation, the network device configures one or more of the following information: a resource block (RB) of a start resource of a subchannel, a quantity of consecutive RBs included in the subchannel, and a quantity of subchannels. A resource pool may be understood as a candidate time-frequency resource used for sidelink communication. A time domain resource may be configured by using one or more of a symbol, a slot, a micro slot, or a subframe. A frequency domain resource may be configured by using one or more of a resource block, a resource block group, or a sub-band. One resource block group may include one or more resource blocks. One sub-band may include one or more resource blocks. The foregoing configuration information may also be referred to as resource pool configuration information. A resource in the resource pool may be determined based on the foregoing information configured by the network device. The SA resource is adjacent to the data resource. It is predefined that one SA resource (a resource for transmitting one SA) may be two RBs at the bottom of the subchannel.

Figure 2:
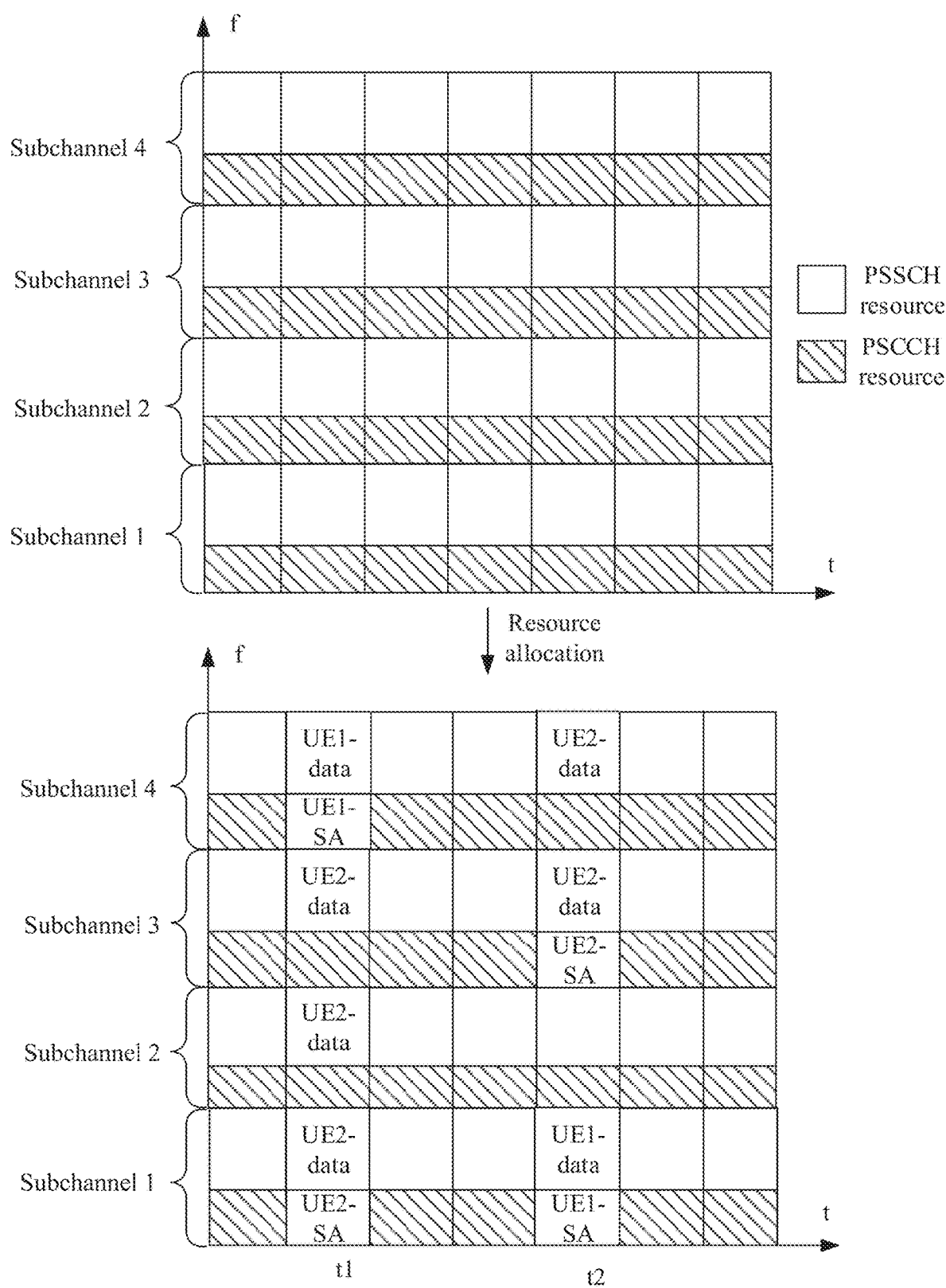
FIG. 2 is a schematic diagram of a resource according to an embodiment of this application.

With reference to FIG. 2, the following describes the resource allocation manner. FIG. 2 is a schematic diagram of a resource according to an embodiment of this application. As shown in FIG. 2, the network device configures four subchannels for the UE: a subchannel 1, a subchannel 2, a subchannel 3, and a subchannel 4. For example, it is assumed that, at a moment t1, the UE 1 occupies a resource of the subchannel 4, and the UE 2 occupies resources of the subchannel 1, the subchannel 2, and the subchannel 3. In this case, at the moment t1, data sent by the UE 1 and the UE 2 and a resource occupied by the SA are shown in FIG. 2. It is assumed that, at a moment t2, the UE 1 occupies a resource of the subchannel 1, and the UE 2 occupies resources of the subchannel 3 and the subchannel 4. In this case, at the moment t2, data sent by the UE 1 and the UE 2 and a resource occupied by the SA are shown in FIG. 2.

In another possible implementation, an SA resource and a data resource configured by the network device for the UE are not adjacent in frequency domain.

In this implementation, the network device configures one or more of the following information: a start RB of the SA resource, a start RB of a subchannel, a quantity of consecutive RBs included in the subchannel, and a quantity of subchannels. A total quantity of RBs of the SA resource may be twice as many as the quantity of subchannels. A resource in the resource pool may be determined based on the foregoing information configured by the network device. The SA resource is not adjacent to the data resource. It is predefined that one SA resource (a resource for transmitting one SA) may include two RBs. The SA resource may be associated with the subchannel.

Figure 3:
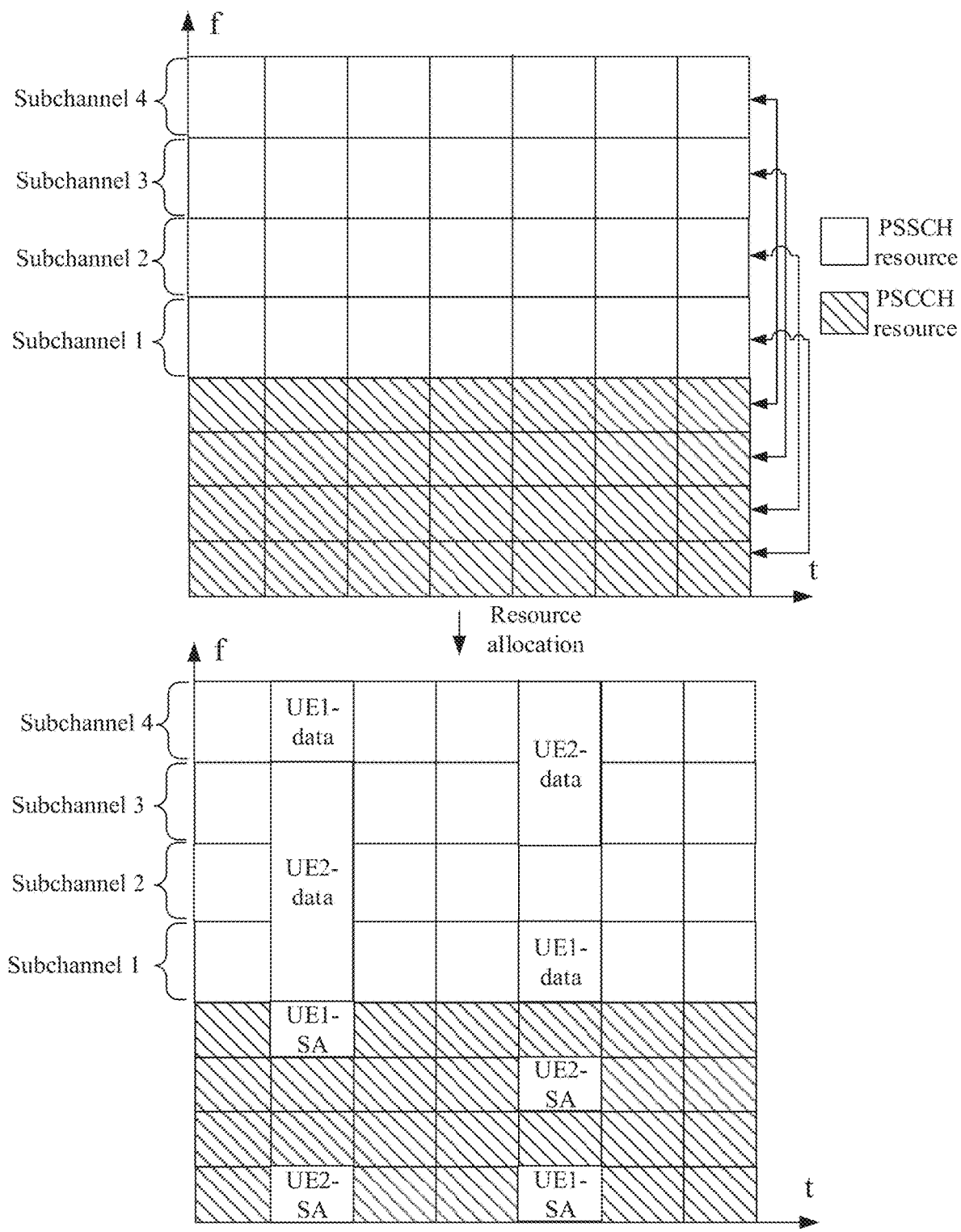
FIG. 3 is a schematic diagram of another resource according to an embodiment of this application.

With reference to FIG. 3, the following describes the resource allocation manner. FIG. 3 is a schematic diagram of another resource according to an embodiment of this application. As shown in FIG. 3, the network device configures four subchannels for the UE: a subchannel 1, a subchannel 2, a subchannel 3, and a subchannel 4. Each subchannel has a corresponding SA resource, and a correspondence between a subchannel and an SA resource is shown by an arrow in FIG. 3. It is assumed that, at a moment t1, the UE 1 occupies a resource of the subchannel 4, and the UE 2 occupies resources of the subchannel 1, the subchannel 2, and the subchannel 3. In this case, at the moment t1, data sent by the UE 1 and the UE 2 and a resource occupied by the SA are shown in FIG. 2. It is assumed that, at a moment t2, the UE 1 occupies a resource of the subchannel 1, and the UE 2 occupies resources of the subchannel 3 and the subchannel 4. In this case, at the moment t2, data sent by the UE 1 and the UE 2 and a resource occupied by the SA are shown in FIG. 2.

Optionally, the network device may configure, by using the following signaling, whether the SA resource and the data resource are adjacent in frequency domain:

Adjacency PSCCH-PSSCH-r14 BOOLEAN.

If a value corresponding to the foregoing signaling is TRUE, it indicates that the SA resource and the data resource allocated to the UE are adjacent in frequency domain, in other words, the UE transmits the PSSCH and the PSCCH on adjacent RBs. Alternatively, if a value corresponding to the foregoing signaling is FALSE, it indicates that the SA resource and the data resource allocated to the UE are not adjacent in frequency domain, in other words, the UE may transmit the PSSCH and the PSCCH on non-adjacent RBs.

S102: The UE 1 determines sidelink sending resources based on the sidelink resources configured by the network device for the UE 1.

The sidelink sending resources may be all or some of the sidelink resources.

S103: The UE 1 sends SCI and data to the UE 2 based on the sidelink sending resources.

The UE 1 sends the SCI to the UE 2 on the SA resource, and sends the data to the UE 2 on the data resource.

S104: The UE 2 determines sidelink receiving resources based on the configured sidelink resources, and receives the SCI and the data on the sidelink receiving resources.

S105: The UE 2 sends at least one of channel state information (CSI) and hybrid automatic repeat request (HARQ) information to the UE 1.

The HARQ information may include acknowledgement (ACK) information or negative acknowledgement (NACK) information.

In the foregoing process, S105 may be performed before S104, or may be performed after S104, or may be an independent step. This is not limited in this application.

The UE 2 may send the CSI and/or the HARQ information to the UE 1 through a PSFCH (the PSFCH may also be referred to as a physical sidelink uplink control channel (PSUCCH)). The PSUCCH may be a channel that is sent by receive end UE (for example, the UE 2) to transmit end UE (for example, the UE 1). Herein, a transmit end and a receive end are described from the perspective of a transceiver end of a data channel PSSCH. For the PSUCCH, UE that sends the PSUCCH is the UE 2, and UE that receives the PSUCCH is the UE 1.

In the foregoing process, during sidelink communication between the UE 1 and the UE 2, the UE 1 may send the SCI and the data to the UE 2, and the UE 2 may feed back the ACK/NACK or the like after receiving a signal sent by the UE 1. Optionally, to obtain accurate channel information and help determine scheduling of the transmit end UE 1, the UE 2 may feed back the CSI to the UE 1, and the UE 1 performs data scheduling and sending based on the CSI fed back by the UE 2.

Figure 4A:
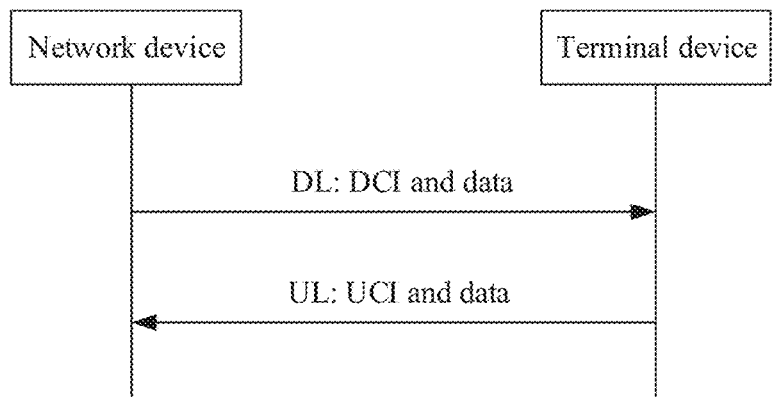
FIG. 4A is a schematic diagram of Uu air interface communication according to an embodiment of this application.

Uu air interface communication is communication between a terminal device and a network device. A Uu air interface may be understood as a universal UE to network interface. With reference to FIG. 4A, the following describes a Uu air interface communication process. FIG. 4A is a schematic diagram of Uu air interface communication according to an embodiment of this application. As shown in FIG. 4A, the network device may send downlink control information (DCI) and data to the terminal device. The downlink control information is related information used for data scheduling, for example, is used to indicate a resource allocation manner and a modulation and coding scheme of a data channel. During the Uu air interface communication, a channel sent by the network device to the terminal device is referred to as a downlink (DL) channel, and a channel sent by the terminal device to the network device is referred to as an uplink (UL) channel. The downlink channel may include a downlink data channel and a downlink control channel. The uplink channel may include an uplink data channel and an uplink control channel. The uplink control channel may be used to carry information fed back by the terminal device, and the information is referred to as uplink control information (UCI). For example, the uplink control channel may carry CSI and/or ACK/NACK fed back by the terminal device.

An air interface resource is a resource used for data transmission between two devices. The two devices may be a terminal device and a network device, or may be two terminal devices. The air interface resource may include a time domain resource and a frequency domain resource, and the time domain resource and the frequency domain resource may also be referred to as a time-frequency resource. The frequency domain resource may be located in a specified or predefined frequency range. The frequency range may also be referred to as a band or a frequency band. A size of the frequency domain resource in frequency domain may be referred to as a bandwidth (BW). The time-frequency resource may be specifically a resource grid, including a time domain resource and a frequency domain resource. For example, a time domain unit may be a symbol, and a frequency domain unit may be a subcarrier. A smallest resource unit in the resource grid may be referred to as a resource element (RE). One RB may include one or more subcarriers in frequency domain, for example, may be 12 subcarriers. One slot may include one or more symbols in time domain. For example, in an NR system, one slot may include 14 symbols (under a common cyclic prefix (CP)) or 12 symbols (under an extended cyclic prefix). In the NR, a plurality of frame structures (which may include a plurality of subcarrier spacings) are introduced. Therefore, one resource grid may be defined for one frame structure parameter. The following example is used.

For a subcarrier spacing and a carrier, a defined resource grid includes $N_{grid,x}^{size,\mu} N_{sc}^{RB}$ subcarriers and $N_{symb}^{subframe,\mu}$ orthogonal frequency-division multiplexing (OFDM) symbols. $N_{grid,x}^{size,\mu}$ is a size of the resource grid, for example, may be a quantity of included resource blocks (RBs). For example, one resource grid may include X2 physical resource blocks (PRBs), and X2 is an integer greater than or equal to 1. For example, the PRBs may be sequentially numbered from 0 to X2−1 in a frequency increasing direction, to obtain RB number values. In this embodiment of this application, the term "number value" may also be referred to as "identifier" or "index". $N_{sc}^{RB}$ is a quantity of subcarriers included in one resource block, for example, may be 12 subcarriers. $N_{symb}^{subframe,\mu}$ is a quantity of symbols included in one subframe in a subcarrier spacing configuration µ. A subscript x indicates a downlink or an uplink. Further, one subframe may include several slots. For example, $N_{slot}^{subframe,\mu}$ is a quantity of slots included in one subframe in a subcarrier spacing configuration µ. $N_{symb}^{slot}$ is a quantity of symbols included in one slot, for example, may be 14.

For one numerology and one carrier, a resource grid may be defined in the carrier. A start location of the resource grid in the carrier is $N_{grid}^{start,\mu}$, or a start location of a first subcarrier in the resource grid in the carrier may be $N_{grid}^{start,\mu}$. The value may be indicated by using higher layer signaling. For example, the system parameter may be described as a frame structure parameter. For example, the system parameter may include a subcarrier spacing and/or a CP. For example, Table 1 shows a frame structure parameter supported in the NR.

TABLE 1

| µ | $\Delta f = 2^\mu \cdot 15$ [kHz] | CP |
|---|---|---|
| 0 | 15 | Normal |
| 1 | 30 | Normal |
| 2 | 60 | Common and extended |
| 3 | 120 | Normal |
| 4 | 240 | Normal |

When the network device and the terminal device perform data transmission, the network device may schedule the terminal device, and the network device may allocate a frequency domain resource and/or a time domain resource of a data channel (such as a physical downlink shared channel (PDSCH) or a physical uplink shared channel (PUSCH)) from a resource grid to the terminal device by using control information. For example, the control information may indicate a symbol and/or an RB to which the data channel is mapped. The network device and the terminal device perform data transmission on the allocated time-frequency resource through the data channel. The data transmission may include downlink data transmission and/or uplink data transmission. The downlink data (for example, data carried on the PDSCH) transmission may be that the network device sends data to the terminal device, and the uplink data (for example, data carried on the PUSCH) transmission may be that the terminal device sends data to the network device. The data may be data in a broad sense, for example, may be user data, or may be system information, broadcast information, or other information. For example, the data is data carried on the PDSCH.

Figure 5A:
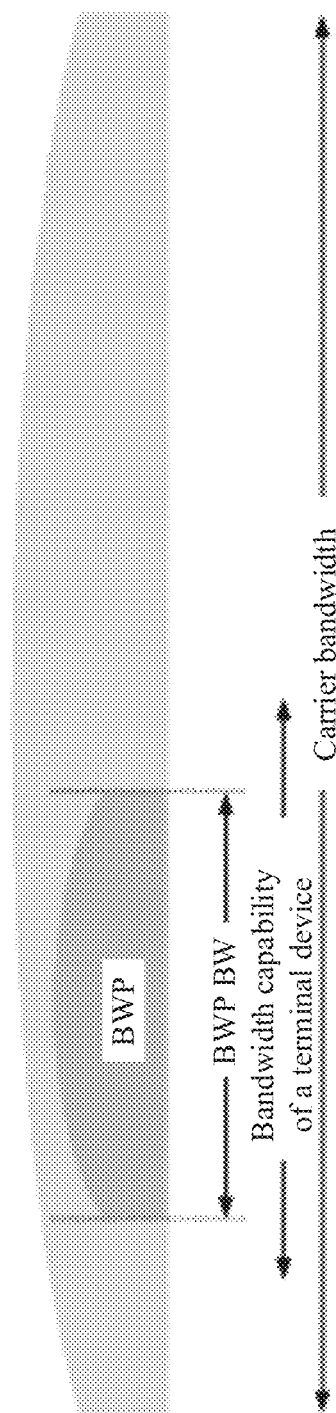

A bandwidth part (BWP) is a group of consecutive RB resources on a carrier. For example, a maximum of four BWPs may be configured for one serving cell, and one BWP may be activated within a given time (for example, one slot or one subframe). The UE transmits and receives data on the activated BWP. One BWP is defined on a given carrier, in other words, a resource of one BWP is located in one carrier resource. With reference to FIG. 5A to FIG. 5C, the following describes several possible BWP application scenarios.

FIG. 5A shows one BWP application scenario according to an embodiment of this application. As shown in FIG. 5A, a carrier bandwidth is greater than or equal to a bandwidth capability of the terminal device (UE bandwidth capability), and the UE bandwidth capability is greater than or equal to a BWP bandwidth.

FIG. 5B is another BWP application scenario according to an embodiment of this application. As shown in FIG. 5B, a BWP 1 and a BWP 2 are configured on a carrier, and the BWP 1 overlaps the BWP 2. This can implement UE energy saving. For example, the UE may switch from the BWP 2 to the BWP 1 for energy saving.

FIG. 5C shows another BWP application scenario according to an embodiment of this application. As shown in FIG. 5C, a BWP 1 and a BWP 2 are configured on a carrier, a parameter of the BWP 1 is a numerology 1, and a parameter of the BWP 2 is a numerology 2. Different parameters are configured for different BWPs.

A resource element (RE) may be an element of a resource grid of an antenna port p, and is identified by coordinates (k,l) in frequency domain and time domain. $N_{sc}^{RB}$ represents a quantity of subcarriers in one RB, and $N_{symb}^{DL}$ represents a quantity of symbols in one slot. A quantity of OFDM symbols in one slot depends on a cyclic prefix length and a subcarrier spacing, for example, which may be shown in Table 2.

TABLE 2

| Configuration | | $N_{sc}^{RB}$ | $N_{symb}^{DL}$ |
|---|---|---|---|
| Normal CP | $\Delta f = 15$ kHz | 12 | 7 |
| Extended CP | $\Delta f = 15$ kHz | | 6 |
| | $\Delta f = 7.5$ kHz | 24 | 3 |

In an NR system, a resource block (RB) is a concept in frequency domain. For example, one RB includes 12 subcarriers in frequency domain. Alternatively, in an LTE system, an RB is a concept in time-frequency domain. For example, one RB includes 12 subcarriers in frequency domain, and includes one symbol in time domain.

A time domain unit in wireless communication may be a radio frame, a subframe, a slot, a micro slot (mini slot), a symbol, or the like. Duration of one radio frame may be 10 milliseconds (ms). One radio frame may include one or more subframes. For example, if duration of one subframe is 1 millisecond, one radio frame may include 10 subframes. One subframe may include one or more slots. There may be different slot lengths for different subcarrier spacings. For example, when a subcarrier spacing is 15 kHz, one slot may be 1 ms; or when a subcarrier spacing is 30 kHz, one slot may be 0.5 ms. One slot may include one or more symbols. For example, a next slot of a normal CP may include 14 symbols, and a next slot of an extended CP may include 12 symbols.

Figure 4B:
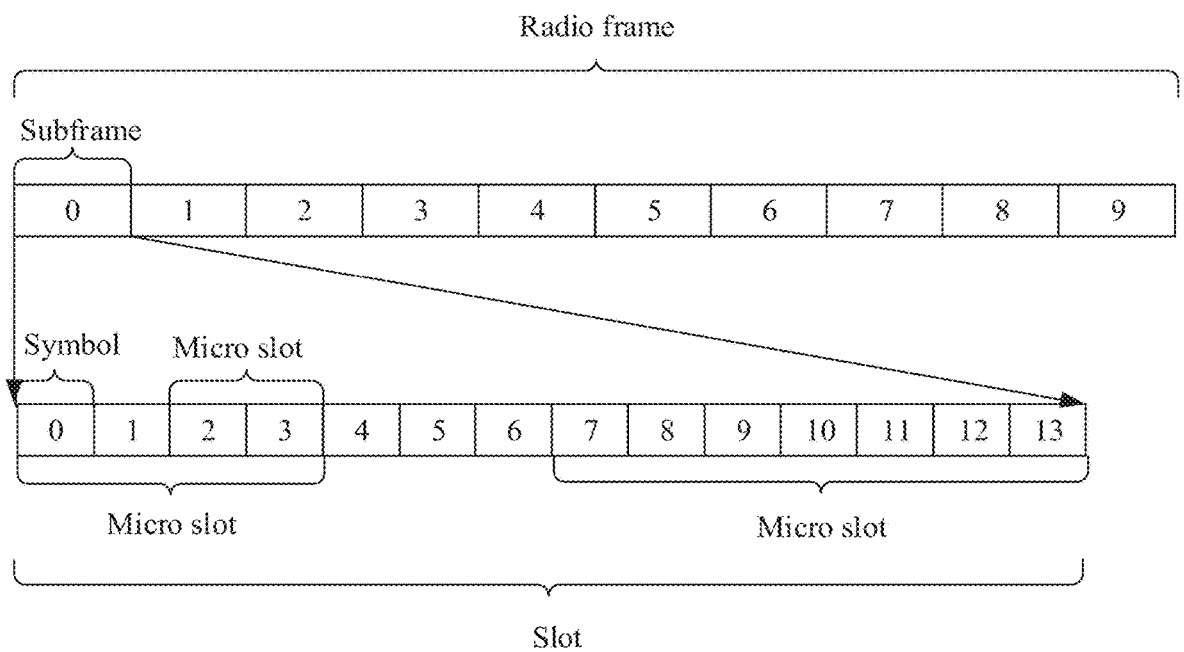
FIG. 4B is a schematic diagram of a possible time domain resource according to an embodiment of this application.

With reference to FIG. 4B, the following describes a time domain resource by using an example in which a subcarrier spacing is 15 kHz. FIG. 4B is a schematic diagram of a possible time domain resource according to an embodiment of this application. As shown in FIG. 4B, a radio frame includes a plurality of subframes, one subframe includes one slot, and one slot includes a plurality of symbols. One slot may include one or more micro slots (which may also be referred to as mini slots), and one micro slot includes one or more symbols. For example, one micro slot may include two symbols, four symbols, or seven symbols.

Sidelink transmit power is power that is used by a terminal device to send a sidelink channel and/or a sidelink signal. The sidelink channel may include one or more of a PSCCH, a PSSCH, or a PSFCH. The sidelink signal may include SA carried by the PSCCH and/or data carried by the PSSCH, and a signal carried by the PSFCH, for example, a sounding reference signal (SRS). There may be one or more pieces of sidelink transmit power. For example, the sidelink transmit power may include first transmit power of the PSCCH and/or second transmit power of the PSSCH.

Uplink transmit power is power used by a terminal device to send an uplink channel and/or an uplink signal. The uplink channel may include an uplink data channel and/or an uplink control channel. The uplink data channel may be a PUSCH, and the uplink control channel may be a physical uplink control channel (PUCCH). The uplink signal may include one or more of an uplink control signal, an uplink data signal, an SRS, and the like.

Figure 6:
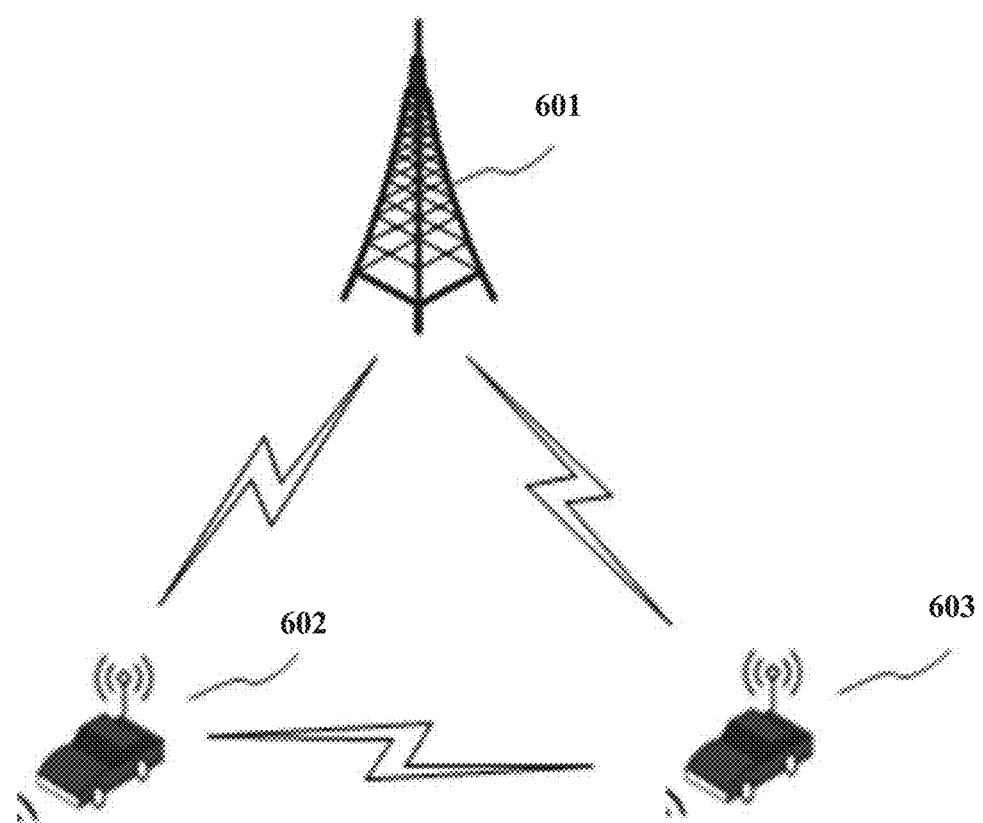
FIG. 6 is a schematic diagram of a possible communication scenario according to an embodiment of this application.

With reference to FIG. 6, the following describes a scenario to which a communication method is applicable in this application.

FIG. 6 is a schematic diagram of a possible communication scenario according to an embodiment of this application. As shown in FIG. 6, the possible communication scenario includes a network device 601, a terminal device 602, and a terminal device 603. A link between the terminal device 602 and the terminal device 603 is a sidelink. A link between the terminal device 602 and the network device 601 and a link between the terminal device 603 and the network device 601 are Uu air interface links. In this embodiment of this application, the terminal device has a capability of simultaneously communicating with the network device and the other terminal device, to be specific, the terminal device may send an uplink signal to the network device and send a sidelink signal to the other terminal device at a same moment or within a same time period.

FIG. 6 shows only an example of a scenario. The method shown in this application may be further applied to another communication scenario. For example, the another communication scenario may include more network devices and/or more terminal devices. This embodiment of this application imposes no specific limitation on an applicable communication scenario.

In a current technology, because transmit power of a PSSCH and transmit power of a PSCCH are separately determined, the determined transmit power of the PSSCH and the determined transmit power of the PSCCH may be different, and the PSSCH and the PSCCH may occupy different symbols in a same slot. Consequently, a sidelink signal on different symbols in one slot may have different transmit power. When a sidelink signal on different symbols in one slot has different transmit power, transmit power switching needs to be performed in a specific time. In this case, some symbols need to be reserved in the one slot for power switching. Consequently, a waste of time domain resources is caused. In a communication process, a transmit end usually sends a pilot to a receive end, so that the receive end performs channel estimation based on the pilot, and further receives a signal based on the channel estimation. When transmit power changes, a signal phase changes. In this case, the receive end cannot correctly perform channel estimation based on the received pilot, and the receive end cannot accurately receive a signal. Consequently, signal receiving performance of the receive end is relatively poor. To resolve this technical problem, an embodiment of this application provides a communication method. According to the method shown in this embodiment of this application, a terminal device may determine to obtain actual transmit power of a sidelink in one slot, and may enable the actual transmit power of the sidelink to be constant on symbols for sending a sidelink signal in the one slot, in other words, the actual transmit power of the sidelink is constant on a plurality of symbols in the one slot. This can reduce a resource waste and improve signal receiving performance of a receive end.

The following describes in detail the technical solutions shown in this application by using specific embodiments. The following several embodiments may exist alone or may be combined with each other. For same or similar content, descriptions are not repeated in different embodiments.

Figure 7:
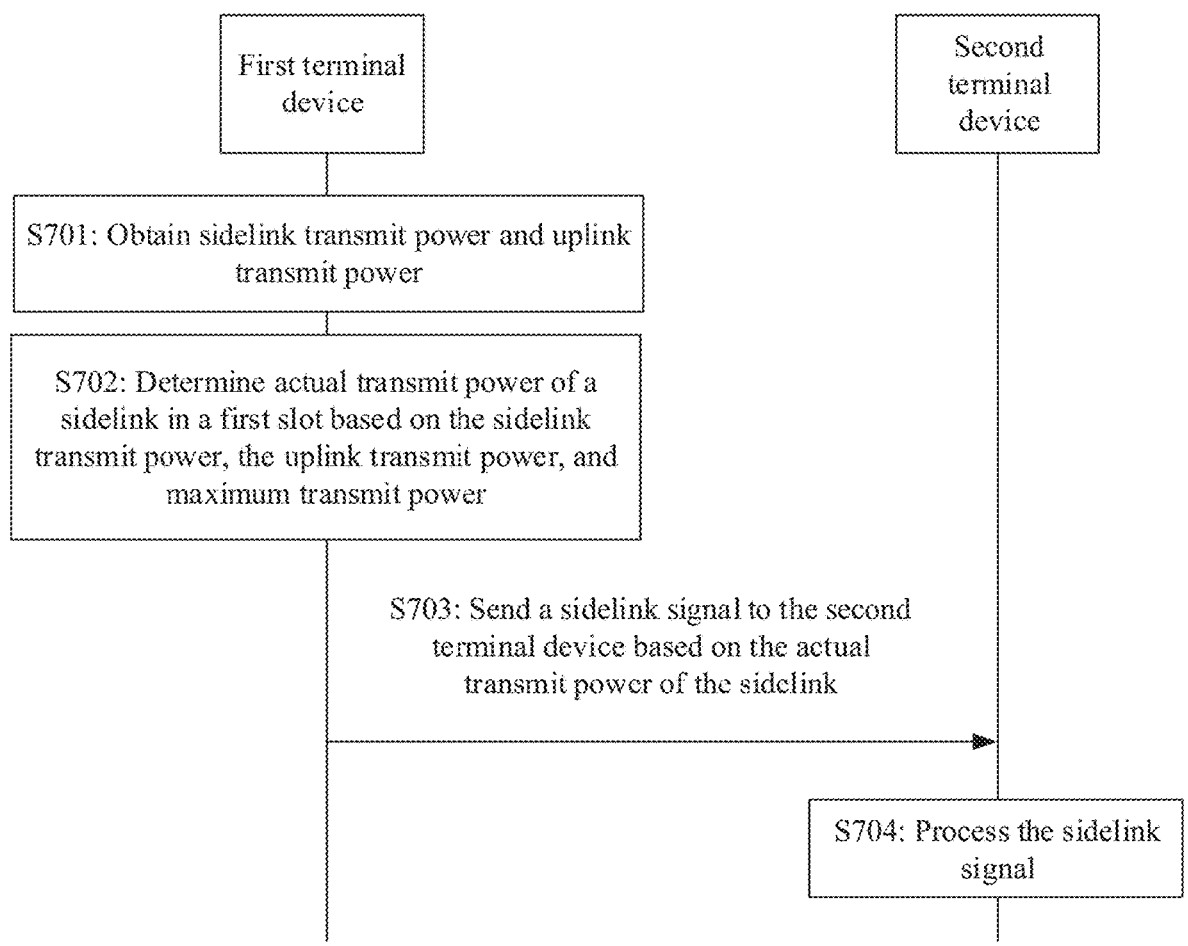
FIG. 7 is a schematic flowchart of a communication method according to an embodiment of this application.

FIG. 7 is a schematic flowchart of a communication method according to an embodiment of this application. Refer to FIG. 7. The method may include the following steps.

S701: A first terminal device obtains sidelink transmit power and uplink transmit power.

The sidelink transmit power is transmit power of a sidelink in a first slot, and the uplink transmit power is transmit power of an uplink in the first slot.

The first slot includes N first symbols, M second symbols in the N first symbols overlap uplink resources, N is an integer greater than 1, M is a positive integer less than or equal to N, and the N first symbols are symbols used for sidelink transmission in the first slot. The N first symbols may be all symbols in the first slot, or may be some symbols in the first slot.

In the first slot, a PSCCH resource and a PSSCH resource may be multiplexed in a time division manner or a frequency division manner. With reference to FIG. 8A to FIG. 8E, the following describes a manner of multiplexing a PSCCH resource and a PSSCH resource.

Figure 8A:
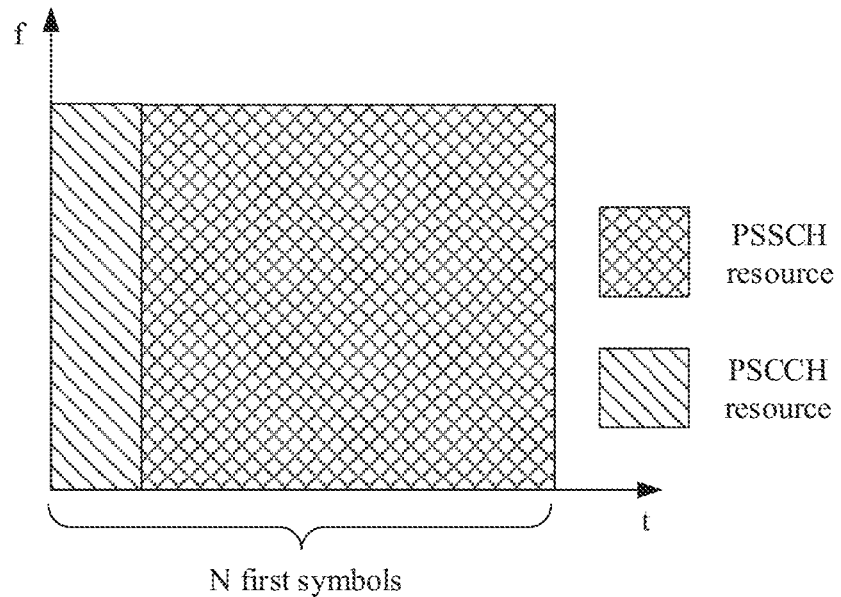
FIG. 8A to FIG. 8E are schematic diagrams of several resource multiplexing manners according to an embodiment of this application.

FIG. 8A is a schematic diagram of a resource multiplexing manner according to an embodiment of this application. As shown in FIG. 8A, a PSCCH and a PSSCH occupy different symbols in the N first symbols, and the PSCCH and the PSSCH occupy a same frequency domain resource.

Figure 8B:
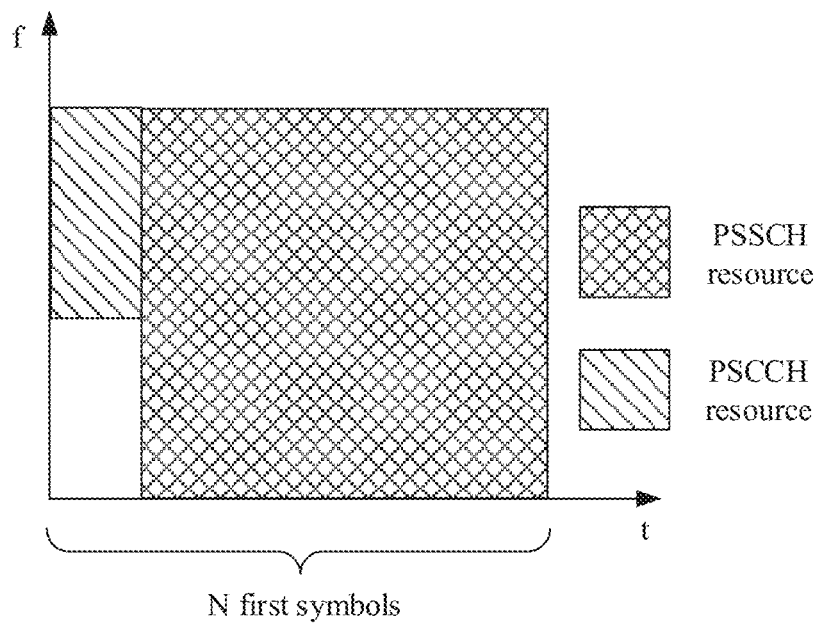

FIG. 8B is a schematic diagram of another resource multiplexing manner according to an embodiment of this application. As shown in FIG. 8B, a PSCCH and a PSSCH occupy different symbols in the N first symbols, and the PSCCH and the PSSCH occupy frequency domain resources that are not entirely the same (the frequency domain resources occupied by the PSCCH and the PSSCH may partially overlap).

Figure 8C:
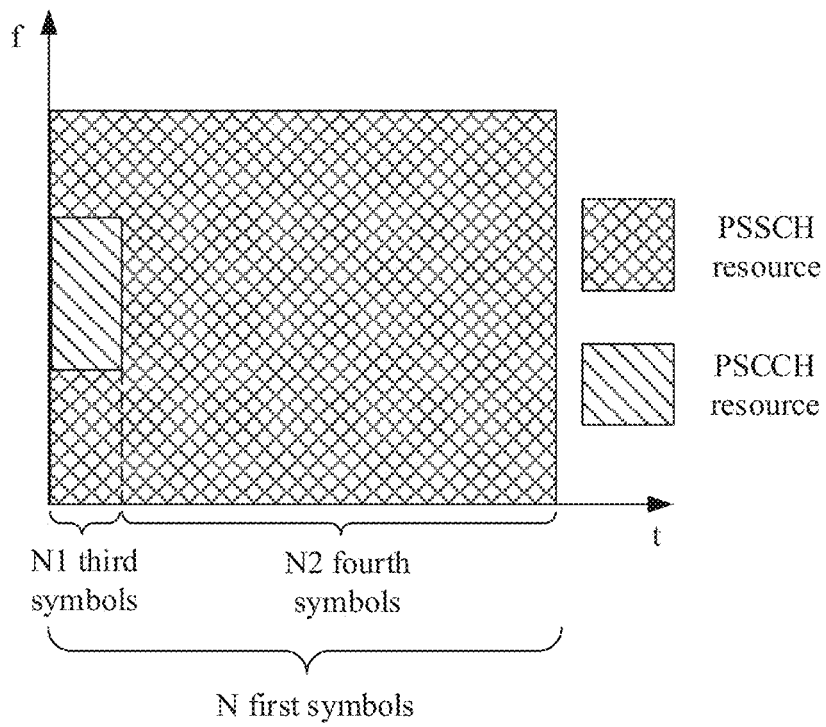

FIG. 8C is a schematic diagram of still another resource multiplexing manner according to an embodiment of this application. As shown in FIG. 8C, the N first symbols include N1 third symbols and N2 fourth symbols, where a sum of N1 and N2 is N, N1 is a positive integer less than N, and N2 is a positive integer less than N. A PSCCH occupies the N1 third symbols, a PSSCH occupies the N first symbols, and frequency domain resources of the PSCCH overlap some frequency domain resource of the PSSCH.

Figure 8D:
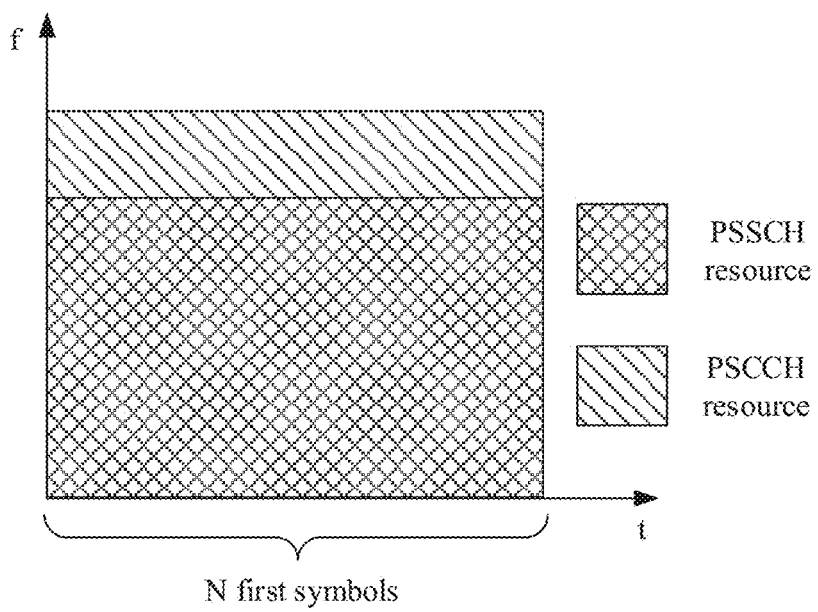

FIG. 8D is a schematic diagram of yet another resource multiplexing manner according to an embodiment of this application. As shown in FIG. 8D, a PSCCH and a PSSCH occupy different frequency domain resources, and the PSCCH and the PSSCH occupy a same symbol in the N first symbols.

Figure 8E:
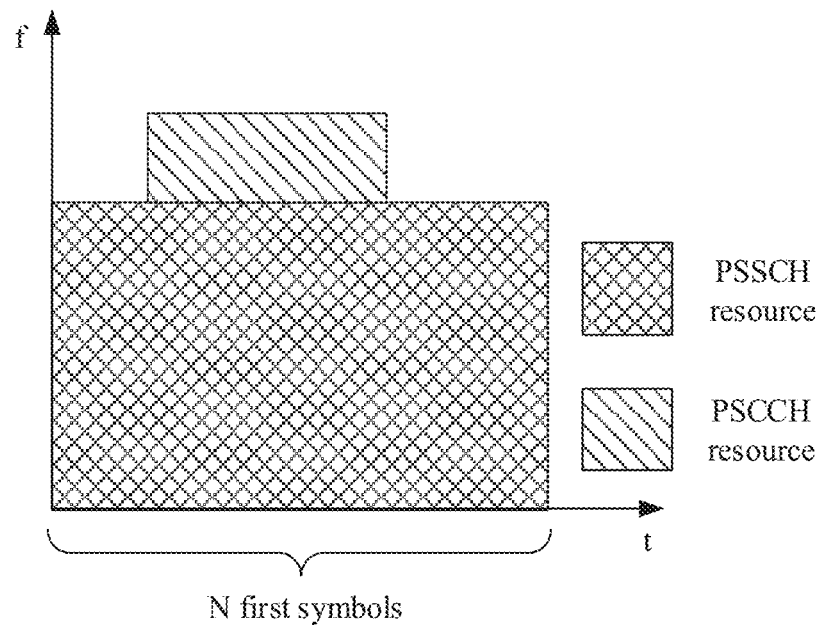

FIG. 8E is a schematic diagram of still yet another resource multiplexing manner according to an embodiment of this application. As shown in FIG. 8E, a PSCCH and a PSSCH occupy different frequency domain resources, the PSSCH occupies the N first symbols, and the PSCCH occupies some of the N first symbols.

FIG. 8A to FIG. 8E show only an example of the manner of multiplexing a PSCCH resource and a PSSCH resource, and are not used to limit the manner of multiplexing a PSCCH resource and a PSSCH resource. In an actual application process, the manner of multiplexing a PSCCH resource and a PSSCH resource may be determined according to an actual requirement. This is not specifically limited in this embodiment of this application.

When the manner of multiplexing a PSCCH resource and a PSSCH resource is shown in FIG. 8A, a manner in which the N first symbols (sidelink resources) overlap the uplink resources may be shown in FIG. 9A to FIG. 9G.

Figure 9A:
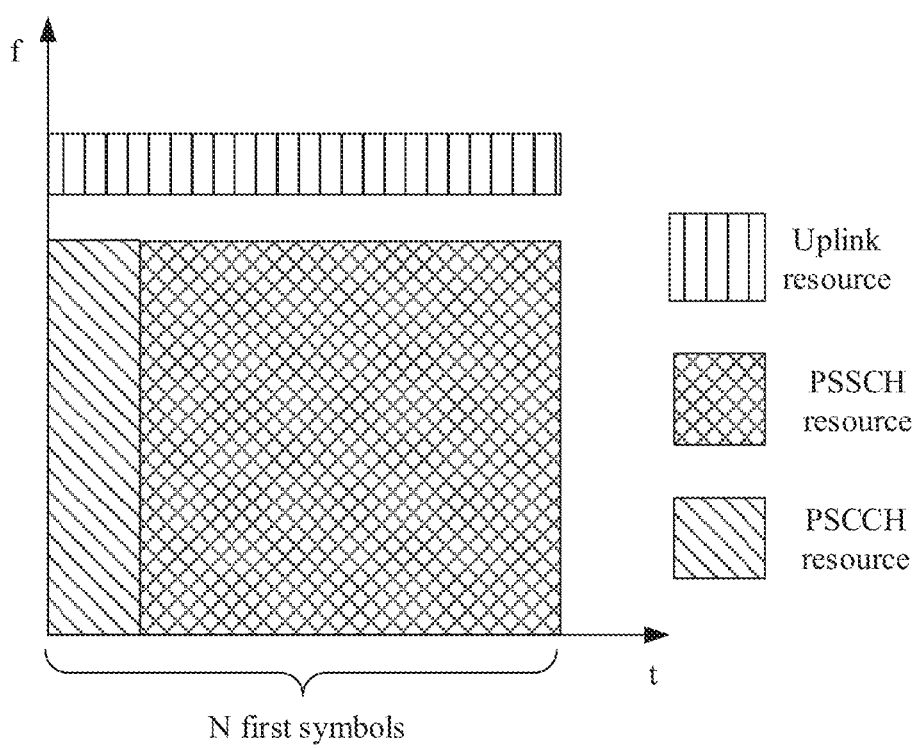
FIG. 9A to FIG. 9G, FIG. 10A to FIG. 10G, FIG. 11A, FIG. 11B, and FIG. 12A to FIG. 12C are schematic diagrams of several resource overlapping manners according to an embodiment of this application.

FIG. 9A is a schematic diagram of a resource overlapping manner according to an embodiment of this application. As shown in FIG. 9A, that the uplink resources overlap all of the N first symbols may also be understood as that the uplink resources overlap the PSCCH resources and the PSSCH resources.

Figure 9B:
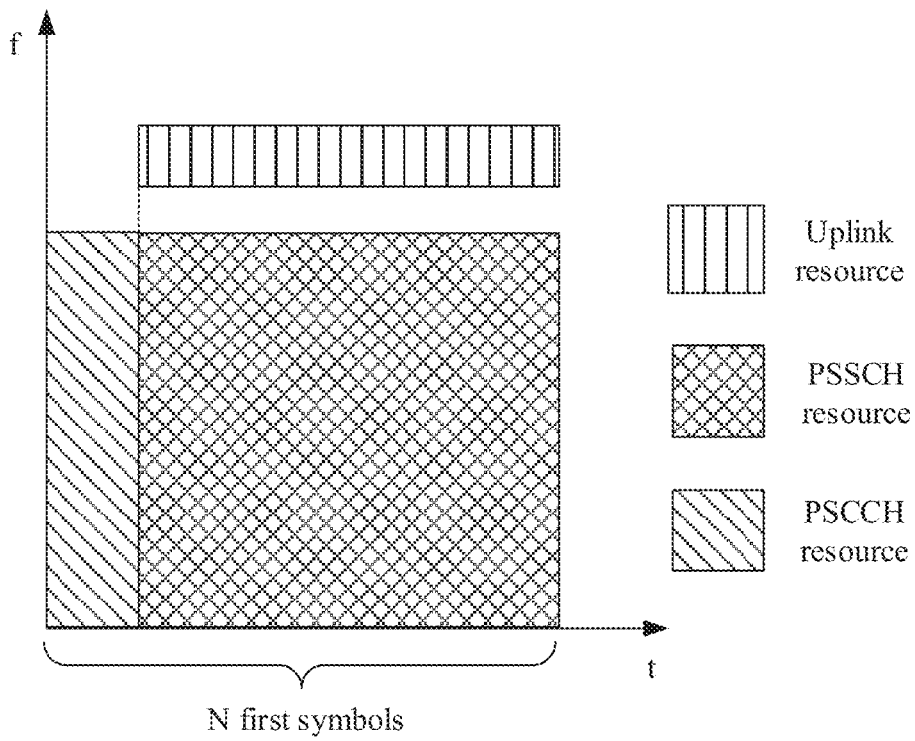

FIG. 9B is a schematic diagram of another resource overlapping manner according to an embodiment of this application. As shown in FIG. 9B, that the uplink resources overlap the first symbols occupied by the PSSCH in the N first symbols may also be understood as that the uplink resources overlap the PSSCH resources.

Figure 9C:
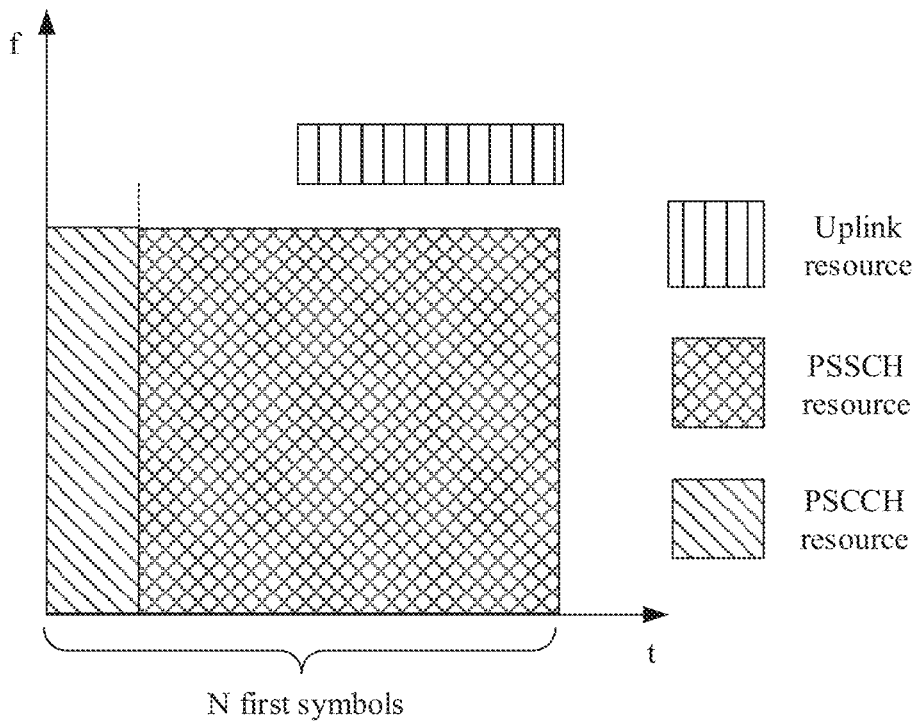

FIG. 9C is a schematic diagram of still another resource overlapping manner according to an embodiment of this application. As shown in FIG. 9C, that the uplink resources overlap some first symbols occupied by the PSSCH in the N first symbols may also be understood as that the uplink resources overlap some PSSCH resources.

Figure 9D:
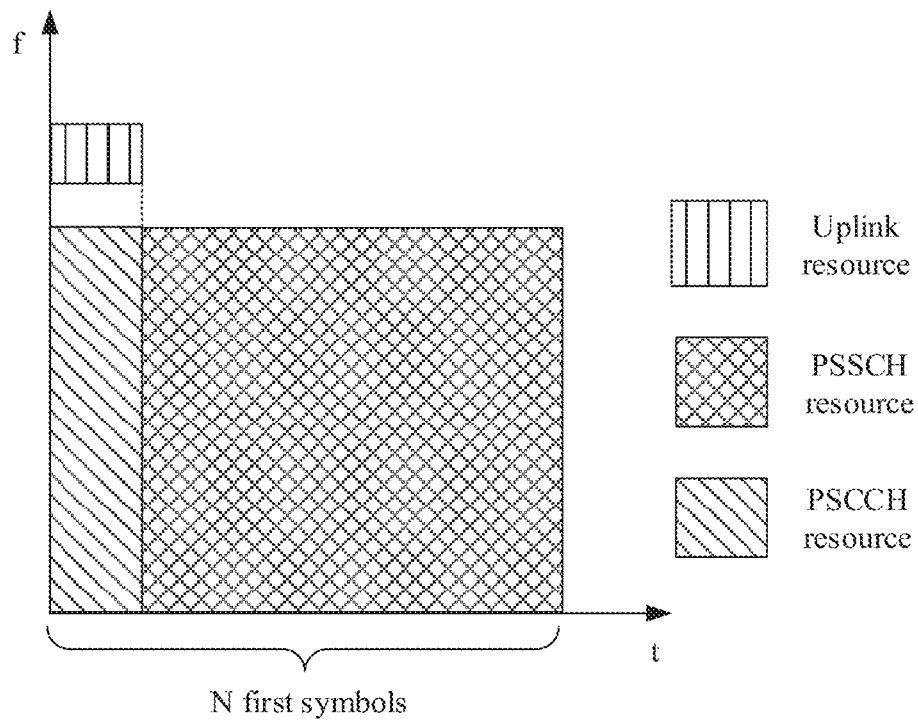

FIG. 9D is a schematic diagram of yet another resource overlapping manner according to an embodiment of this application. As shown in FIG. 9D, that the uplink resources overlap the first symbols occupied by the PSCCH in the N first symbols may also be understood as that the uplink resources overlap the PSCCH resources.

Figure 9E:
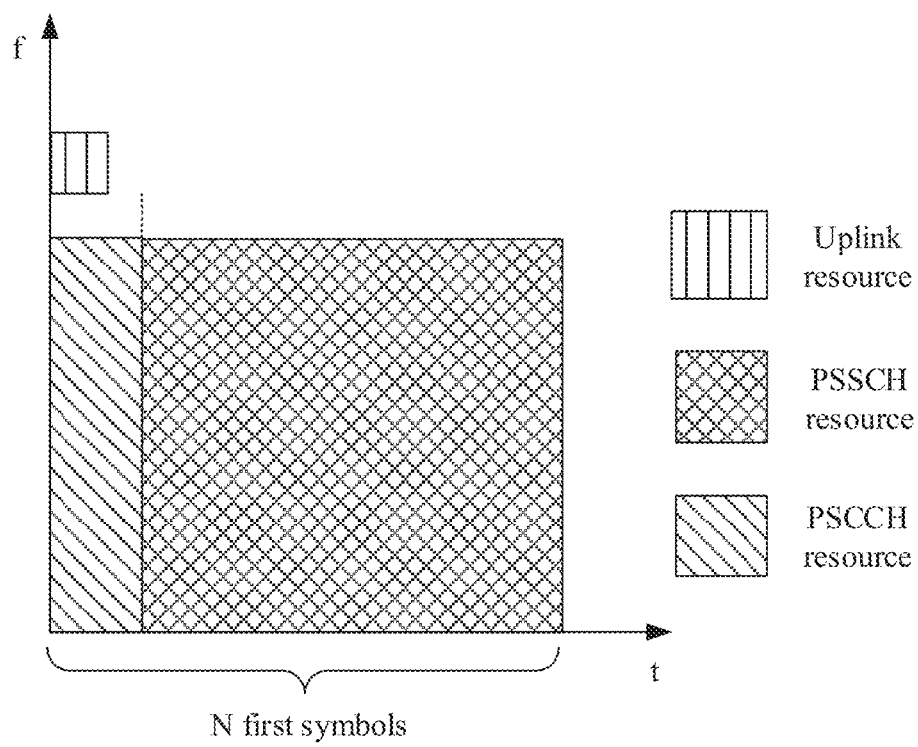

FIG. 9E is a schematic diagram of still yet another resource overlapping manner according to an embodiment of this application. As shown in FIG. 9E, that the uplink resources overlap some first symbols occupied by the PSCCH in the N first symbols may also be understood as that the uplink resources overlap some PSCCH resources.

Figure 9F:
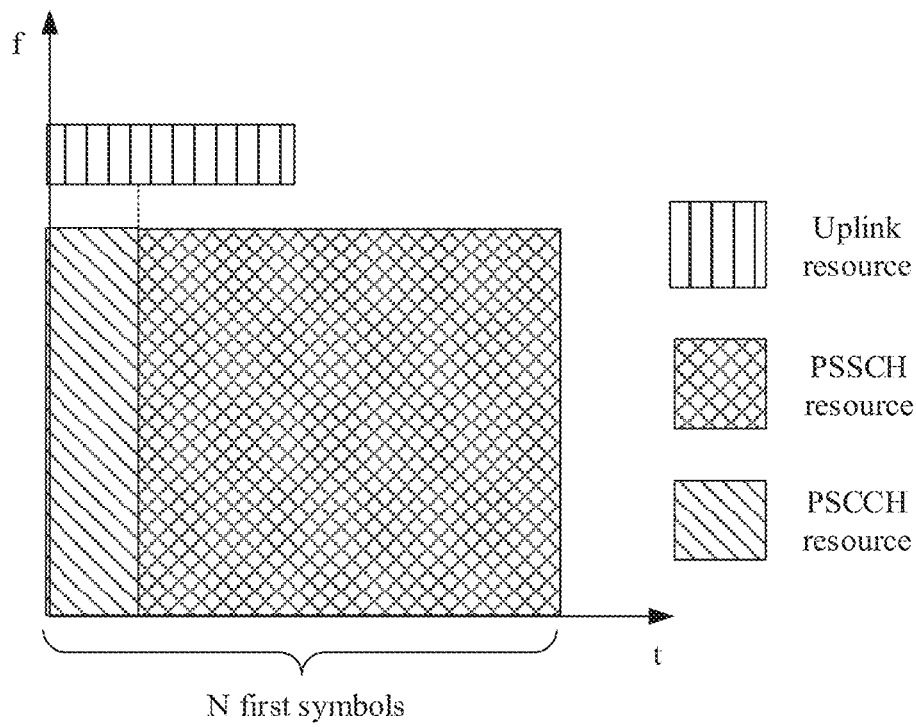

FIG. 9F is a schematic diagram of a further resource overlapping manner according to an embodiment of this application. As shown in FIG. 9F, that the uplink resources overlap the first symbols occupied by the PSCCH and some first symbols occupied by the PSSCH in the N first symbols may also be understood as that the uplink resources overlap the PSCCH resources and some PSSCH resources.

Figure 9G:
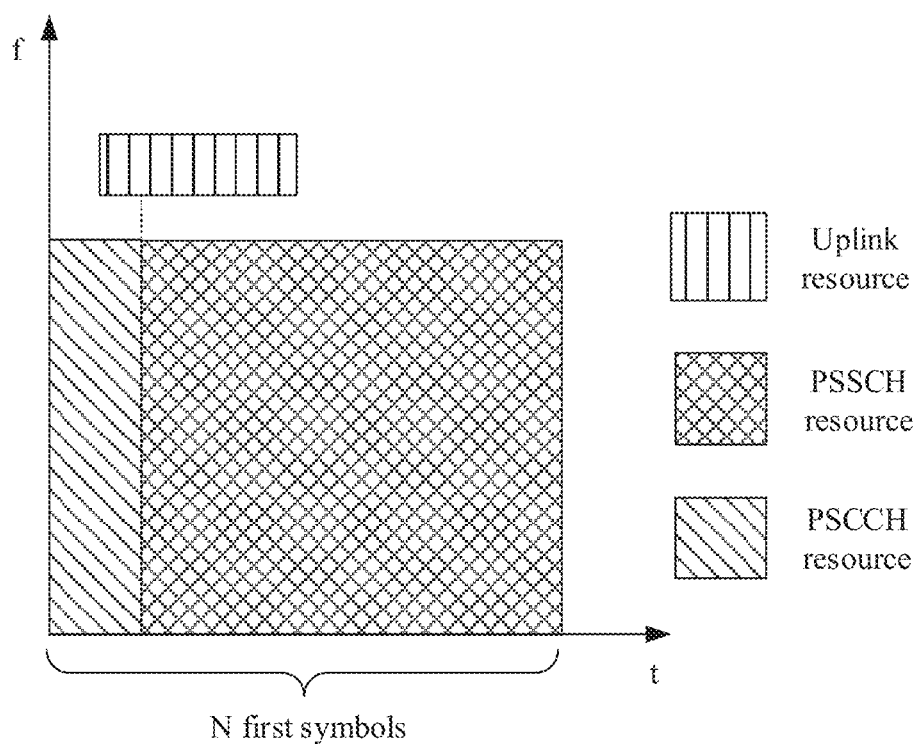

FIG. 9G is a schematic diagram of a still further resource overlapping manner according to an embodiment of this application. As shown in FIG. 9G, that the uplink resources overlap some first symbols occupied by the PSCCH and some first symbols occupied by the PSSCH in the N first symbols may also be understood as that the uplink resources overlap some PSCCH resources and some PSSCH resources.

When the manner of multiplexing a PSCCH resource and a PSSCH resource is the resource multiplexing manner shown in FIG. 8B, a manner in which the N first symbols (sidelink resources) overlap the uplink resources is similar to the resource overlapping manner shown in FIG. 9A to FIG. 9G. Details are not described herein again.

When the manner of multiplexing a PSCCH resource and a PSSCH resource is shown in FIG. 8C, a manner in which the N first symbols (sidelink resources) overlap the uplink resources may be shown in FIG. 10A to 10G.

Figure 10A:
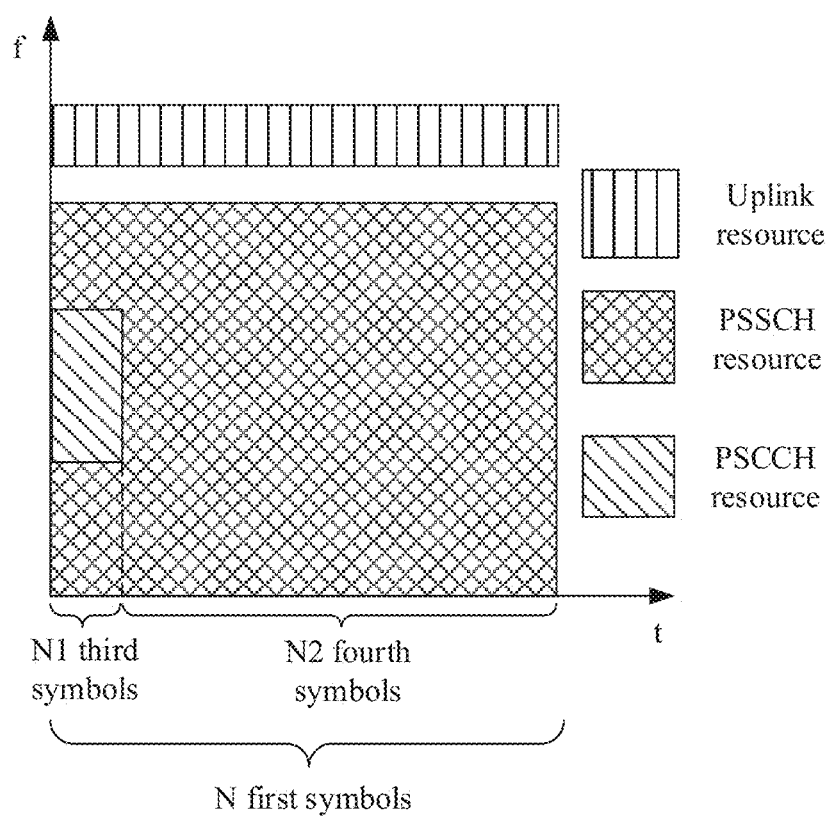

FIG. 10A is a schematic diagram of a resource overlapping manner according to an embodiment of this application. As shown in FIG. 10A, the uplink resources overlap all of the N first symbols.

Figure 10B:
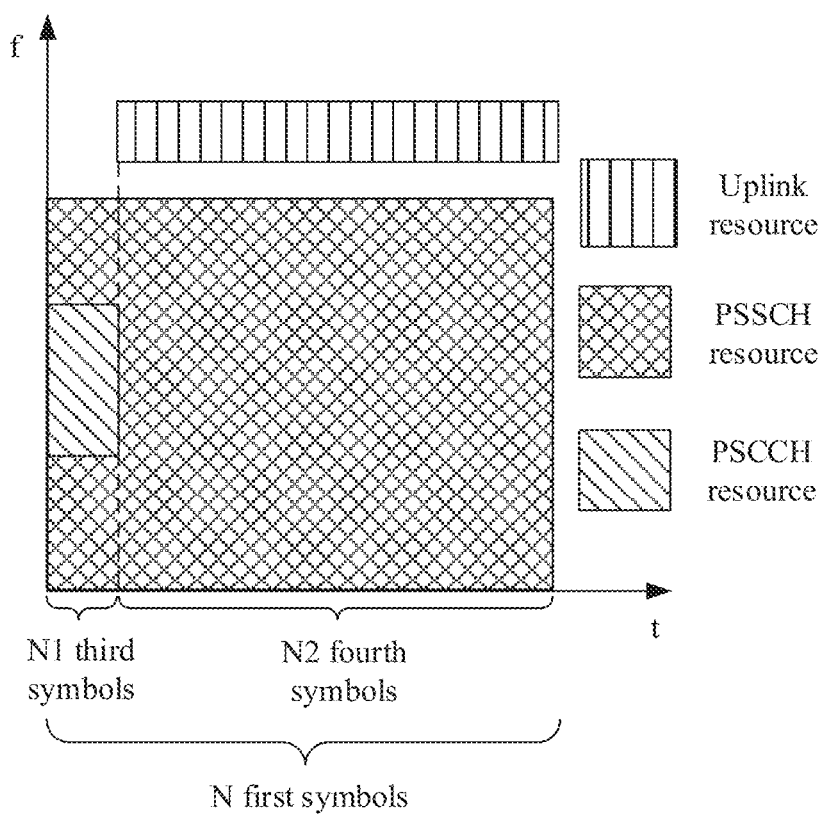

FIG. 10B is a schematic diagram of another resource overlapping manner according to an embodiment of this application. As shown in FIG. 10B, the uplink resources overlap the N2 fourth symbols.

Figure 10C:
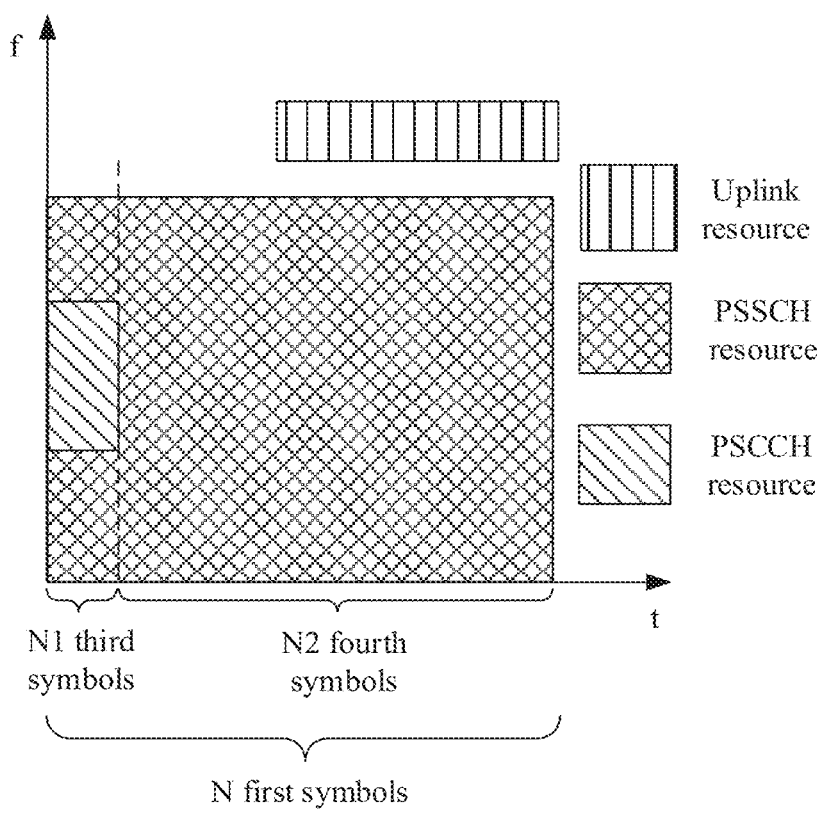

FIG. 10C is a schematic diagram of still another resource overlapping manner according to an embodiment of this application. As shown in FIG. 10C, the uplink resources overlap some of the N2 fourth symbols.

Figure 10D:
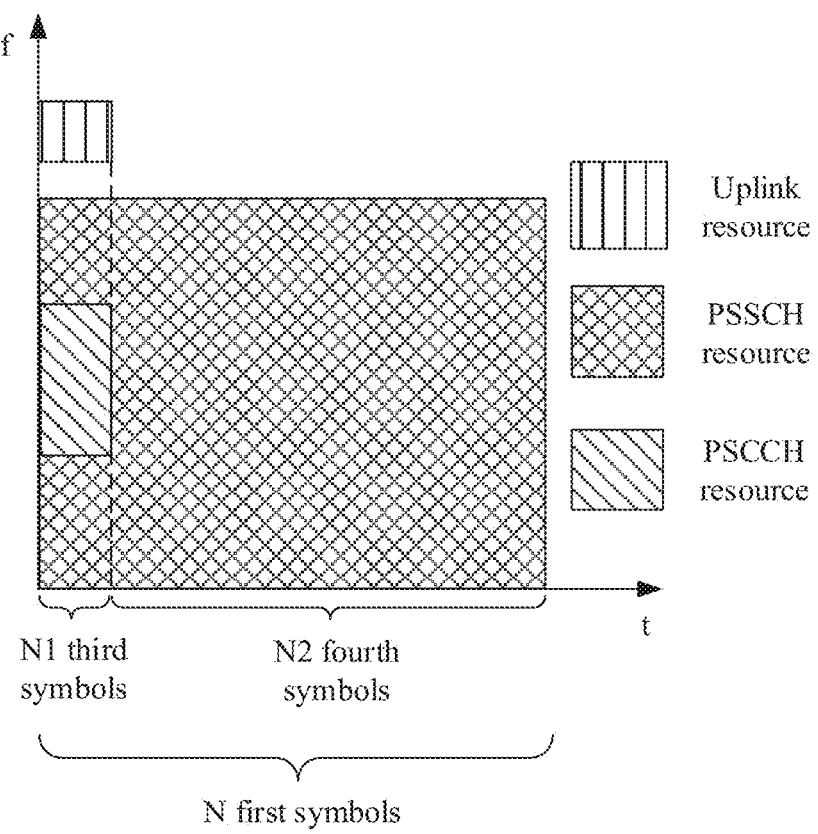

FIG. 10D is a schematic diagram of yet another resource overlapping manner according to an embodiment of this application. As shown in FIG. 10D, the uplink resources overlap the N1 third symbols.

Figure 10E:
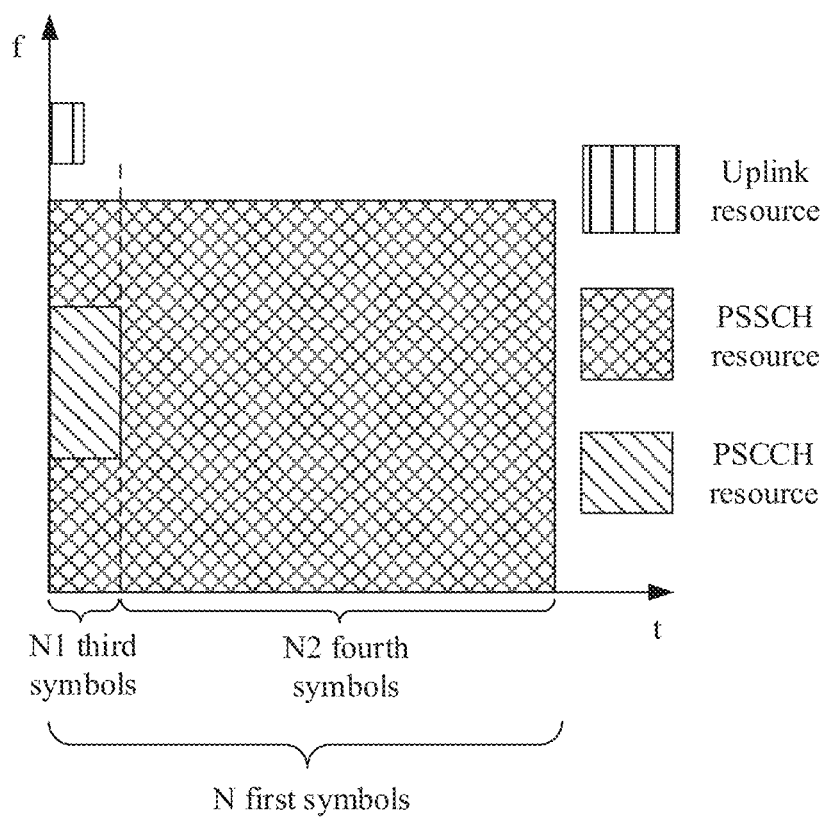

FIG. 10E is a schematic diagram of still yet another resource overlapping manner according to an embodiment of this application. As shown in FIG. JOE, the uplink resources overlap some of the N1 third symbols.

Figure 10F:
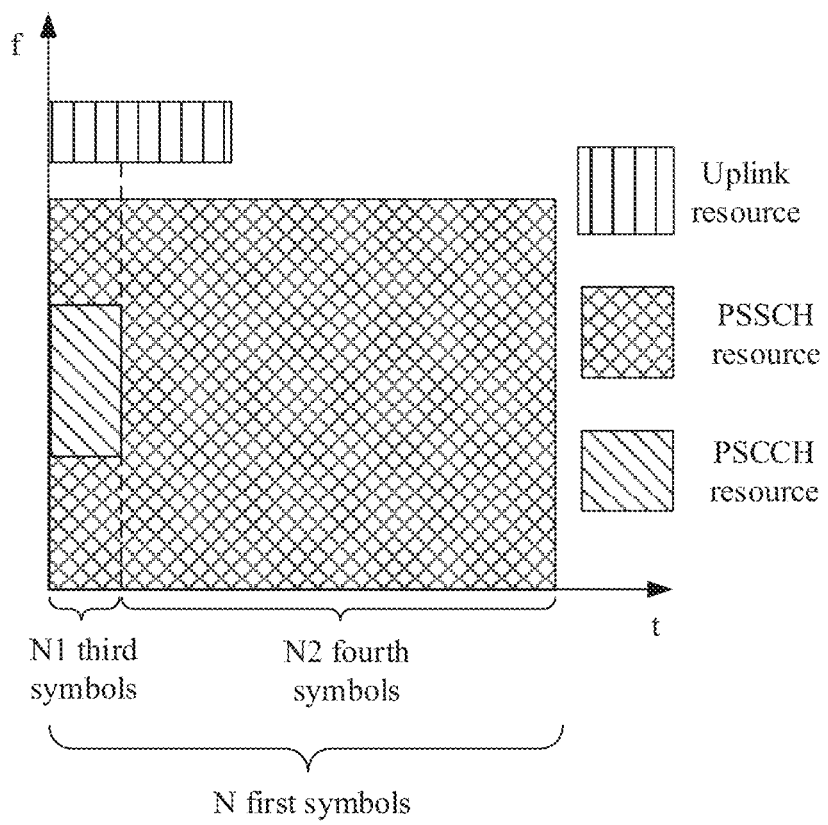

FIG. 10F is a schematic diagram of a further resource overlapping manner according to an embodiment of this application. As shown in FIG. 10F, the uplink resources overlap the N1 third symbols and some of the N2 fourth symbols.

Figure 10G:
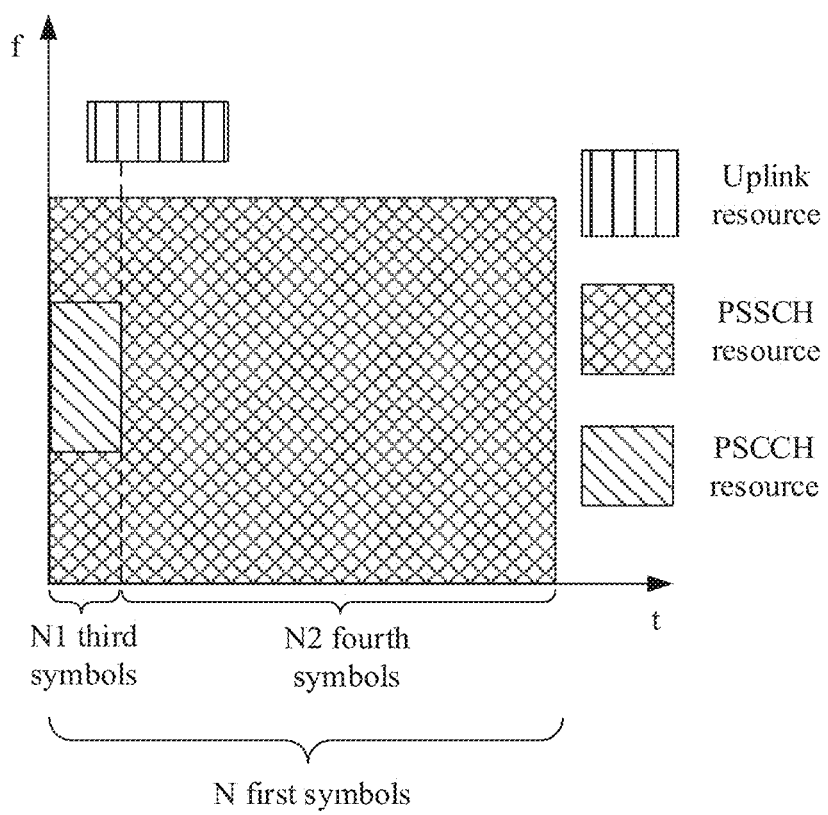

FIG. 10G is a schematic diagram of a still further resource overlapping manner according to an embodiment of this application. As shown in FIG. 10G, the uplink resources overlap some of the N1 third symbols and some of the N2 fourth symbols.

Figure 11A:
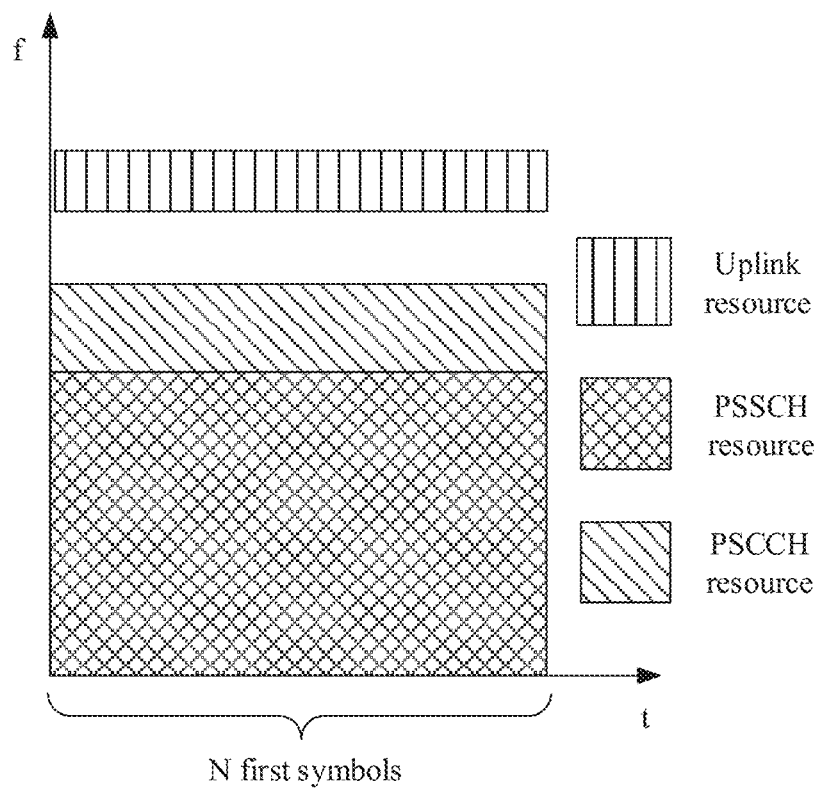
Figure 11B:
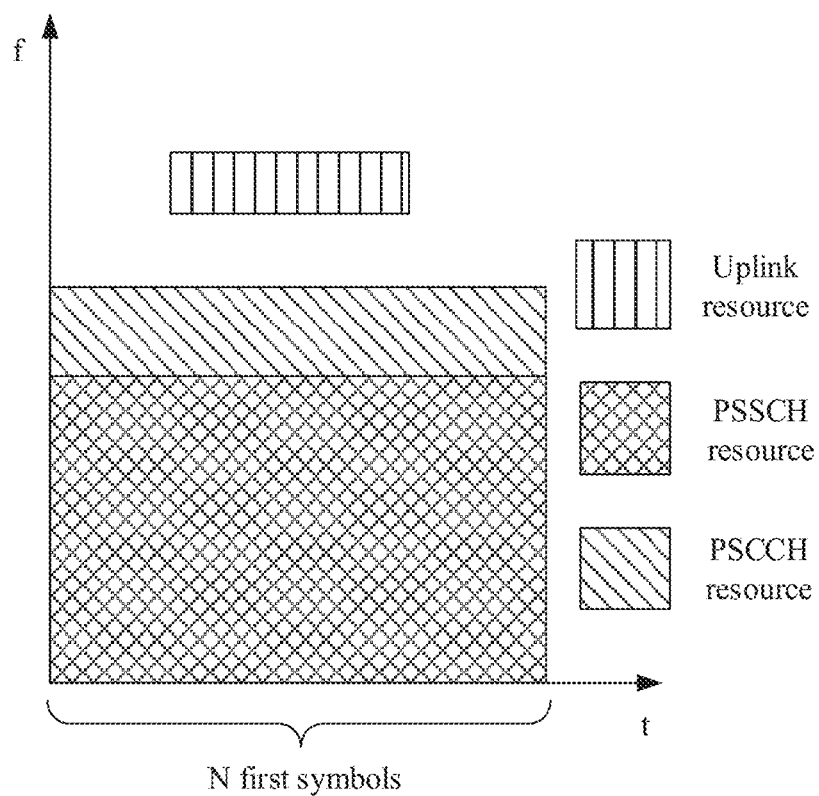

When the manner of multiplexing a PSCCH resource and a PSSCH resource is shown in FIG. 8D, a manner in which the N first symbols (sidelink resources) overlap the uplink resources may be shown in FIG. 11A and FIG. 11B.

FIG. 11A is a schematic diagram of a resource overlapping manner according to an embodiment of this application. As shown in FIG. 11A, the uplink resources overlap all of the N first symbols.

FIG. 11B is a schematic diagram of another resource overlapping manner according to an embodiment of this application. As shown in FIG. 11B, the uplink resources overlap some of the N first symbols.

When the manner of multiplexing a PSCCH resource and a PSSCH resource is shown in FIG. 8E, a manner in which the N first symbols (sidelink resources) overlap the uplink resources is similar to the resource overlapping manner shown in FIG. 11A and FIG. 11B. Details are not described herein again.

Figure 12A:
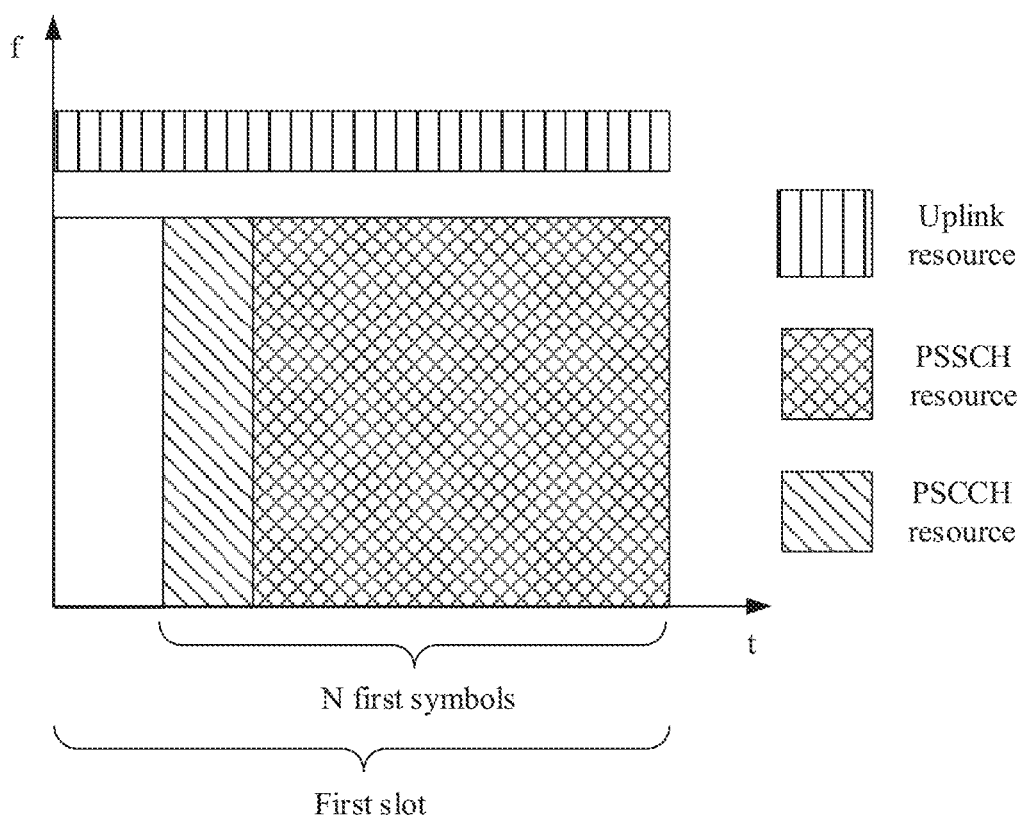
Figure 12B:
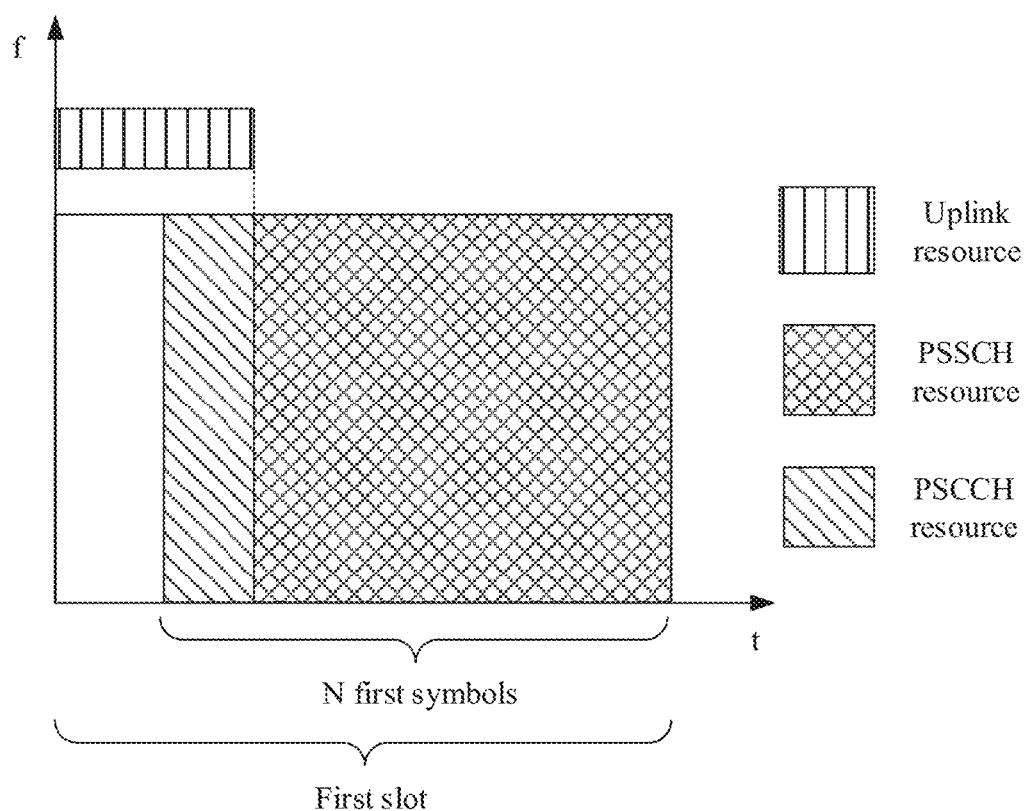
Figure 12C:
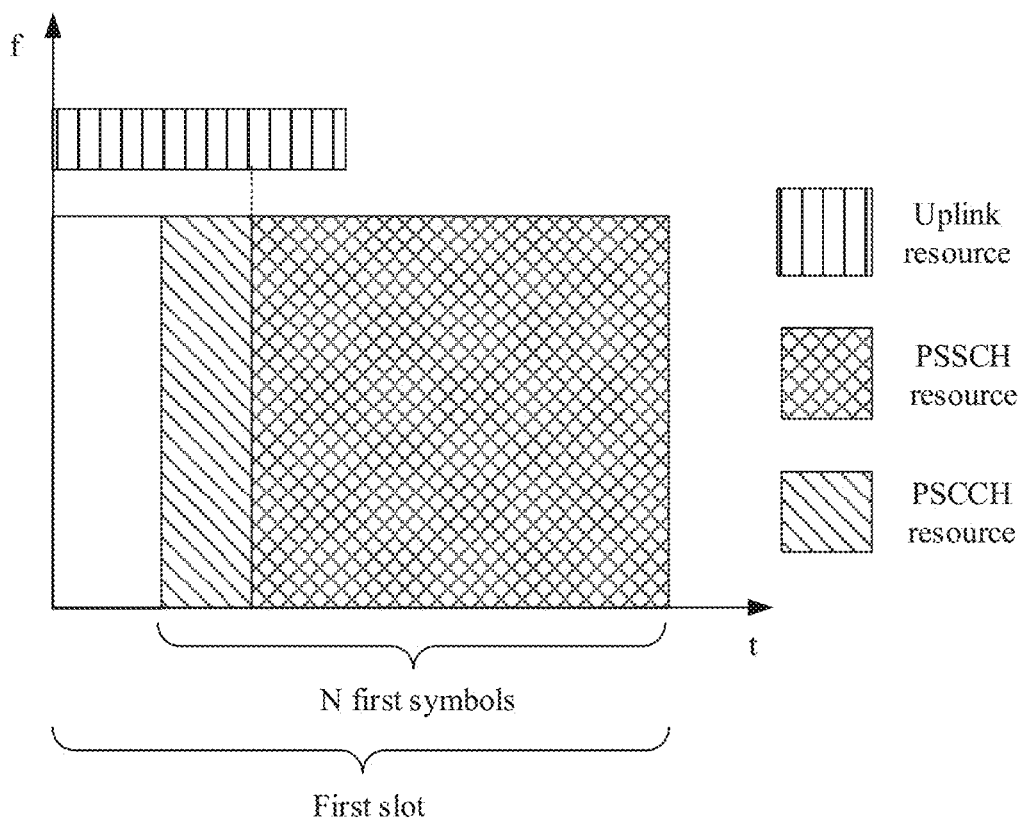

In any example of FIG. 9A to FIG. 9G, FIG. 10A to FIG. 10G, FIG. 11A, and FIG. 11B, the N first symbols may be some symbols in the first slot, or may be all symbols in the first slot. When the N first symbols are some symbols in the first slot, some symbols occupied by the uplink resources may not belong to the N first symbols. With reference to FIG. 12A to FIG. 12C, the following describes several possible resource overlapping manners.

FIG. 12A is a schematic diagram of a resource overlapping manner according to an embodiment of this application. As shown in FIG. 12A, the N first symbols occupy some symbols in the first slot, and the uplink resources occupy all symbols in the first slot.

FIG. 12B is a schematic diagram of another resource overlapping manner according to an embodiment of this application. As shown in FIG. 12B, the N first symbols occupy some symbols in the first slot, the uplink resources occupy some symbols in the first slot, and the uplink resources overlap the symbols occupied by the PSCCH in the N first symbols.

FIG. 12C is a schematic diagram of still another resource overlapping manner according to an embodiment of this application. As shown in FIG. 12C, the N first symbols occupy some symbols in the first slot, the uplink resources occupy some symbols in the first slot, and the uplink resources overlap the first symbols occupied by the PSCCH and some first symbols occupied by the PSSCH in the N first symbols.

FIG. 9A to FIG. 9G, FIG. 10A to FIG. 10G, FIG. 11A, FIG. 11B, and FIG. 12A to FIG. 12C are merely examples of the manner in which the sidelink resources overlap the uplink resources, and are not used to limit the manner in which the sidelink resources overlap the uplink resources. In an actual application process, the manner in which the sidelink resources overlap the uplink resources may be determined according to an actual requirement. This is not specifically limited in this embodiment of this application.

The sidelink transmit power may be obtained through calculation according to a preset formula corresponding to the sidelink. The sidelink transmit power may include first transmit power of the PSCCH and second transmit power of the PSSCH. The first transmit power may be calculated by using a preset formula corresponding to the PSCCH, and the second transmit power may be calculated by using a preset formula corresponding to the PSSCH. There may be one or more pieces of second transmit power. For example, when the manner of multiplexing a PSCCH resource and a PSSCH resource is shown in FIG. 8A, FIG. 8B, FIG. 8D, and FIG. 8E, there is one piece of second transmit power. When the manner of multiplexing a PSCCH resource and a PSSCH resource is shown in FIG. 8C, there are two pieces of second transmit power, and the second transmit power includes fourth transmit power and fifth transmit power. The fourth transmit power is transmit power of the PSSCH on the N1 third symbols, and the fifth transmit power is transmit power of the PSSCH on the N2 fourth symbols.

For example, the first terminal device may calculate the sidelink transmit power according to the preset formula corresponding to the sidelink; or another device may calculate the sidelink transmit power according to the preset formula corresponding to the sidelink, and the first terminal device obtains, from the another device, the sidelink transmit power obtained by the another device through calculation.

The sidelink transmit power may be determined in the following manner. In the following process, an example in which a network device is a base station and a terminal device is UE is used for description.

1. Data Information Transmit Power May be Determined in the Following Manner.

Because the PSSCH is used to transmit data information, the data information transmit power is also referred to as PSSCH transmit power. $P_{PSSCH}$ is used to represent the PSSCH transmit power below.

Example 1: For SL transmission based on a base station scheduling mode, the terminal device may calculate the transmit power of the PSSCH according to the following process:

If power control signaling in sidelink scheduling configured by the base station (or received by the UE) is set to 0 for a PSSCH period i, the $P_{PSSCH}$ meets the following formula:

$$P_{PSSCH} = P_{CMAX,PSSCH}.$$

Alternatively, if power control signaling in sidelink scheduling configured by the base station (or received by the UE) is set to 1 for a PSSCH period i, the $P_{PSSCH}$ meets the following formula:

$$P_{PSSCH} = \min\{P_{CMAX,PSSCH}, 10*\log_{10}(M_{PSSCH}) + P_{O_{PSSCH},1} + \alpha_{PSSCH,1}*PL\}$$

[dBm], where $P_{CMAX,PSSCH}$ is maximum transmit power of PSSCH transmission of the UE, or may be maximum transmit power of sidelink transmission of the UE, and may be configured by using a higher layer parameter: $M_{PSSCH}$ is a bandwidth of a resource that is used to send the PSSCH and that is allocated to the transmit end UE (or a bandwidth of a resource that is used to send the PSSCH, that is allocated to the transmit end UE, and that may be determined by the transmit end UE based on a bandwidth of a PSSCH resource allocated by the base station to the transmit end UE), that is, a bandwidth of a resource occupied by the PSSCH, and may be represented by a quantity of resource blocks; $PL=PL_C$, where $PL_C$ is a path loss on a carrier C; and $P_{O_{PSSCH},1}$ and $\alpha_{PSSCH,1}$ are configured by using higher layer parameters, are associated with PSSCH resource configuration, and may be higher layer parameters sent by the base station or an operator to the UE.

Example 2: For an SL mode autonomously selected by the UE, the transmit end UE may calculate the transmit power of the PSSCH according to the following process:

$$P_{PSSCH} = \min\{P_{CMAX,PSSCH}, 10*\log_{10}(M_{PSSCH}) + P_{O_{PSSCH},2} + \alpha_{PSSCH,2}*PL\}$$

where $P_{CMAX,PSSCH}$ is maximum transmit power of PSSCH transmission of the UE, or may be maximum transmit power of sidelink transmission of the UE, and may be configured by using a higher layer parameter; $M_{PSSCH}$ is a bandwidth of a PSSCH resource allocated to the transmit end UE, that is, a bandwidth of a resource occupied by the PSSCH, and may be represented by a quantity of resource blocks; $PL=PL_C$, where $PL_C$ is a path loss on a carrier C; and $P_{O_{PSSCH},2}$ and $\alpha_{PSSCH,2}$ are configured by using higher layer parameters, are associated with PSSCH resource configuration, and may be higher layer parameters sent by the base station or an operator to the UE.

Example 3: For SL transmission based on a base station scheduling mode, the transmit end UE may calculate the transmit power of the PSSCH according to the following process:

$$P_{PSSCH} = 10\log_{10}\left(\frac{M_{PSSCH}}{M_{PSSCH} + 10^{\frac{3}{10}} \times M_{PSCCH}}\right) +$$
$$\min\left\{P_{CMAX}, 10\log_{10}\left(M_{PSSCH} + 10^{\frac{3}{10}} \times M_{PSCCH}\right) + P_{O\_PSSCH,3} + \alpha_{PSSCH,3} \cdot PL\right\}[\text{dBm}],$$

[dBm], where $P_{CMAX}$ is maximum transmit power of the UE; $M_{PSSCH}$ is a bandwidth of a PSSCH resource allocated to the transmit end UE (or a bandwidth of a resource that is used to send the PSSCH, that is allocated to the transmit end UE, and that may be determined by the transmit end UE based on a bandwidth of a PSSCH resource allocated by the base station to the transmit end UE), that is, a bandwidth of a resource occupied by the PSSCH, and may be represented by a quantity of resource blocks; $PL=PL_C$, where $PL_C$ is a path loss on a carrier C; and $P_{O_{PSSCH},3}$ and $\alpha_{PSSCH,3}$ are configured by using higher layer parameters, are associated with PSSCH resource configuration, and may be higher layer parameters sent by the base station or an operator to the UE.

Example 4: For an SL mode autonomously selected by the UE, the transmit end UE may calculate the transmit power of the PSSCH according to the following process:

$$P_{PSSCH} = 10\log_{10}\left(\frac{M_{PSSCH}}{M_{PSSCH} + 10^{\frac{3}{10}} \times M_{PSCCH}}\right) + A[\text{dBm}],$$

where $P_{CMAX}$ is maximum transmit power of the UE; $M_{PSSCH}$ is a bandwidth of a PSSCH resource allocated to the transmit end UE, that is, a bandwidth of a resource occupied by the PSSCH, and may be represented by a quantity of resource blocks; $PL=PL_C$, where $PL_C$ is a path loss on a carrier C; and $P_{O_{PSSCH},4}$ and $\alpha_{PSSCH,4}$ are configured by using higher layer parameters, are associated with PSSCH resource configuration, and may be higher layer parameters sent by the base station or an operator to the UE.

If a higher layer parameter maxTxpower is configured for the UE, in other words, if the higher layer parameter indicates maximum transmit power of the UE, $A=\min\{P_{CMAX}, P_{MAX\_CBR}, 10\log_{10}(M_{PSSCH}+10^{3/10} \times M_{PSCCH})+P_{O\_PSSCH,4}+\alpha_{PSSCH,4} \cdot PL\}$. If a higher layer parameter maxTxpower is not configured for the UE, $A=\min\{P_{CMAX}, 10\log_{10}(M_{PSSCH}+10^{3/10} \times M_{PSCCH})+P_{O\_PSSCH,4}+\alpha_{PSSCH,4} \cdot PL\}$, where $P_{MAX\_CBR}$ is a value that may be set to maxTxpower based on a PSSCH priority level and a measured channel busy ratio (CBR) interval, and a CBR may be a ratio of resources whose signal power exceeds a threshold in available resources to the total available resources in a specific time.

2. SA Transmit Power May be Determined in the Following Manner.

Because SA is sent on the PSCCH, the SA transmit power may also be referred to as PSCCH transmit power.

Example 1: For SL transmission based on a base station scheduling mode, the transmit end UE may calculate the transmit power of the PSCCH according to the following process:

If a power control signaling field in sidelink scheduling configured by the base station (or received by the UE) is set to 0 for a PSCCH period i, $P_{PSCCH}=P_{CMAX,PSCCH}$.

Alternatively, if a power control signaling field in sidelink scheduling configured by the base station (or received by the UE) is set to 1 for a PSCCH period i, $P_{PSCCH}=\min\{P_{CMAX,PSCCH}, 10*\log_{10}(M_{PSCCH})+P_{O\_PSCCH,1}+\alpha_{PSCCH,1}*PL\}$

[dBm], where $P_{CMAX,PSCCH}$ is maximum transmit power of PSCCH transmission of the UE, or may be maximum transmit power of sidelink transmission of the UE, and may be configured by using a higher layer parameter; $M_{PSCCH}=1$; $PL=PL_C$, where $PL_C$ is a path loss on a carrier C; and $P_{O_{PSCCH},1}$ and $\alpha_{PSCCH,1}$ are configured by using higher layer parameters, are associated with PSCCH resource configuration, and may be higher layer parameters sent by the base station or an operator.

Example 2: For an SL mode autonomously selected by the UE, the transmit end UE may calculate the transmit power of the PSCCH according to the following process:

$P_{PSCCH}=\min\{P_{CMAX,PSCCH}, 10*\log_{10}(M_{PSCCH})+P_{O\_PSCCH,2}+\alpha_{PSCCH,2}*PL\}$

[dBm], where $P_{CMAX,PSCCH}$ is maximum transmit power of PSCCH transmission of the UE, or may be maximum transmit power of sidelink transmission of the UE, and may be configured by using a higher layer parameter; $M_{PSCCH}=1$; $PL=PL_C$, where $PL_C$ is a path loss on a carrier C; and $P_{O_{PSCCH},2}$ and $\alpha_{PSCCH,2}$ are configured by using higher layer parameters, are associated with PSCCH resource configuration, and may be higher layer parameters sent by the base station or an operator.

Example 3: For SL transmission based on base station scheduling, because in vehicle-to-everything (V2X), a PSSCH and a PSCCH are based on frequency division, power of the PSSCH needs to be considered when power of the PSCCH is determined. The transmit end UE may calculate the transmit power of the PSCCH according to the following process:

$$P_{PSSCH} = 10\log_{10}\left(\frac{10^{\frac{3}{10}} \times M_{PSSCH}}{M_{PSSCH} + 10^{\frac{3}{10}} \times M_{PSCCH}}\right) +$$
$$\min\left\{P_{CMAX}, 10\log_{10}\left(M_{PSSCH} + 10^{\frac{3}{10}} \times M_{PSCCH}\right) + P_{O\_PSSCH,3} + \alpha_{PSCCH,3} \cdot PL\right\}$$

[dBm], where $P_{CMAX}$ is maximum transmit power of the UE; $M_{PSSCH}$ is a bandwidth of a PSSCH resource allocated to the transmit end UE (or a bandwidth of a resource that is used to send the PSSCH, that is allocated to the transmit end UE, and that may be determined by the transmit end UE based on a bandwidth of a PSSCH resource allocated by the base station to the transmit end UE), that is, a bandwidth of a resource occupied by the PSSCH, and may be represented by a quantity of resource blocks; $M_{PSCCH}=2$; $PL=PL_C$, where $PL_C$ is a path loss on a carrier C; and $P_{O\_PSSCH,3}$ and $\alpha_{PSSCH,3}$ are configured by using higher layer parameters, are associated with PSSCH resource configuration, and may be higher layer parameters sent by the base station or an operator.

Example 4: For an SL mode autonomous selected by the UE, the transmit end UE may calculate the transmit power of the PSCCH according to the following process:

$$P_{PSSCH} = 10\log_{10}\left(\frac{10^{\frac{3}{10}} \times M_{PSSCH}}{M_{PSSCH} + 10^{\frac{3}{10}} \times M_{PSCCH}}\right) + B[dBm],$$

where $P_{CMAX}$ is maximum transmit power of PSSCH transmission; $M_{PSSCH}$ is a bandwidth of a PSSCH resource allocated to the transmit end UE, that is, a bandwidth of a resource occupied by the PSSCH, and may be represented by a quantity of resource blocks; $M_{PSCCH}=2$; $PL=PL_C$, where $PL_C$ is a path loss on a carrier C; and $P_{O\_PSSCH,4}$ and $\alpha_{PSSCH,4}$ are configured by using higher layer parameters, are associated with PSSCH resource configuration, and may be higher layer parameters sent by the base station or an operator.

If a higher layer parameter maximum transmit power (maxTxpower) is configured for the UE, in other words, if the higher layer parameter indicates maximum transmit power of the UE, $B=\min\{P_{CMAX}, P_{MAX\_CBR}, 10\log_{10}(M_{PSSCH}+10^{3/10} \times M_{PSCCH})+P_{O\_PSSCH,4}+\alpha_{PSSCH,4} \cdot PL\}$ If a higher layer parameter is not configured for the UE, $B=\min\{P_{CMAX}, 10\log_{10}(M_{PSSCH}+10^{3/10} \times M_{PSCCH})+P_{O\_PSSCH,4}+\alpha_{PSSCH,4} \cdot PL\}$ $P_{MAX\_CBR}$ is a value that may be set to maxTxpower based on a PSSCH priority level and a measured CBR (channel busy ratio) interval. In this step, both the obtained sidelink transmit power and the obtained uplink transmit power are less than or equal to the maximum transmit power of the first terminal device. In addition, total transmit power on any symbol is less than or equal to the maximum transmit power. For example, when the manner of multiplexing a PSCCH resource and a PSSCH resource is shown in FIG. 8A and FIG. 8B, both the obtained sidelink transmit power and the obtained uplink transmit power are less than or equal to the maximum transmit power. When the manner of multiplexing a PSCCH resource and a PSSCH resource is shown in FIG. 8C, a sum of the first transmit power and the fourth transmit power is less than or equal to the maximum transmit power, and the fifth transmit power is less than or equal to the maximum transmit power. When the manner of multiplexing a PSCCH resource and a PSSCH resource is shown in FIG. 8D and FIG. 8E, a sum of the first transmit power and the second transmit power is less than or equal to the maximum transmit power.

Optionally, in this embodiment of this application, the maximum transmit power of the terminal device may be maximum transmit power of uplink transmission of the terminal device, and/or maximum transmit power of sidelink transmission of the terminal device, and/or maximum transmit power of total transmission of the terminal device.

The maximum transmit power of the uplink transmission of the terminal device may be that transmit power of the uplink transmission cannot be greater than the maximum transmit power of the uplink transmission when the terminal device performs the uplink transmission.

The maximum transmit power of the sidelink transmission of the terminal device may be that transmit power of the sidelink transmission cannot be greater than the maximum transmit power of the sidelink transmission when the terminal device performs the sidelink transmission.

The maximum transmit power of the total transmission of the terminal device may be that total transmit power cannot be greater than the maximum transmit power of the total transmission when the terminal device performs transmission. For example, when the terminal device performs both sidelink transmission and uplink transmission, total transmit power of the sidelink transmission and the uplink transmission cannot be greater than maximum transmit power of the total transmission. In other words, a power sum of the sidelink transmission and the uplink transmission cannot be greater than the maximum transmit power of the total transmission.

Optionally, in this embodiment of this application, the maximum transmit power of the terminal device may be a capability of the terminal device, and the terminal device may report the capability to the network device.

Optionally, in this embodiment of this application, the maximum transmit power of the terminal device may be notified by the network device to the terminal device by using signaling, and transmit power of the terminal device during transmission cannot be greater than the maximum transmit power notified by the network device to the terminal device by using the signaling.

Optionally, the uplink transmit power may be obtained through calculation according to a preset formula corresponding to the uplink.

For example, the first terminal device may calculate the uplink transmit power according to the preset formula corresponding to the uplink; or another device may calculate the uplink transmit power according to the preset formula corresponding to the uplink, and the first terminal device obtains, from the another device, the uplink transmit power obtained by the another device through calculation.

The uplink transmit power may be determined in the following manner. In the following process, an example in which a network device is a base station and a terminal device is UE is used for description.

1. Data Information Transmit Power May be Determined in the Following Manner.

Because uplink information is transmitted on the PUSCH and/or the PUCCH, the uplink information transmit power may also be referred to as PUSCH transmit power and/or PUCCH transmit power.

Example 1: Calculate the PUSCH Transmit Power

If the UE transmits the PUSCH on an activated uplink $BWP^b$ of a carrier f of a serving cell c, an identifier of a parameter set configuration is j, and an identifier of a PUSCH power control adjustment state is 1, PUSCH transmit power $P_{PUSCH,b,f,c}$ (i, j, $q_d$, 1) of the UE at a PUSCH transmission moment i is:

$$P_{PUSCH,b,f,c}(i, j, q_d, l) = \min\left\{\begin{array}{l}P_{CMAX,f,c}(i), \\ P_{O\_PUSCH,b,f,c}(j) + 10\log_{10}\left(2^{\mu} \cdot M_{RB,b,f,c}^{PUSCH}(i)\right) + \\ \alpha_{b,f,c}(j) \cdot PL_{b,f,c}(q_d) + \Delta_{TF,b,f,c}(i) + f_{b,f,c}(i, l)\end{array}\right\}[dBm].$$

$P_{CMAX,f,c}(i)$ is configured maximum transmit power of the UE on the carrier f of the serving cell c at the PUSCH transmission moment i; and $P_{O\_PUSCH,b,f,c}(j)$ is a sum of $P_{O\_NOMINAL\_PUSCH,f,c}(j)$ and $P_{O\_UE\_PUSCH,b,f,c}(j)$, where $j \in \{0, 1, \ldots, J-1\}$. For the carrier f of the serving cell c, if the base station does not notify the UE of a higher layer parameter P0-PUSCH-AlphaSet, j=0, $P_{O\_UE\_PUSCH,b,f,c}(0)=0$, and $P_{O\_NOMINAL\_PUSCH,f,c}(0)=P_{O\_PRE}+\Delta_{PREAMBLE\_Msg3}$, where a higher layer parameter preambleReceivedTargetPower is used to determine $P_{O\_PRE}$, and a higher layer parameter msg3-DeltaPreamble is used to determine $\Delta_{PREAMBLE\_Msg3}$.

For the carrier f of the serving cell c, and for $j=\{2, \ldots, J-1\}=s_J$, if the base station provides the UE with a parameter p0-NominalWithGrant, a value of $P_{O\_NOMINAL\_PUSCH,f,c}(j)$ may be applied to all $j \in s_J$; or if the parameter is not provided, $P_{O\_NOMINAL\_PUSCH,f,c}(j)=P_{O\_NOMINAL\_PUSCH,f,c}(0)$. If a group of values of $P_{O\_UE\_PUSCH,b,f,c}(j)$ is a group of p0 values in the parameter P0-PUSCH-AlphaSet, the parameter is indicated by using p0-PUSCH-AlphaSetId on the activated uplink $BWP^b$ of the carrier f of the serving cell c.

For $\alpha_{b,f,c}(j)$, and for j=0, $\alpha_{b,f,c}(0)$ is a value of a parameter msg3-Alpha if the base station notifies the UE of the parameter; otherwise, $\alpha_{b,f,c}(0)=1$. For j=1, $\alpha_{b,f,c}(1)$ is a value of alpha obtained from a parameter p0-PUSCH-Alpha, and the parameter is a parameter that is in a parameter set on the activated uplink $BWP^b$ of the carrier f of the serving cell c and that corresponds to the identifier P0-PUSCH-AlphaSetId in ConfiguredGrantConfig configured by the base station for the UE.

For $j \in s_J$, a group of values of the parameter $\alpha_{b,f,c}(j)$ are determined by using the parameter alpha that is in the parameter set P0-PUSCH-AlphaSet on the activated uplink $BWP^b$ of the carrier f of the serving cell c and that corresponds to the identifier P0-PUSCH-AlphaSetId configured by the base station for the UE.

$M_{RB,b,f,c}^{PUSCH}(i)$ is a bandwidth allocated to the PUSCH resource at the PUSCH transmission moment on the activated $BWP^b$ of the carrier f of the serving cell c, and may be identified as a quantity of resource block (RBs); and $\mu$ is a subcarrier spacing configuration.

$PL_{b,f,c}(q_d)$ is a downlink path loss in a unit of dB, and is obtained by the UE through calculation based on a reference signal identifier $q_d$ on an activated DL BWP of the serving cell c. A downlink reference signal may be an SS/PBCH (synchronization signal/physical broadcast channel), a CSI-RS (channel state information reference signal), or the like.

When $K_s=1.25$, $\Delta_{TF,b,f,c}(i)=10 \log_{10}((2^{BPRE \cdot K_s}-1) \cdot \beta_{offset}^{PUSCH})$; or when $K_s=0$, $\Delta_{TF,b,f,c}(i)=0$, where $K_s$ is determined by a parameter deltaMCS configured by the base station. If a quantity of layers transmitted by the PUSCH is greater than 1, $\Delta_{TF,b,f,c}(i)=0$. On the activated uplink $BWP^b$ of the carrier f of the serving cell c, BPRE and $\beta_{offset}^{PUSCH}$ are calculated as follows:

When the PUSCH includes uplink data, $$BPRE = \sum_{r=0}^{C-1} K_r / N_{RE}.$$

When the PUSCH does not include uplink data but includes a CSI feedback, $BPRE=Q_m \cdot R/X$, where a value of X ranges from 1 to $\beta_{offset}^{CSI,1}$.

Herein, c is a quantity of code blocks, $K_r$ is a size of a code block r, $N_{RE}$ is a quantity of resource elements, and $$N_{RE} = M_{RB,b,f,c}^{PUSCH}(i) \cdot \sum_{j=0}^{N_{symb,b,f,c}^{PUSCH}(i)-1} N_{sc,data}^{RB}(i, j)$$

is determined according to the following, where $N_{symb,b,f,c}^{PUSCH}(i)$ is a quantity of PUSCH symbols on the activated uplink $BWP^b$ of the carrier f of the serving cell c at the PUSCH transmission moment i, and $N_{sc,data}^{RB}(i, j)$ is a quantity $0 \leq j < N_{symb,b,f,c}^{PUSCH}(i)$ of subcarriers excluding DMRS (demodulation reference signal) subcarriers and PTRS (phase-tracking RS) subcarriers on the PUSCH symbol j.

When the PUSCH includes uplink data, $\beta_{offset}^{PUSCH}=1$. When the PUSCH does not include uplink data but includes a CSI feedback, $\beta_{offset}^{PUSCH}=\beta_{offset}^{CSI,1}$. $Q_m$ is a modulation order, and R is a target code rate, and may be obtained through an indication in DCI. On the activated uplink $BWP^b$ of the carrier f of the serving cell c, the PUSCH power control adjustment state $f_{b,f,c}(i, 1)$ at the PUSCH transmission moment i is described below.

$\delta_{PUSCH,b,f,c}(i, 1)$ is a power control command field value (a TPC command value) in DCI scheduling at the PUSCH transmission moment i on the activated uplink $BWP^b$ of the carrier f of the serving cell c. If the base station sends a higher layer parameter twoPUSCH-PC-AdjustmentStates to the UE, $1 \in \{0, 1\}$; otherwise, 1=0. If the UE is not configured with a higher layer parameter tpc-Accumulation, $$f_{b,f,c}(i, 1) = f_{b,f,c}(i - i_0, 1) + \sum_{m=0}^{C(D_i)-1} \delta_{PUSCH,b,f,c}(m, 1)$$

is a PUSCH power control adjustment state 1 at the PUSCH transmission moment i on the activated uplink $BWP^b$ of the carrier f of the serving cell c, where a value of $\delta_{PUSCH,b,f,c}$ is determined by using Table 1, and $$\sum_{m=0}^{C(D_i)-1} \delta_{PUSCH,b,f,c}(m, 1)$$

is a sum of power control command field values. On the activated uplink $BWP^b$ of the carrier f of the serving cell c, if the UE has reached the maximum transmit power of the UE at a PUSCH transmission moment $i-i_0$, and $$\sum_{m=0}^{C(D_i)-1} \delta_{PUSCH,b,f,c}(m, 1) \geq 0,$$

$f_{b,f,c}(i, 1)=f_{b,f,c}(i-i_0, 1)$. Alternatively, on the activated uplink $BWP^b$ of the carrier f of the serving cell c, if the UE has reached the maximum transmit power of the UE at a PUSCH transmission moment $i-i_0$, and $$\sum_{m=0}^{C(D_i)-1} \delta_{PUSCH,b,f,c}(m, 1) \leq 0,$$

$f_{b,f,c}(i, 1)=f_{b,f,c}(i-i_0, 1)$. On the activated uplink $BWP^b$ of the carrier f of the serving cell c, the UE resets an accumulated value of the PUSCH power control adjustment state 1 to $f_{b,f,c}(0, 1)=0$. It is assumed that the base station provides a value of a parameter $P_{O\_UE\_PUSCH,b,f,c}(j)$ for the UE through a higher layer. It is assumed that the base station provides a value of a parameter $\alpha_{b,f,c}(j)$ for the UE through a higher layer. If the UE is configured with the higher layer parameter tpc-Accumulation, $f_{b,f,c}(i, 1)=\delta_{PUSCH,b,f,c}(i, 1)$ is the PUSCH power control adjustment state at the PUSCH transmission moment i on the activated uplink $BWP^b$ of the carrier f of the serving cell c. $\delta_{PUSCH,b,f,c}$ is an absolute value in Table 3.

TABLE 3

Correspondence between a power control command field value and an absolute value or an accumulated value (a value of $\delta_{PUSCH, b, f, c}$ or $\delta_{SRS, b, f, c}$) in DCI

| Transmit power control command field (TPC Command Field) | Accumulated value (Accumulated $\delta_{PUSCH, b, f, c}$ or $\delta_{SRS, b, f, c}$ [dB]) | Absolute value (Absolute $\delta_{PUSCH, b, f, c}$ or $\delta_{SRS, b, f, c}$ [dB]) |
| --- | --- | --- |
| 0 | −1 | −4 |
| 1 | 0 | −1 |
| 2 | 1 | 1 |
| 3 | 3 | 4 |

Example 2: Calculate the Transmit Power of the PUCCH

If the UE transmits the PUCCH on the activated uplink $BWP^b$ of the carrier f of the serving cell c, the UE determines the PUCCH transmit power at a PUCCH transmission moment by using an identifier I of a PUCCH power control adjustment state, which is shown below:

$$P_{PUSCH,b,f,c}(i, q_u, q_d, l) = \min \begin{cases} P_{CMAX,f,c}(i), \\ P_{O\_PUSCH,b,f,c}(q_u) + 10\log_{10}(2^\mu \cdot M_{RB,b,f,c}^{PUSCH}(i)) + \\ PL_{b,f,c}(q_d) + \Delta_{F\_PUCCH}(F) + \Delta_{TF,b,f,c}(i) + g_{b,f,c}(i, l) \end{cases} [dBm].$$

$P_{CMAX,f,c}(i)$ is configured maximum transmit power of the UE at the PUCCH transmission moment i on the carrier f of the serving cell c.

$P_{O\_PUCCH,b,f,c}(q_u)$ is a sum of two parts. The first part is $P_{O\_NOMINAL,\ PUCCH}$. If the base station provides a parameter p0-nominal for the UE, the provided parameter is a value of the parameter; otherwise, $P_{O\_NOMINAL\_PUCCH}=0$ dBm. For the second part, on the activated uplink $BWP^b$ of the carrier f of the serving cell c, if the base station provides a parameter p0-PUCCH-Value for the UE, the provided parameter is a value of a parameter $P_{O\_UE\_PUCCH}(q_u)$, where $0 \le q_u < Q_u$, $Q_u$ is a size of a value set of $P_{O\_UE\_PUCCH}$, and may be provided by using a parameter maxNrofPUCCH-P0-PerSet, and a value of $P_{O\_UE\_PUCCH}$ is determined by using a parameter p0-Set. If the parameter p0-Set is not configured for the UE, $P_{O\_UE\_PUCCH}(q_u)=0$, where $0 \le q_u < Q_u$.

$M_{RB,b,f,c}^{PUCCH}(i)$ is a bandwidth allocated to the PUCCH resource at the PUCCH transmission moment i on the activated uplink $BWP^b$ of the carrier f of the serving cell c, and may be represented by a quantity of RBs.

$PL_{b,f,c}(q_d)$ is a downlink path loss in a unit of dB, in other words, is obtained by the UE through calculation based on a downlink reference signal resource identifier $q_d$ on an activated downlink BWP of the carrier f of the serving cell c. A downlink reference signal may be an SS/PBCH, a CSI-RS, or the like.

For a parameter $\Delta_{F\_PUCCH}(F)$, if the parameter is in a PUCCH format 0, the parameter is determined based on a higher layer parameter deltaF-PUCCH-f0. If the parameter is in a PUCCH format 1, the parameter is determined based on a higher layer parameter deltaF-PUCCH-f1. If the parameter is in a PUCCH format 2, the parameter is determined based on a higher layer parameter deltaF-PUCCH-f2. If the parameter is in a PUCCH format 3, the parameter is determined based on a higher layer parameter deltaF-PUCCH-f3. If the parameter is in a PUCCH format 4, the parameter is determined based on a higher layer parameter deltaF-PUCCH-f4. The higher layer parameter is sent by the base station to the UE.

$\Delta_{TF,b,f,c}(i)$ is a PUCCH transmit power adjustment component on the activated uplink $BWP^b$ of the carrier f of the serving cell c.

For the PUCCH format 0 or the PUCCH format 1, a value of a parameter for PUCCH transmission is $$\Delta_{TF,b,f,c}(i) = 10\log_{10}\left(\frac{N_{ref}^{PUCCH}}{N_{symb}^{PUCCH}(i)}\right) + \Delta_{UCI}(i).$$

$N_{symb}^{PUCCH}(i)$ is a quantity of symbols in the PUCCH format 0 or the PUCCH format 1. For the PUCCH format 0, $N_{ref}^{PUCCH}=2$. For the PUCCH format 1, $N_{ref}^{PUCCH}=N_{symb}^{slot}$. For the PUCCH format 0, $\Delta_{UCI}(i)=0$. For the PUCCH format 1, $\Delta_{UCI}(i)=10\log_{10}(O_{UCI}(i))$. $O_{UCI}(i)$ is a quantity of bits of UCI at the PUCCH transmission moment i.

For the PUCCH format 2 or the PUCCH format 3, if the quantity of bits of the UCI is less than or equal to 11, $\Delta_{TF,b,f,c}(i)=10\log_{10}(K_1 \cdot (n_{HARQ-ACK}(i)+O_{SR}(i)+O_{CSI}(i))/N_{RE}(i))$, where $K_1=6$;

$n_{HARQ-ACK}(i)$ is a quantity of bits of HARQ-ACK information;

$O_{SR}(i)$ is a quantity of bits of SR (scheduling request) information;

$O_{CSI}(i)$ is a quantity of bits of CSI information; and $N_{RE}(i)$ is a quantity of resource elements determined by the UE, and is determined as follows: on the activated uplink $BWP^b$ of the carrier f of the serving cell c, $N_{RE}(i)=M_{RB,b,f,c}^{PUCCH}(i) \cdot N_{sc,ctrl}^{RB}(i) \cdot N_{symb-UCI,b,f,c}^{PUCCH}(i)$, where $N_{sc,ctrl}^{RB}(i)$ is a quantity of subcarriers excluding subcarriers used for DMRS transmission in each resource block, and $N_{symb-UCI,b,f,c}^{PUCCH}(i)$ is a quantity of symbols excluding symbols used for DMRS transmission.

For the PUCCH format 2, the PUCCH format 3, or the PUCCH format 4 and for a quantity of UCI bits that is greater than 11, $\Delta_{TF,b,f,c}(i)=10\log_{10}(2^{K_2 \cdot BPRE(i)}-1)$, where $K_2=2.4$;

$BPRE(i)=(O_{ACK}(i)+O_{SR}(i)+O_{CSI}(i)+O_{CRC}(i))/N_{RE}(i)$;

$O_{ACK}(i)$ is a quantity of bits of HARQ-ACK information;

$O_{SR}(i)$ is a quantity of bits of SR (scheduling request) information;

$O_{CSI}(i)$ is a quantity of bits of CSI information;

$O_{CRC}(i)$ is a quantity of CRC (cyclic redundancy check) information bits; and $N_{RE}(i)$ is a quantity of resource elements determined by the UE, and is determined as follows: on the activated uplink $BWP^b$ of the carrier f of the serving cell c, $N_{RE}(i) = M_{RB,b,f,c}^{PUCCH}(i) \cdot N_{sc,ctrl}^{RB}(i) \cdot N_{symb-UCI,b,f,c}^{PUCCH}(i)$, where $N_{sc,ctrl}^{RB}(i)$ is a quantity of subcarriers excluding subcarriers used for DMRS transmission in each resource block, and $N_{symb-UCI,b,f,c}^{PUCCH}(i)$ is a quantity of symbols excluding symbols used for DMRS transmission.

On the activated uplink $BWP^b$ of the carrier f of the serving cell c, the PUCCH power control adjustment state $g_{b,f,c}(i, 1)$ in scheduling at the PUCCH transmission moment l is described below.

$\delta_{PUCCH,b,f,c}(i, 1)$ is a power control command field value (a TPC command value) in DCI scheduling at the PUCCH transmission moment i on the activated uplink $BWP^b$ of the carrier f of the serving cell c.

If the base station sends a higher layer parameter two-PUSCH-PC-AdjustmentStates to the UE, $l \in \{0, 1\}$; otherwise, $l=0$.

$$g_{b,f,c}(i, 1) = g_{b,f,c}(i - i_0, 1) + \sum_{m=0}^{C(C_i)-1} \delta_{PUCCH,b,f,c}(m, 1)$$

is the current PUCCH power control adjustment state 1 in scheduling at the PUCCH transmission moment i on the activated uplink $BWP^b$ of the carrier f of the serving cell c.

A value of $\delta_{PUCCH,b,f,c}$ is determined by using Table 4.

$$\sum_{m=0}^{C(C_i)-1} \delta_{PUCCH,b,f,c}(m, 1)$$

is a sum of power control command field values. On the activated uplink $BWP^b$ of the carrier f of the serving cell c, if the UE has reached the maximum transmit power of the UE at the PUCCH transmission moment $i-i_0$, and $$\sum_{m=0}^{C(C_i)-1} \delta_{PUCCH,b,f,c}(m, 1) \geq 0,$$

$g_{b,f,c}(i,1) = g_{b,f,c}(i-i_0,1)$. Alternatively, on the activated uplink $BWP^b$ of the carrier f of the serving cell c, if the UE has reached the maximum transmit power of the UE at the PUCCH transmission moment $i-i_0$, and $$\sum_{m=0}^{C(C_i)-1} \delta_{PUCCH,b,f,c}(m, 1) \leq 0,$$

$g_{b,f,c}(i, 1) = g_{b,f,c}(i-i_0, 1)$.

On the activated uplink $BWP^b$ of the carrier f of the serving cell c, if the base station configures a value of a parameter $P_{O\_PUCCH,b,f,c}(q_u)$ for the UE through a higher layer, $g_{b,f,c}(0,1) = 0$;

otherwise, $g_{b,f,c}(0,1) = \Delta_{rampup,b,f,c} + \delta_{msg2,b,f,c}$, where $\delta_{msg2,b,f,c}$ is a power control command field value that is used for PRACH (physical random access channel) transmission on the activated uplink $BWP^b$ of the carrier f of the serving cell c and that corresponds to a corresponding permission in random access.

In addition, if the UE transmits the PUCCH, $$\Delta P_{rampap,b,f,c} = \min\left[\max\left(\begin{array}{c} 0, \\ P_{CMAX,f,c} - (P_{O\_PUCCH,b,f,c} + PL_{b,f,c}(q_d) + \\ \Delta_{F\_PUCCH}(F) + \Delta_{TF,b,f,c} + \delta_{msg2,b,f,c}) \end{array}\right), \Delta P_{rampuprequested,b,f,c}\right];$$

otherwise, $$\Delta P_{rampap,b,f,c} = \min\left[\max\left(\begin{array}{c} 0, \\ P_{CMAX,f,c} - (P_{O\_PUCCH,b,f,c} + PL_{b,f,c}(q_d)) \end{array}\right), \Delta P_{rampuprequested,b,f,c}\right],$$

where $\Delta P_{rampuprequested,b,f,c}$ is provided by using a higher layer parameter and corresponds to total power of power ramping of transmission from a first sequence to a last sequence, and $\Delta_{F\_PUCCH}(F)$ corresponds to the PUCCH format 0 or the PUCCH format 1.

TABLE 4

Correspondence between a power control command field value and an accumulated value (a value of $\delta_{PUCCH, b, f, c}$) in DCI

| Transmit power control command field (TPC Command Field) | Accumulated value (Accumulated $\delta_{PUCCH, b, f, c}$) [dB] |
|---|---|
| 0 | −1 |
| 1 | 0 |
| 2 | 1 |
| 3 | 3 |

In this step, the obtained uplink transmit power is less than or equal to the maximum transmit power.

S702: The first terminal device determines actual transmit power of the sidelink in the first slot based on the sidelink transmit power, the uplink transmit power, and the maximum transmit power.

The actual transmit power of the sidelink is constant on the N first symbols. The maximum transmit power is maximum transmit power supported by the terminal device.

Optionally, actual transmit power of the uplink may be further determined, and a sum of the actual transmit power of the sidelink and the actual transmit power of the uplink is less than or equal to the maximum transmit power.

Optionally, the actual transmit power of the sidelink may be 0. In this case, it indicates that no sidelink signal is sent.

Optionally, the actual transmit power of the uplink may be 0. In this case, it indicates that no uplink signal is sent.

For example, when the actual transmit power of the sidelink is less than or equal to A times of the sidelink transmit power, or when the actual transmit power of the sidelink is greater than or equal to C times of the sidelink transmit power, the actual transmit power of the sidelink may be 0, where A is a number less than or equal to 1, and C is a number greater than 1. In other words, when a degree of scaling the actual transmit power of the sidelink is excessively large, receiving performance is relatively poor if power of transmitting a sidelink signal is relatively small. In this case, the sidelink signal may not be sent.

For example, when the actual transmit power of the uplink is less than or equal to B times of the uplink transmit power, or when the actual transmit power of the sidelink is greater than or equal to D times of the sidelink transmit power, the actual transmit power of the uplink may be 0, where B is a number less than or equal to 1, and D is a number greater than 1. In other words, when a degree of scaling the actual transmit power of the uplink is excessively large, receiving performance is relatively poor if power of transmitting an uplink signal is relatively small. In this case, the uplink signal may not be sent.

A value of A and/or a value of B may be predefined, or may be notified by the network device to the terminal device by using signaling, or may be determined in another manner. Specifically, this is not limited in this application.

Optionally, the sidelink transmit power may include first transmit power and second transmit power, the first transmit power is transmit power of a first channel of the sidelink, and the second transmit power is transmit power of a second channel of the sidelink.

An example in which the first channel is a PSCCH and the second channel is a PSSCH is used below to describe the solution. This is similar to another case. Details are not described again.

The actual transmit power of the sidelink in the first slot may be determined in the following two possible implementations:

In a possible implementation, the sidelink transmit power includes first transmit power of the PSCCH and second transmit power of the PSSCH. Third transmit power of the sidelink in the first slot is determined based on the first transmit power and the second transmit power; and the actual transmit power is determined based on the third transmit power, the uplink transmit power, and the maximum transmit power. The third transmit power of the sidelink is constant on the N first symbols.

In this possible implementation, the third transmit power is first determined based on the first transmit power and the second transmit power, so that the third transmit power is constant on the N first symbols; and then the actual transmit power of the sidelink is determined based on the third transmit power and the maximum transmit power, so that the sum of the actual transmit power of the sidelink and the actual transmit power of the uplink is less than or equal to the maximum transmit power. In this way, not only the actual transmit power of the sidelink may be constant on the N first symbols, but also the sum of the actual transmit power of the sidelink and the actual transmit power of the uplink may be less than or equal to the maximum transmit power.

In another possible implementation, the sidelink transmit power includes first transmit power of the PSCCH and second transmit power of the PSSCH. Seventh transmit power corresponding to the first transmit power and eighth transmit power corresponding to the second transmit power are determined based on the first transmit power, the second transmit power, the uplink transmit power, and the maximum transmit power; and the actual transmit power of the sidelink is determined based on the seventh transmit power and the eighth transmit power.

Because there may be one or more pieces of second transmit power, there may be one or more pieces of eighth transmit power corresponding to the second transmit power. For example, when the manner of multiplexing a PSCCH resource and a PSSCH resource is shown in FIG. 8A, FIG. 8B, FIG. 8D, and FIG. 8E, there may be one piece of eighth transmit power. When the manner of multiplexing a PSCCH resource and a PSSCH resource is shown in FIG. 8C, there are two pieces of eighth transmit power. Optionally, the N first symbols include N1 third symbols and N2 fourth symbols, where a sum of N1 and N2 is N, N1 is a positive integer less than N, and N2 is a positive integer less than N. The first channel occupies the N1 third time subunits, and the second channel occupies the N first time subunits. The eighth transmit power includes ninth transmit power corresponding to the fourth transmit power and tenth transmit power corresponding to the fifth transmit power, the ninth transmit power is PSSCH transmit power on the N1 third symbols (which may also be denoted as N3 fifth symbols), and the tenth transmit power is PSSCH transmit power on the N2 fourth symbols (which may also be denoted as N4 sixth symbols).

When the manner of multiplexing a PSCCH resource and a PSSCH resource is shown in FIGS. 8A and 8B, if the PSCCH resources overlap the uplink resources, a sum of the seventh transmit power and the uplink transmit power is less than or equal to the maximum transmit power. If the PSSCH resources overlap the uplink resources, a sum of the eighth transmit power and the uplink transmit power is less than or equal to the maximum transmit power.

When the manner of multiplexing a PSCCH resource and a PSSCH resource is shown in FIG. 8C, if the third symbols (which may also be denoted as the fifth symbols) overlap the uplink resources, a sum of the seventh transmit power, the ninth transmit power, and the uplink transmit power is less than or equal to the maximum transmit power. If the fourth symbols (which may also be denoted as the sixth symbols) overlap the uplink resources, a sum of the tenth transmit power and the uplink transmit power is less than or equal to the maximum transmit power.

When the manner of multiplexing a PSCCH resource and a PSSCH resource is shown in FIG. 8D and FIG. 8E, a sum of the ninth transmit power, the tenth transmit power, and the uplink transmit power is less than or equal to the maximum transmit power.

In this possible implementation, the seventh transmit power corresponding to the first transmit power and the eighth transmit power corresponding to the second transmit power are determined based on the first transmit power, the second transmit power, the uplink transmit power, and the maximum transmit power, so that a total sum of transmit power corresponding to each of the N first symbols is less than or equal to the maximum transmit power; and then the actual transmit power is determined based on the seventh transmit power and the eighth transmit power, so that the actual transmit power is constant on the N first symbols. In this way, not only the actual transmit power of the sidelink may be constant on the N first symbols, but also the sum of the actual transmit power of the sidelink and the actual transmit power of the uplink may be less than or equal to the maximum transmit power.

S703: The first terminal device sends the sidelink signal to a second terminal device based on the actual transmit power of the sidelink.

The sidelink signal may include at least one of an SA signal (which may also be referred to as SA), a data signal (which may also be referred to as data), a sidelink feedback signal (which may also be referred to as sidelink feedback information, (SFI)), an SRS, and the like. The PSCCH is used to carry an SA signal, the PSSCH is used to carry a data signal, and the PSFCH is used to carry an SFI signal.

Optionally, when the SA and the data are multiplexed in a time division manner, in other words, when the SA and the data occupy different symbols, the first terminal device sends the SA signal by using the actual transmit power, and sends the data signal by using the actual transmit power. In other words, the first terminal device sends the SA signal and the data signal by using the same transmit power, so that the first terminal device has the same transmit power on the N first symbols.

The first terminal device may further determine the actual transmit power of the uplink, and send the uplink signal to the network device based on the actual transmit power of the uplink. The uplink signal may include one or more of an uplink control signal, an uplink data signal, an SRS, and the like.

S704: The second terminal device processes the sidelink signal.

Optionally, the second terminal device may receive the sidelink signal sent by the first terminal device.

For example, the second terminal device may receive the SRS signal sent by the first terminal device, and perform channel estimation based on the SRS signal to obtain a channel characteristic.

For example, the second terminal device may receive the SFI signal sent by the first terminal device, and determine feedback information based on the SFI signal, for example, determine channel state information and/or ACK/NACK information.

Optionally, after the second terminal device obtains the SA signal, the second terminal device may determine a PSSCH resource and a modulation and coding scheme based on the SA signal. Further, the second terminal device may perform demodulation, decoding, and the like on the data signal, and then receive the data signal.

According to the communication method provided in this embodiment of this application, before the sidelink signal is transmitted on the N first symbols in the first slot, if the M second symbols in the N first symbols overlap the uplink resources, the transmit power of the sidelink in the first slot and the uplink transmit power of the uplink in the first slot are first obtained, and then the actual transmit power of the sidelink in the first slot is determined based on the sidelink transmit power, the uplink transmit power, and the maximum transmit power, so that the actual transmit power of the sidelink is constant on the N first symbols. Therefore, power switching does not need to be performed in the first slot, thereby reducing processing complexity for a terminal device; and/or a symbol required for power switching does not need to be reserved in the first slot, thereby reducing a resource waste and improving signal transmission performance. Because the actual transmit power of the sidelink is constant on the N first symbols, a change of a signal phase caused by power switching is avoided, so that the second terminal device can accurately perform channel estimation based on a received pilot, and therefore can accurately receive the sidelink signal sent by the first terminal device on the N first symbols. This improves signal receiving performance of the second terminal device.

Figure 13:
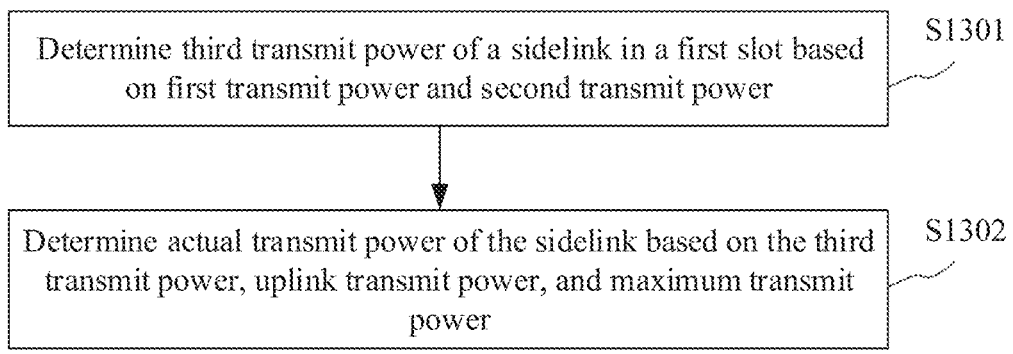
FIG. 13 is a schematic flowchart of a method for determining actual transmit power of a sidelink according to an embodiment of this application.
Figure 14:
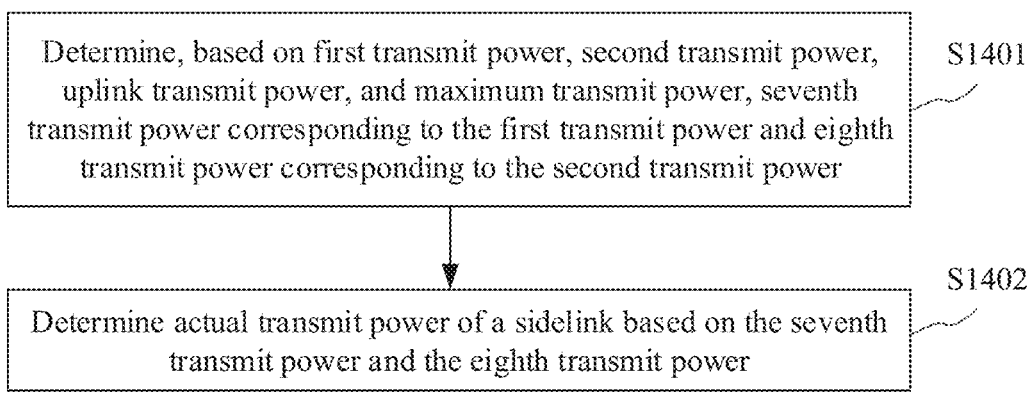
FIG. 14 is a schematic flowchart of another method for determining actual transmit power of a sidelink according to an embodiment of this application.

With reference to FIG. 13 and FIG. 14, the following describes a process of determining the actual transmit power of the sidelink in the first slot.

FIG. 13 is a schematic flowchart of a method for determining the actual transmit power of the sidelink according to an embodiment of this application. Refer to FIG. 13. The method may include the following steps.

S1301: Determine third transmit power of the sidelink in the first slot based on the first transmit power and the second transmit power.

The third transmit power of the sidelink is constant on the N first symbols.

In this embodiment of this application, an execution body may be a terminal device (for example, the first terminal device), or may be an apparatus (for example, a processor or a chip) disposed in a terminal device.

A manner of determining the third transmit power varies with a manner of multiplexing a PSCCH resource and a PSSCH resource. The following describes manners of determining the third transmit power in different resource multiplexing manners.

Optionally, one of the following implementations is used.

In a possible implementation, the manner of multiplexing a PSCCH resource and a PSSCH resource is shown in FIG. 8A and FIG. 8B. In other words, the PSCCH and the PSSCH occupy different symbols in the N first symbols. Frequency domain resources of the PSCCH and the PSSCH may be the same (as shown in FIG. 8A), or frequency domain resources of the PSCCH and the PSSCH may be different (as shown in FIG. 8B).

In this possible implementation, the third transmit power meets one of the following:

The third transmit power may be the first transmit power or the second transmit power. For example, the third transmit power may be predefined as the first transmit power or the second transmit power, or the third transmit power may be indicated as the first transmit power or the second transmit power by using first indication information. The first indication information may be sent by the network device to the first terminal device;

The third transmit power may be a largest value in the first transmit power and the second transmit power;

The third transmit power may be a smallest value in the first transmit power and the second transmit power; or There may be a first correspondence between the third transmit power and the first transmit power and second transmit power. For example, assuming that the third transmit power is P3, the first transmit power is P1, and the second transmit power is P2, the first correspondence may be: P3=a1*P1+a2*P2, where a1 is a weight value of the first transmit power, a2 is a weight value of the second transmit power, and a1 and a2 are numbers from 0 to 1. Optionally, a1+a2=1. For example, a1 and a2 may be 0.5.

In the foregoing process, when the PSCCH and the PSSCH occupy different symbols in the N first symbols, by using the foregoing method, the determined third transmit power of the sidelink may be constant on the N first symbols, and the third transmit power is less than or equal to the maximum transmit power. In addition, the foregoing manner of determining the third transmit power is simple and convenient, so that efficiency of determining the third transmit power is relatively high.

In another possible implementation, the manner of multiplexing a PSCCH resource and a PSSCH resource is shown in FIG. 8C. In other words, the N first symbols include N1 third symbols and N2 fourth symbols, where a sum of N1 and N2 is N, N1 is a positive integer less than N, and N2 is a positive integer less than N. The PSCCH occupies the N1 third symbols, and the PSSCH occupies the N first symbols. Frequency domain resources of the PSCCH overlap some frequency domain resources of the PSSCH.

In this possible implementation, the second transmit power includes fourth transmit power and fifth transmit power, the fourth transmit power is PSSCH transmit power on the N1 third symbols, and the fifth transmit power is PSSCH transmit power on the N2 fourth symbols. The third transmit power meets one of the following:

The third transmit power is the fifth transmit power or sixth transmit power, and the sixth transmit power is a sum of the first transmit power and the fourth transmit power. The sixth transmit power is a sum of PSCCH transmit power and PSSCH transmit power on the N1 third symbols. For example, the third transmit power may be predefined as the fifth transmit power or the sixth transmit power, or the third transmit power may be indicated as the fifth transmit power or the sixth transmit power by using second indication information. The second indication information may be sent by the network device to the first terminal device;

The third transmit power is a largest value in the fifth transmit power and the sixth transmit power;

The third transmit power is a smallest value in the fifth transmit power and the sixth transmit power; or There is a second correspondence between the third transmit power and the first transmit power, fourth transmit power, and fifth transmit power. For example, assuming that the third transmit power is P3, the first transmit power is P1, the fourth transmit power is P4, and the fifth transmit power is P5, the second correspondence may be: $P3 = a1*P1 + a4*P4 + a5*P5$, where a1 is a weight value of the first transmit power, a4 is a weight value of the fourth transmit power, a5 is a weight value of the fifth transmit power, a1, a4, and a5 are numbers from 0 to 1, and a1 may be equal to a4. Optionally, when a1 is equal to a4, $a1 + a5 = 1$.

In the foregoing process, through resource multiplexing, by using the foregoing method, the determined third transmit power of the sidelink may be constant on the N first symbols, and the third transmit power is less than or equal to the maximum transmit power. In addition, the foregoing manner of determining the third transmit power is simple and convenient, so that efficiency of determining the third transmit power is relatively high.

Still another possible implementation is as follows:

The manner of multiplexing a PSCCH resource and a PSSCH resource is shown in FIG. 8D and FIG. 8E. In other words, the PSCCH and the PSSCH occupy different frequency domain resources. The PSCCH and the PSSCH may occupy all of the N first symbols (as shown in FIG. 8D), or the PSCCH and/or the PSSCH may occupy some of the N first symbols (as shown in FIG. 8E).

In this possible implementation, the third transmit power is a sum of the first transmit power and the second transmit power.

In the foregoing process, through resource multiplexing, by using the foregoing method, the determined third transmit power of the sidelink may be constant on the N first symbols, and the third transmit power is less than or equal to the maximum transmit power. In addition, the foregoing manner of determining the third transmit power is simple and convenient, so that efficiency of determining the third transmit power is relatively high.

S1302. Determine the actual transmit power of the sidelink based on the third transmit power, the uplink transmit power, and the maximum transmit power.

When a sum of the third transmit power and the uplink transmit power is less than or equal to the maximum transmit power, it may be determined that the actual transmit power of the sidelink is the third transmit power, and the actual transmit power of the uplink is the uplink transmit power.

Alternatively, when a sum of the third transmit power and the uplink transmit power is greater than the maximum transmit power, the actual transmit power of the sidelink may be determined in one of the following possible implementations.

In a possible implementation, there may be two cases of determining the actual transmit power of the sidelink based on a priority of a sidelink signal, a priority of an uplink signal, the third transmit power, the uplink transmit power, and the maximum transmit power.

When the priority of the sidelink signal is greater than or equal to (or greater than) the priority of the uplink signal, it is determined that the actual transmit power of the sidelink is the third transmit power, and it may be further determined that the actual transmit power of the uplink is a difference between the maximum transmit power and the third transmit power.

When the priority of the sidelink signal is less than (or less than or equal to) the priority of the uplink signal, it is determined that the actual transmit power of the sidelink is a difference between the maximum transmit power and the uplink transmit power, and it may be further determined that the actual transmit power of the uplink is the uplink transmit power.

In this possible implementation, transmit power of a signal with a higher priority can be preferably ensured based on the priority of the sidelink signal and the priority of the uplink signal, so that transmission performance of the signal with a higher priority is better. For example, transmission correctness of a signal with a high priority may be relatively high, so that a transmission requirement of a service with a high priority, for example, a low-delay and high-reliability requirement, can be ensured.

In another possible implementation, the actual transmit power of the sidelink is a first product of the third transmit power and a first weight value, and it may be further determined that the actual transmit power of the uplink is a second product of the uplink transmit power and a second weight value. The uplink signal corresponds to the second weight value, and a sum of the first product and the second product is less than or equal to the maximum transmit power.

The first weight value and the second weight value may be the same, or may be different. A sum of the first weight value and the second weight value is less than 1. The first weight value and the second weight value may be predefined, or may be generated based on values of the third transmit power and the uplink transmit power. When the first weight value and the second weight value are generated based on the values of the third transmit power and the uplink transmit power, the first weight value and the second weight value may be first initialized (for example, the first weight value and the second weight value each are initialized to 1 or 0.5), and then the first weight value and the second weight value are gradually reduced until the sum of the first product and the second product is less than or equal to the maximum transmit power.

In this possible implementation, the third transmit power is reduced based on a preset proportion to obtain the actual transmit power of the sidelink, and the uplink transmit power is reduced based on a preset proportion to obtain the actual transmit power of the uplink. This can avoid a case in which the actual transmit power of the sidelink or the actual transmit power of the uplink is excessively small.

Still another possible implementation is as follows:

The actual transmit power of the sidelink is the third transmit power or a first difference, and the first difference is a difference between the maximum transmit power and the uplink transmit power. For example, the actual transmit power of the sidelink may be predefined as the third transmit power or the first difference, or the actual transmit power of the sidelink may be indicated as the third transmit power or the first difference by using indication information. The indication information may be sent by the network device to the first terminal device.

The actual transmit power of the uplink is the uplink transmit power or a second difference, and the second difference is a difference between the maximum transmit power and the third transmit power. For example, the actual transmit power of the uplink may be predefined as the uplink transmit power or the second difference, or the actual transmit power of the uplink may be indicated as the uplink transmit power or the second difference by using indication information. The indication information may be sent by the network device to the first terminal device.

In this possible implementation, the actual transmit power of the sidelink and the actual transmit power of the uplink are predefined or indicated by using the indication information, so that the actual transmit power of the sidelink and the actual transmit power of the uplink can be quickly determined.

In the embodiment shown in FIG. 13, the third transmit power is first determined based on the first transmit power and the second transmit power, so that the third transmit power is constant on the N first symbols; and then the actual transmit power of the sidelink is determined based on the third transmit power and the maximum transmit power, so that the sum of the actual transmit power of the sidelink and the actual transmit power of the uplink is less than or equal to the maximum transmit power. In this way, on a basis of ensuring that the sum of the actual transmit power of the sidelink and the actual transmit power of the uplink is less than or equal to the maximum transmit power, the actual transmit power of the sidelink may be constant on the N first symbols. Therefore, power switching does not need to be performed in the first slot, thereby reducing complexity for a terminal device; and/or a symbol required for power switching does not need to be reserved in the first slot, thereby reducing a resource waste and improving signal transmission performance. Because the actual transmit power of the sidelink is constant on the N first symbols, a change of a signal phase caused by power jumping is avoided, so that the second terminal device can accurately perform channel estimation based on a received pilot, and therefore can accurately receive the sidelink signal sent by the first terminal device on the N first symbols. This improves signal receiving performance of the second terminal device.

FIG. 14 is a schematic flowchart of another method for determining the actual transmit power of the sidelink according to an embodiment of this application. The method may include the following steps.

S1401: Determine, based on the first transmit power, the second transmit power, the uplink transmit power, and the maximum transmit power, seventh transmit power corresponding to the first transmit power and eighth transmit power corresponding to the second transmit power.

In this embodiment of this application, an execution body may be a terminal device (for example, the first terminal device), or may be an apparatus (for example, a processor or a chip) disposed in a terminal device.

A manner of determining the seventh transmit power varies with a manner of multiplexing a PSCCH resource and a PSSCH resource and a situation of overlapping between a sidelink resource and an uplink resource. The following possible implementations may be included.

In a possible implementation, the first symbols occupied by the PSCCH do not overlap the uplink resources.

In this resource overlapping case, the seventh transmit power is the same as the first transmit power. For example, as shown in FIG. 9B, FIG. 9C, FIG. 10B, and FIG. 10C, if the first symbols occupied by the PSCCH do not overlap the uplink resources, the seventh transmit power is the same as the first transmit power.

In another possible implementation, the first symbols occupied by the PSCCH overlap the uplink resources.

When the manner of multiplexing a PSCCH resource and a PSSCH resource is shown in FIG. 8A and FIG. 8B, if a sum of the first transmit power and the uplink transmit power is less than or equal to the maximum transmit power, the seventh transmit power is the same as the first transmit power. Alternatively, if a sum of the first transmit power and the uplink transmit power is greater than the maximum transmit power, the seventh transmit power may be determined in any one of the three possible implementations shown in S1302. Details are not described herein again.

When the manner of multiplexing a PSCCH resource and a PSSCH resource is shown in FIG. 8C, if a sum of the first transmit power, the fourth transmit power (for the fourth transmit power, refer to the descriptions in S701), and the uplink transmit power is less than or equal to the maximum transmit power, the seventh transmit power is the same as the first transmit power. Alternatively, if a sum of the first transmit power, the fourth transmit power, and the uplink transmit power is greater than the maximum transmit power, the seventh transmit power may be determined in any one of the three possible implementations shown in S1302. Details are not described herein again.

When the manner of multiplexing a PSCCH resource and a PSSCH resource is shown in FIG. 8D and FIG. 8E, if a sum of the first transmit power, the second transmit power, and the uplink transmit power is less than or equal to the maximum transmit power, the seventh transmit power is the same as the first transmit power. Alternatively, if a sum of the first transmit power, the second transmit power, and the uplink transmit power is greater than the maximum transmit power, the seventh transmit power may be determined in any one of the three possible implementations shown in S1302. Details are not described herein again.

A manner of determining the eighth transmit power varies with a manner of multiplexing a PSCCH resource and a PSSCH resource and a situation of overlapping between a sidelink resource and an uplink resource. The following possible implementations may be included.

In a possible implementation, the first symbols occupied by the PSCCH do not overlap the uplink resources.

In this resource overlapping case, the eighth transmit power is the same as the second transmit power. For example, as shown in FIG. 9D, FIG. 9E, FIG. 10D, and FIG. 10E, if the first symbols occupied by the PSCCH do not overlap the uplink resources, the eighth transmit power is the same as the second transmit power.

In another possible implementation, the first symbols occupied by the PSCCH overlap the uplink resources.

When the manner of multiplexing a PSCCH resource and a PSSCH resource is shown in FIG. 8A and FIG. 8B, if a sum of the second transmit power and the uplink transmit power is less than or equal to the maximum transmit power, the eighth transmit power is the same as the second transmit power. Alternatively, if a sum of the second transmit power and the uplink transmit power is greater than the maximum transmit power, the eighth transmit power may be determined in any one of the three possible implementations shown in S1302. Details are not described herein again.

When the manner of multiplexing a PSCCH resource and a PSSCH resource is shown in FIG. 8C, the second transmit power includes the fourth transmit power and the fifth transmit power, and the eighth transmit power includes the ninth transmit power and the tenth transmit power (refer to the descriptions in S701). If a sum of the first transmit power, the fourth transmit power, and the uplink transmit power is less than or equal to the maximum transmit power, the ninth transmit power is the same as the fourth transmit power. Alternatively, if a sum of the first transmit power, the fourth transmit power, and the uplink transmit power is greater than the maximum transmit power, the ninth transmit power may be determined in any one of the three possible implementations shown in S1302. Details are not described herein again. If a sum of the fifth transmit power and the uplink transmit power is less than or equal to the maximum transmit power, the tenth transmit power is the same as the fifth transmit power. Alternatively, if a sum of the fifth transmit power and the uplink transmit power is greater than the maximum transmit power, the tenth transmit power may be determined in any one of the three possible implementations shown in S1302. Details are not described herein again.

When the manner of multiplexing a PSCCH resource and a PSSCH resource is shown in FIG. 8D and FIG. 8E, if a sum of the first transmit power, the second transmit power, and the uplink transmit power is less than or equal to the maximum transmit power, the eighth transmit power is the same as the second transmit power. Alternatively, if a sum of the first transmit power, the second transmit power, and the uplink transmit power is greater than the maximum transmit power, the eighth transmit power may be determined in any one of the three possible implementations shown in S1302. Details are not described herein again.

In the foregoing process of determining the seventh transmit power and the eighth transmit power, the actual transmit power of the uplink may be further determined. In the foregoing process of determining the seventh transmit power and the eighth transmit power, if total transmit power on a first symbol in the N first symbols (a sum of the sidelink transmit power and the uplink transmit power) is less than or equal to the maximum transmit power without reducing the uplink transmit power, it may be determined that the actual transmit power of the uplink is the uplink transmit power. Alternatively, in the foregoing process of determining the seventh transmit power and the eighth transmit power, if total transmit power on each first symbol in the N first symbols is less than or equal to the maximum transmit power by adjusting the uplink transmit power, the actual transmit power of the uplink is adjusted uplink transmit power. Specifically, for example, the adjusted uplink transmit power is a difference between the maximum transmit power and the seventh transmit power, or the adjusted uplink transmit power is a difference between the maximum transmit power and the eighth transmit power, or the adjusted uplink transmit power is a difference between the maximum transmit power and a power sum of the seventh transmit power and the eighth transmit power.

S1402: Determine the actual transmit power of the sidelink based on the seventh transmit power and the eighth transmit power.

A manner of determining the third transmit power varies with a manner of multiplexing a PSCCH resource and a PSSCH resource. The following describes manners of determining the actual transmit power in different resource multiplexing manners.

Optionally, one of the following implementations may be used.

In a possible implementation, the manner of multiplexing a PSCCH resource and a PSSCH resource is shown in FIG. 8A and FIG. 8B. In other words, the PSCCH and the PSSCH occupy different symbols in the N first symbols. Frequency domain resources of the PSCCH and the PSSCH may be the same (as shown in FIG. 8A), or frequency domain resources of the PSCCH and the PSSCH may be different (as shown in FIG. 8B).

In this possible implementation, the actual transmit power of the sidelink meets one of the following:

The actual transmit power is the seventh transmit power or the eighth transmit power. For example, the actual transmit power may be predefined as the seventh transmit power or the eighth transmit power, or the actual transmit power may be indicated as the seventh transmit power or the eighth transmit power by using third indication information. The third indication information may be sent by the network device to the first terminal device;

The actual transmit power is a largest value in the seventh transmit power and the eighth transmit power;

The actual transmit power is a smallest value in the seventh transmit power and the eighth transmit power; or There is a third correspondence between the actual transmit power and the seventh transmit power and eighth transmit power. For example, assuming that the actual transmit power is P, the seventh transmit power is P7, and the eighth transmit power is P8, the third correspondence may be: $P=a7*P7+a8*P8$, where a7 is a weight value of the seventh transmit power, a8 is a weight value of the eighth transmit power, and a7 and a8 are numbers from 0 to 1. Optionally, $a7+a8=1$. For example, a7 and a8 may be 0.5.

In the foregoing process, when the PSCCH and the PSSCH occupy different symbols in the N first symbols, by using the foregoing method, the determined actual transmit power of the sidelink may be constant on the N first symbols. In addition, the foregoing manner of determining the actual transmit power of the sidelink is simple and convenient, so that efficiency of determining the actual transmit power of the sidelink is relatively high.

In another possible implementation, the manner of multiplexing a PSCCH resource and a PSSCH resource is shown in FIG. 8C. In other words, the N first symbols include N3 fifth symbols and N4 sixth symbols, where a sum of N3 and N4 is N, N3 is a positive integer less than N, and N4 is a positive integer less than N. The PSCCH occupies the N3 fifth symbols, and the PSSCH occupies the N first symbols. Frequency domain resources of the PSCCH overlap some frequency domain resources of the PSSCH.

In this possible implementation, the eighth transmit power includes ninth transmit power and tenth transmit power, the ninth transmit power is transmit power of the second channel on the N3 fifth symbols (which may also be denoted as N1 third symbols), and the tenth transmit power is transmit power of the second channel on the N4 sixth symbols (which may also be denoted as N2 fourth symbols). The actual transmit power of the sidelink meets one of the following:

The actual transmit power is the tenth transmit power or eleventh transmit power, and the eleventh transmit power is a sum of the seventh transmit power and the ninth transmit power. For example, the actual transmit power may be predefined as the tenth transmit power or the eleventh transmit power, or the actual transmit power may be indicated as the tenth transmit power or the eleventh transmit power by using fourth indication information. The fourth indication information may be sent by the network device to the first terminal device;

The actual transmit power is a largest value in the tenth transmit power and the eleventh transmit power;

The actual transmit power is a smallest value in the tenth transmit power and the eleventh transmit power; or There is a fourth correspondence between the actual transmit power and the seventh transmit power, ninth transmit power, and tenth transmit power. For example, assuming that the actual transmit power is P, the seventh transmit power is P7, the ninth transmit power is P9, and the tenth transmit power is P10, the fourth correspondence may be: P=a7*P7+a9*P9+a10*P10, where a7 is a weight value of the seventh transmit power, a9 is a weight value of the ninth transmit power, a10 is a weight value of the tenth transmit power, a7, a9, and a10 are numbers from 0 to 1, and a7 may be equal to a9. Optionally, when a7 is equal to a9, a7+a10=1.

In the foregoing process, through resource multiplexing, by using the foregoing method, the determined actual transmit power of the sidelink may be constant on the N first symbols. In addition, the foregoing manner of determining the actual transmit power of the sidelink is simple and convenient, so that efficiency of determining the actual transmit power of the sidelink is relatively high.

Still another possible implementation is as follows:

The manner of multiplexing a PSCCH resource and a PSSCH resource is shown in FIG. 8D and FIG. 8E. In other words, the PSCCH and the PSSCH occupy different frequency domain resources. The PSCCH and the PSSCH may occupy all of the N first symbols (as shown in FIG. 8D), or the PSCCH and/or the PSSCH may occupy some of the N first symbols (as shown in FIG. 8E).

The actual transmit power is a sum of the seventh transmit power and the eighth transmit power.

In the foregoing process, through resource multiplexing, by using the foregoing method, the determined actual transmit power of the sidelink may be constant on the N first symbols. In addition, the foregoing manner of determining the actual transmit power of the sidelink is simple and convenient, so that efficiency of determining the actual transmit power of the sidelink is relatively high.

In the embodiment shown in FIG. 14, the seventh transmit power corresponding to the first transmit power and the eighth transmit power corresponding to the second transmit power are determined based on the first transmit power, the second transmit power, the uplink transmit power, and the maximum transmit power, so that a total sum of transmit power corresponding to each first symbol is less than or equal to the maximum transmit power; and then the actual transmit power is determined based on the seventh transmit power and the eighth transmit power, so that the actual transmit power is constant on the N first symbols. In this way, on a basis of ensuring that the sum of the actual transmit power of the sidelink and the actual transmit power of the uplink is less than or equal to the maximum transmit power, the actual transmit power of the sidelink may be constant on the N first symbols. Therefore, power switching does not need to be performed in the first slot, thereby reducing processing complexity for a terminal device; and/or a symbol required for power switching does not need to be reserved in the first slot, thereby reducing a resource waste and improving signal transmission performance. Because the actual transmit power of the sidelink is constant on the N first symbols, a change of a signal phase caused by power jumping is avoided, so that the second terminal device can accurately perform channel estimation based on a received pilot, and therefore can accurately receive the sidelink signal sent by the first terminal device on the N first symbols. This improves signal receiving performance of the second terminal device.

In an actual application process, the terminal device may determine the actual transmit power of the sidelink by using the method shown in the embodiment in FIG. 13 or FIG. 14.

Optionally, the manner of determining the actual transmit power of the sidelink is selected according to the manner of multiplexing a PSCCH resource and a PSCCH resource. For example, when the resource multiplexing manner is shown in FIG. 8A and FIG. 8B, the actual transmit power of the sidelink is determined by using the method shown in the embodiment in FIG. 14. When the resource multiplexing manner is shown in FIG. 8C to FIG. 8E, the actual transmit power of the sidelink is determined by using the method shown in the embodiment in FIG. 13. This can improve power adjustment performance, and reduce processing complexity.

Optionally, the manner of determining the actual transmit power of the sidelink is selected according to the situation of overlapping between a sidelink resource and an uplink resource. For example, when the uplink resource overlaps either of the PSCCH resource and the PSSCH resource, the actual transmit power of the sidelink is determined by using the method shown in the embodiment in FIG. 14. When the uplink resource overlaps both the PSCCH resource and the PSSCH resource, the actual transmit power of the sidelink is determined by using the method shown in the embodiment in FIG. 13. This can improve power adjustment performance, and reduce processing complexity.

Optionally, the manner of determining the actual transmit power of the sidelink is selected according to a transmission mode. For example, when the transmission mode is sidelink unicast transmission, the actual transmit power of the sidelink is determined by using the method shown in the embodiment in FIG. 14. When the transmission mode is sidelink groupcast transmission or sidelink broadcast transmission, the actual transmit power of the sidelink is determined by using the method shown in the embodiment in FIG. 13.

In this application, a sidelink transmission type may include one or more of unicast, groupcast, and broadcast. The unicast transmission may mean communication between one terminal and another terminal. The groupcast transmission may mean communication between one terminal and a group of terminals. The broadcast transmission may mean communication between one terminal and a plurality of terminals. Optionally, the broadcast may mean communication between one terminal and all terminals in a cell, or may be understood as communication between one terminal and a plurality of groups of terminals. In this application, the sidelink transmission type may also correspond to a service type, for example, may include one or more of a unicast service, a groupcast service, and a broadcast service. Optionally, the manner of determining the actual transmit power of the sidelink is selected according to a path loss calculation method. The sidelink path loss calculation method may be determining transmit power of a sidelink signal based on a path loss between the transmit end UE and the base station, or determining transmit power of a sidelink signal based on a path loss between the transmit end UE and the receive end UE. For example, when the transmit power of the sidelink signal is determined based on the path loss between the transmit end UE and the base station, the actual transmit power of the sidelink may be determined according to the method shown in the embodiment in FIG. 14. When the transmit power of the sidelink signal is determined based on the path loss between the transmit end UE and the receive end UE, the actual transmit power of the sidelink may be determined according to the method shown in the embodiment in FIG. 13.

Optionally, the manner of determining the actual transmit power of the sidelink is selected according to more of the resource multiplexing manner, the resource overlapping situation, the transmission mode, and the path loss calculation method. For example, the manner of determining the actual transmit power of the sidelink may be selected according to the resource multiplexing manner and the transmission mode. For example, when the resource multiplexing manner is shown in FIG. 8A and FIG. 8B, and the transmission mode is the unicast transmission mode, the actual transmit power of the sidelink is determined according to the method shown in the embodiment in FIG. 14. When the resource multiplexing manner is shown in FIG. 8C to FIG. 8E, and the transmission mode is the unicast mode, the actual transmit power of the sidelink is determined according to the method shown in the embodiment in FIG. 13. When the resource multiplexing manner is shown in FIG. 8A and FIG. 8B, and the transmission mode is the groupcast or broadcast transmission mode, the actual transmit power of the sidelink is determined according to the method shown in the embodiment in FIG. 13. When the resource multiplexing manner is shown in FIG. 8C to FIG. 8E, and the transmission mode is the groupcast or broadcast mode, the actual transmit power of the sidelink is determined according to the method shown in the embodiment in FIG. 13. This can improve power adjustment performance, and reduce processing complexity.

Optionally, the terminal device sends, to the network device, the method used by the terminal device to determine the actual transmit power of the sidelink, so that the network device can determine receive power for receiving the sidelink signal. For example, the terminal device may report, to the network device, a capability indicating that the terminal device determines the actual transmit power of the sidelink by using the method shown in the embodiment in FIG. 13, or the terminal device may report, to the network device, a capability indicating that the terminal device determines the actual transmit power of the sidelink by using the method shown in the embodiment in FIG. 14.

Optionally, the terminal device sends, to the network device, a capability indicating whether the terminal device can determine the actual transmit power of the sidelink by using the method shown in the embodiment in FIG. 13 and a capability indicating whether the terminal device can determine the actual transmit power of the sidelink by using the method shown in the embodiment in FIG. 14. For example, when the terminal device reports the capability indicating that the terminal device can determine the actual transmit power of the sidelink by using the method shown in the embodiment in FIG. 13, the terminal device may determine the actual transmit power of the sidelink by using the method shown in the embodiment in FIG. 13. When the terminal device reports the capability indicating that the terminal device can determine the actual transmit power of the sidelink by using the method shown in the embodiment in FIG. 14, the terminal device may determine the actual transmit power of the sidelink by using the method shown in the embodiment in FIG. 14. By using the foregoing method, the network device may determine a processing manner and a capability of the terminal for the uplink and the sidelink, to obtain the receive power of receiving the sidelink signal and/or better implementation of scheduling and communication of the uplink and the sidelink.

Optionally, the terminal device sends, to the network device, a capability indicating that the terminal device can simultaneously send the uplink signal and the sidelink signal when the uplink resources do not completely overlap the sidelink resources or a capability indicating that the terminal device cannot simultaneously send the uplink signal and the sidelink signal when the uplink resources do not completely overlap the sidelink resources. When the terminal device reports the capability indicating that the terminal device can simultaneously send the uplink signal and the sidelink signal when the uplink resources do not completely overlap the sidelink resources, the terminal device can simultaneously send the uplink signal and the sidelink signal when the uplink resources do not completely overlap the sidelink resources. When the terminal device reports the capability indicating that the terminal device cannot simultaneously send the uplink signal and the sidelink signal when the uplink resources do not completely overlap the sidelink resources, the terminal device can simultaneously send the uplink signal and the sidelink signal only when the uplink resources completely overlap the sidelink resources. By using the foregoing method, the network device may determine a processing manner and a capability of the terminal for the uplink and the sidelink, to obtain the receive power of receiving the sidelink signal and/or better implementation of scheduling and communication of the uplink and the sidelink.

Optionally, the terminal device sends a resource multiplexing manner supported by the terminal device (for example, one or more of the resource multiplexing manners shown in FIG. 8A to FIG. 8E) and a resource overlapping situation supported by the terminal device (one or more of resource overlapping situations in FIG. 9A to FIG. 9G, FIG. 10A to FIG. 10G, FIG. 11A, FIG. 11B, and FIG. 12A to FIG. 12C) to the network device. By using the foregoing method, the network device may determine a processing manner and a capability of the terminal for the uplink and the sidelink, to obtain the receive power of receiving the sidelink signal and/or better implementation of scheduling and communication of the uplink and the sidelink.

Optionally, in another embodiment, the actual transmit power of the sidelink and/or the actual transmit power of the uplink may be determined according to a priority transmission principle.

Optionally, this embodiment may be independent of another embodiment, or may be combined with another embodiment. Specifically, this application imposes no limitation thereto.

For example, when the terminal device has transmitted the sidelink signal based on third transmit power, the actual transmit power of the sidelink is equal to the third transmit power, and the third transmit power is determined based on the first transmit power and the second transmit power; and/or when the terminal device has transmitted the uplink signal based on the uplink transmit power, the actual transmit power of the sidelink is equal to a smaller value in the third transmit power and a first difference, and the first difference is a difference between the maximum transmit power of the terminal device and the uplink transmit power.

In an actual application process, in the first slot, the sidelink signal may be transmitted before the uplink signal is transmitted, for example, as shown in FIG. 9B and FIG. 9C. In the first slot, assuming that the sidelink signal has been transmitted based on third transmit power before the uplink signal is transmitted, it may be determined that the actual transmit power of the sidelink is equal to the third transmit power. For a manner of determining the third transmit power, refer to S1301. Details are not described herein again. This can avoid power switching in the first slot.

In an actual application process, in the first slot, the uplink signal may be transmitted before the sidelink signal is transmitted, for example, as shown in FIG. 12A to FIG. 12C. In the first slot, assuming that the uplink signal has been transmitted based on the uplink transmit power before the sidelink signal is transmitted, the actual transmit power of the sidelink is equal to a smaller value in the third transmit power and a first difference, and the first difference is a difference between the maximum transmit power and the uplink transmit power. This can avoid power switching in the first slot. Alternatively, the actual transmit power of the sidelink may be determined based on the priority of the uplink and the priority of the sidelink. For example, if the priority of the sidelink is greater than or equal to the priority of the uplink, the actual transmit power of the sidelink is equal to third transmit power. If the priority of the sidelink is less than the priority of the uplink, the actual transmit power of the sidelink is equal to zero, or the actual transmit power of the sidelink is equal to a smaller value in the third transmit power and a first difference, and the first difference is a difference between the maximum transmit power of the terminal device and the uplink transmit power. For a manner of determining the third transmit power, refer to S1301. Details are not described herein again.

Optionally, one or more of the uplink transmit power or the sidelink transmit power may be adjusted, so that total transmit power is constant on N first symbols in one slot. Optionally, the total transmit power on the first symbol may be less than or equal to the maximum transmit power of the terminal device. Optionally, the uplink transmit power or the sidelink transmit power may be adjusted based on the priority of the uplink signal and the priority of the sidelink signal. For example, when the priority of the uplink signal is greater than or equal to the priority of the sidelink signal, the sidelink transmit power is preferentially reduced; or when the priority of the uplink signal is less than the priority of the sidelink signal, the uplink transmit power is preferentially reduced.

For example, assuming that the priority of the uplink signal is greater than the priority of the sidelink signal, and the resource overlapping situation is shown in FIG. 9A, the PSSCH transmit power or the PSCCH transmit power may be reduced, so that a sum of the PSSCH transmit power and the uplink transmit power is equal to the PSCCH transmit power. In this case, the total transmit power is constant on the N first symbols.

For example, assuming that the priority of the uplink signal is greater than the priority of the sidelink signal, and the resource overlapping situation is shown in FIG. 9B, PSSCH transmit power on an overlapping symbol may be reduced, so that a sum of uplink transmit power and the PSSCH transmit power on the overlapping symbol is equal to PSSCH transmit power on a non-overlapping symbol and is equal to the PSCCH transmit power. In this case, the total transmit power is constant on the N first symbols.

For example, assuming that the priority of the uplink signal is greater than the priority of the sidelink signal, and the resource overlapping situation is shown in FIG. 9D, the PSCCH transmit power may be reduced, so that a sum of the uplink transmit power and the PSCCH transmit power is equal to the PSSCH transmit power. In this case, the total transmit power is constant on the N first symbols.

Optionally, to ensure that the total transmit power is constant on the N first symbols, the sidelink transmit power on the N first symbols does not change, and the uplink transmit power on the N first symbols does not change, it may be predefined that time domain resources for uplink transmission completely overlap time domain resources for sidelink transmission (that is, the resource overlapping situation shown in FIG. 9A, FIG. 10A, or FIG. 11A). In other words, in one slot, a symbol location occupied by uplink transmission is the same as a symbol location occupied by sidelink transmission.

"Predefine" in this application may be understood as "define", "predefine", "define in a protocol", "store", "pre-store", "pre-negotiate", "preconfigure", "solidify", or "pre-burn".

Corresponding to the methods provided in the foregoing method embodiments, an embodiment of this application further provides a corresponding apparatus. The apparatus includes a corresponding module configured to perform the foregoing embodiments. The module may be software, hardware, or a combination of software and hardware.

Figure 15:
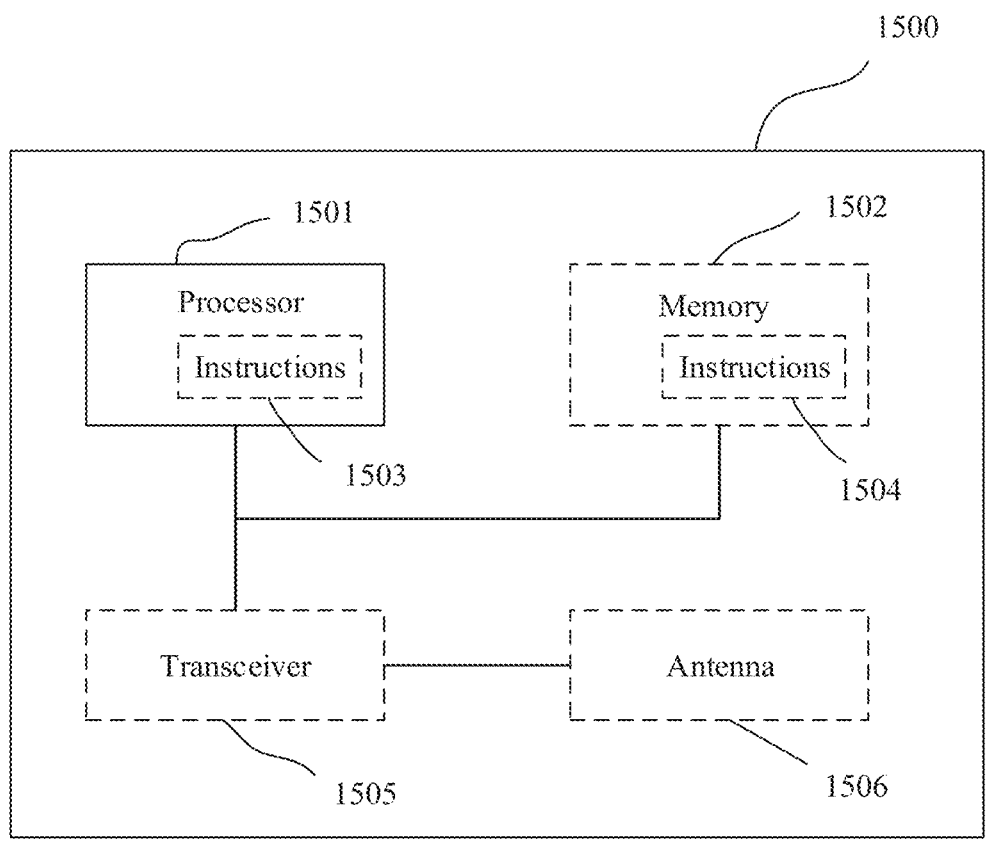
FIG. 15 is a schematic diagram of a structure of an apparatus according to this application.

FIG. 15 is a schematic diagram of a structure of an apparatus according to this application. The apparatus 1500 may be a network device; may be a terminal device; may be a chip, a chip system, a processor, or the like that supports the network device in implementing the foregoing methods; or may be a chip, a chip system, a processor, or the like that supports the terminal device in implementing the foregoing methods. The apparatus may be configured to implement the methods described in the foregoing method embodiments. For details, refer to the descriptions in the foregoing method embodiments.

The apparatus 1500 may include one or more processors 1501. The processor 1501 may also be referred to as a processing unit, and may implement a specific control function. The processor 1501 may be a general-purpose processor, a dedicated processor, or the like. For example, the processor 1501 may be a baseband processor or a central processing unit. The baseband processor may be configured to process a communication protocol and communication data. The central processing unit may be configured to: control a communication apparatus (for example, a base station, a baseband chip, a terminal, a terminal chip, a DU, or a CU), execute a software program, and process data of the software program.

In an optional design, the processor 1501 may alternatively store instructions and/or data 1503, and the instructions and/or data 1503 may be run by the processor, so that the apparatus 1500 performs the methods described in the foregoing method embodiments.

In another optional design, the processor 1501 may include a transceiver unit configured to implement a sending function and a receiving function. For example, the transceiver unit may be a transceiver circuit, an interface, or an interface circuit. A transceiver circuit, an interface, or an interface circuit configured to implement the sending function and that configured to implement the receiving function may be separated, or may be integrated. The transceiver circuit, the interface, or the interface circuit may be configured to read and write code or data. Alternatively, the transceiver circuit, the interface, or the interface circuit may be configured to transmit or transfer a signal.

In still another possible design, the apparatus 1500 may include a circuit, and the circuit may implement the sending, receiving, or communication function in the foregoing method embodiments.

Optionally, the apparatus 1500 may include one or more memories 1502. The memory 1502 may store instructions 1504, and the instructions may be run on the processor, so that the apparatus 1500 performs the methods described in the foregoing method embodiments. Optionally, the memory may further store data. Optionally, the processor may also store instructions and/or data. The processor and the memory may be disposed separately, or may be integrated. For example, the correspondences described in the foregoing method embodiments may be stored in the memory or stored in the processor.

Optionally, the apparatus 1500 may further include a transceiver 1505 and/or an antenna 1506. The processor 1501 may be referred to as a processing unit, and control the apparatus 1500. The transceiver 1505 may be referred to as a transceiver unit, a transceiver device, a transceiver circuit, a transceiver, or the like, and is configured to implement sending and receiving functions.

In a first possible design, one apparatus 1500 (for example, an integrated circuit, a wireless device, a circuit module, or a terminal device) may include a processor 1501.

The processor 1501 is configured to: obtain sidelink transmit power and uplink transmit power, where the sidelink transmit power is transmit power of a sidelink in a first time unit, and the uplink transmit power is transmit power of an uplink in the first time unit; and determine actual transmit power of the sidelink in the first time unit based on the sidelink transmit power, the uplink transmit power, and maximum transmit power, where the first time unit includes N first time subunits, M second time subunits in the N first time subunits overlap uplink resources, N is an integer greater than 1, M is a positive integer less than or equal to N, the N first time subunits are time subunits used for sidelink transmission in the first time unit, and the actual transmit power of the sidelink is constant in the N first time subunits.

In the foregoing process, before the sidelink signal is transmitted on the N first symbols in the first slot, if the M second symbols in the N first symbols overlap the uplink resources, the transmit power of the sidelink in the first slot and the uplink transmit power of the uplink in the first slot are first obtained, and then the actual transmit power of the sidelink in the first slot is determined based on the sidelink transmit power, the uplink transmit power, and the maximum transmit power, so that the actual transmit power of the sidelink is constant on the N first symbols. Therefore, power switching does not need to be performed in the first slot, thereby reducing processing complexity for a terminal device; and/or a symbol required for power switching does not need to be reserved in the first slot, thereby reducing a resource waste and improving signal transmission performance. Because the actual transmit power of the sidelink is constant on the N first symbols, a change of a signal phase caused by power switching is avoided, so that a second terminal device can accurately perform channel estimation based on a received pilot, and therefore can accurately receive the sidelink signal sent by the first terminal device on the N first symbols. This improves signal receiving performance of the second terminal device.

In a possible implementation, the sidelink transmit power includes first transmit power and second transmit power, the first transmit power is transmit power of a first channel of the sidelink, and the second transmit power is transmit power of a second channel of the sidelink.

In a possible implementation, the processor 1501 is specifically configured to: determine third transmit power of the sidelink in the first time unit based on the first transmit power and the second transmit power; and determine the actual transmit power based on the third transmit power, the uplink transmit power, and the maximum transmit power, where the third transmit power of the sidelink is constant in the N first time subunits.

In the foregoing process, the third transmit power is first determined based on the first transmit power and the second transmit power, so that the third transmit power is constant on the N first symbols; and then the actual transmit power of the sidelink is determined based on the third transmit power and the maximum transmit power, so that a sum of the actual transmit power of the sidelink and actual transmit power of the uplink is less than or equal to the maximum transmit power. In this way, on a basis of ensuring that the sum of the actual transmit power of the sidelink and the actual transmit power of the uplink is less than or equal to the maximum transmit power, the actual transmit power of the sidelink may be constant on the N first symbols. Therefore, power switching does not need to be performed in the first slot, thereby reducing complexity for a terminal device; and/or a symbol required for power switching does not need to be reserved in the first slot, thereby reducing a resource waste and improving signal transmission performance. Because the actual transmit power of the sidelink is constant on the N first symbols, a change of a signal phase caused by power jumping is avoided, so that the second terminal device can accurately perform channel estimation based on a received pilot, and therefore can accurately receive the sidelink signal sent by the first terminal device on the N first symbols. This improves signal receiving performance of the second terminal device.

In a possible implementation, the first channel and the second channel occupy different time subunits in the N first time subunits.

The third transmit power meets one of the following:

the third transmit power is the first transmit power or the second transmit power;

the third transmit power is a largest value in the first transmit power and the second transmit power;

the third transmit power is a smallest value in the first transmit power and the second transmit power; or there is a first correspondence between the third transmit power and the first transmit power and second transmit power.

In the foregoing process, when the PSCCH and the PSSCH occupy different symbols in the N first symbols, by using the foregoing method, the determined third transmit power of the sidelink may be constant on the N first symbols, and the third transmit power is less than or equal to the maximum transmit power. In addition, the foregoing manner of determining the third transmit power is simple and convenient, so that efficiency of determining the third transmit power is relatively high.

In a possible implementation, the first channel and the second channel occupy different frequency domain resources.

The third transmit power is a sum of the first transmit power and the second transmit power.

In the foregoing process, through resource multiplexing, by using the foregoing method, the determined third transmit power of the sidelink may be constant on the N first symbols, and the third transmit power is less than or equal to the maximum transmit power. In addition, the foregoing manner of determining the third transmit power is simple and convenient, so that efficiency of determining the third transmit power is relatively high.

In a possible implementation, the N first time subunits include N1 third time subunits and N2 fourth time subunits, where a sum of N1 and N2 is N, N1 is a positive integer less than N, and N2 is a positive integer less than N.

The first channel occupies the N1 third time subunits, and the second channel occupies the N first time subunits.

Frequency domain resources of the first channel overlap some frequency domain resources of the second channel.

The second transmit power includes fourth transmit power and fifth transmit power, the fourth transmit power is transmit power of the second channel in the N1 third time subunits, and the fifth transmit power is transmit power of the second channel in the N2 fourth time subunits.

The third transmit power meets one of the following:

the third transmit power is the fifth transmit power or sixth transmit power, and the sixth transmit power is a sum of the first transmit power and the fourth transmit power;

the third transmit power is a largest value in the fifth transmit power and the sixth transmit power;

the third transmit power is a smallest value in the fifth transmit power and the sixth transmit power; or there is a second correspondence between the third transmit power and the first transmit power, fourth transmit power, and fifth transmit power.

In the foregoing process, through resource multiplexing, by using the foregoing method, the determined third transmit power of the sidelink may be constant on the N first symbols, and the third transmit power is less than or equal to the maximum transmit power. In addition, the foregoing manner of determining the third transmit power is simple and convenient, so that efficiency of determining the third transmit power is relatively high.

In a possible implementation, the processor 1501 is specifically configured to: determine, based on the first transmit power, the second transmit power, the uplink transmit power, and the maximum transmit power, seventh transmit power corresponding to the first transmit power and eighth transmit power corresponding to the second transmit power; and determine the actual transmit power of the sidelink based on the seventh transmit power and the eighth transmit power.

In the foregoing process, the seventh transmit power corresponding to the first transmit power and the eighth transmit power corresponding to the second transmit power are determined based on the first transmit power, the second transmit power, the uplink transmit power, and the maximum transmit power, so that a total sum of transmit power corresponding to each first symbol is less than or equal to the maximum transmit power; and then the actual transmit power is determined based on the seventh transmit power and the eighth transmit power, so that the actual transmit power is constant on the N first symbols. In this way, on a basis of ensuring that the sum of the actual transmit power of the sidelink and the actual transmit power of the uplink is less than or equal to the maximum transmit power, the actual transmit power of the sidelink may be constant on the N first symbols. Therefore, power switching does not need to be performed in the first slot, thereby reducing processing complexity for a terminal device; and/or a symbol required for power switching does not need to be reserved in the first slot, thereby reducing a resource waste and improving signal transmission performance. Because the actual transmit power of the sidelink is constant on the N first symbols, a change of a signal phase caused by power jumping is avoided, so that the second terminal device can accurately perform channel estimation based on a received pilot, and therefore can accurately receive the sidelink signal sent by the first terminal device on the N first symbols. This improves signal receiving performance of the second terminal device.

In a possible implementation, the first channel and the second channel occupy different time subunits in the N first time subunits.

The actual transmit power meets one of the following:

the actual transmit power is the seventh transmit power or the eighth transmit power;

the actual transmit power is a largest value in the seventh transmit power and the eighth transmit power;

the actual transmit power is a smallest value in the seventh transmit power and the eighth transmit power; or there is a third correspondence between the actual transmit power and the seventh transmit power and eighth transmit power.

In the foregoing process, when the PSCCH and the PSSCH occupy different symbols in the N first symbols, by using the foregoing method, the determined actual transmit power of the sidelink may be constant on the N first symbols. In addition, the foregoing manner of determining the actual transmit power of the sidelink is simple and convenient, so that efficiency of determining the actual transmit power of the sidelink is relatively high.

In a possible implementation, the first channel and the second channel occupy different frequency domain resources.

The actual transmit power is a sum of the seventh transmit power and the eighth transmit power.

In the foregoing process, through resource multiplexing, by using the foregoing method, the determined actual transmit power of the sidelink may be constant on the N first symbols. In addition, the foregoing manner of determining the actual transmit power of the sidelink is simple and convenient, so that efficiency of determining the actual transmit power of the sidelink is relatively high.

In a possible implementation, the N first time subunits include N3 fifth time subunits and N4 sixth time subunits, where a sum of N3 and N4 is N, N3 is a positive integer less than N, and N4 is a positive integer less than N.

The first channel occupies the N3 fifth time subunits, and the second channel occupies the N first time subunits.

Frequency domain resources of the first channel overlap some frequency domain resources of the second channel.

The eighth transmit power includes ninth transmit power and tenth transmit power, the ninth transmit power is transmit power of the second channel in the N3 fifth time subunits, and the tenth transmit power is transmit power of the second channel in the N4 sixth time subunits.

The actual transmit power meets one of the following:

the actual transmit power is the tenth transmit power or eleventh transmit power, and the eleventh transmit power is a sum of the seventh transmit power and the ninth transmit power;

the actual transmit power is a largest value in the tenth transmit power and the eleventh transmit power;

the actual transmit power is a smallest value in the tenth transmit power and the eleventh transmit power; or there is a fourth correspondence between the actual transmit power and the seventh transmit power, ninth transmit power, and tenth transmit power.

In the foregoing process, through resource multiplexing, by using the foregoing method, the determined actual transmit power of the sidelink may be constant on the N first symbols. In addition, the foregoing manner of determining the actual transmit power of the sidelink is simple and convenient, so that efficiency of determining the actual transmit power of the sidelink is relatively high.

In a second possible design, the apparatus 500 (for example, an integrated circuit, a wireless device, a circuit module, or a terminal device) may include the processor 501 and the transceiver 505.

Optionally, the apparatus 1500 may further implement the methods shown in the embodiments of FIG. 7, FIG. 13, and FIG. 14 in the embodiments of this application.

In a second possible design, one apparatus 1500 (for example, an integrated circuit, a wireless device, a circuit module, or a terminal device) may include a processor 1501 and a transceiver 1505.

The transceiver 1505 is configured to receive a sidelink signal from a first terminal device in a first time subunit in a first time unit, where actual transmit power of the sidelink signal is related to sidelink transmit power, uplink transmit power, and maximum transmit power, the sidelink transmit power is transmit power of a sidelink of the first terminal device in the first time unit, the uplink transmit power is transmit power of an uplink of the first terminal device in the first time unit, the first time unit includes N first time subunits, M second time subunits in the N first time subunits overlap uplink resources, N is an integer greater than 1, M is a positive integer less than or equal to N, and the actual transmit power of the sidelink signal is constant in the N first time subunits. The processor 1501 is configured to process the sidelink signal.

In the foregoing process, before the sidelink signal is transmitted on the N first symbols in the first slot, if the M second symbols in the N first symbols overlap the uplink resources, the first terminal device first obtains the transmit power of the sidelink in the first slot and the uplink transmit power of the uplink in the first slot, determines the actual transmit power of the sidelink in the first slot based on the sidelink transmit power, the uplink transmit power, and the maximum transmit power, and sends the sidelink signal to the second terminal device in the first time subunit in the first time unit based on the actual transmit power, so that the actual transmit power of the sidelink is constant on the N first symbols. Therefore, power switching does not need to be performed in the first slot, thereby reducing processing complexity for a terminal device; and/or a symbol required for power switching does not need to be reserved in the first slot, thereby reducing a resource waste and improving signal transmission performance. Because the actual transmit power of the sidelink is constant on the N first symbols, a change of a signal phase caused by power switching is avoided, so that the second terminal device can accurately perform channel estimation based on a received pilot, and therefore can accurately receive the sidelink signal sent by the first terminal device on the N first symbols. This improves signal receiving performance of the second terminal device.

In a possible implementation, the sidelink transmit power includes first transmit power and second transmit power, the first transmit power is transmit power of a first channel of the sidelink, and the second transmit power is transmit power of a second channel of the sidelink.

Optionally, the apparatus 1500 may further implement the method shown in the embodiment of FIG. 7 in the embodiments of this application.

The processor and the transceiver described in this application may be implemented in an integrated circuit (IC), an analog IC, a radio frequency integrated circuit (RFIC), a mixed-signal IC, an application-specific integrated circuit (ASIC), a printed circuit board (PCB), an electronic device, or the like. The processor and the transceiver may also be fabricated by using various IC process technologies, for example, a complementary metal oxide semiconductor (CMOS), an n-type metal oxide semiconductor (nMetal-oxide-semiconductor, NMOS), a p-type metal oxide semiconductor (positive channel metal oxide semiconductor, PMOS), a bipolar junction transistor (BJT), a bipolar CMOS (BiCMOS), silicon germanium (SiGe), and gallium arsenide (GaAs).

The apparatus described in the foregoing embodiments may be a network device or a terminal device. However, a range of the apparatus described in this application is not limited thereto, and a structure of the apparatus may not be limited to FIG. 15. The apparatus may be an independent device, or may be a part of a larger device. For example, the apparatus may be as follows:

(1) an independent integrated circuit IC, a chip, or a chip system or subsystem;

(2) a set of one or more ICs, where optionally, the IC set may also include a storage component configured to store data and/or instructions;

(3) an ASIC, for example, a modem (MSM, mobile station modem);

(4) a module that can be embedded in another device;

(5) a receiver, a terminal, an intelligent terminal, a cellular phone, a wireless device, a handheld device, a mobile unit, a vehicle-mounted device, a network device, a cloud device, an artificial intelligence device, or the like; or (6) another device or the like.

Figure 16:
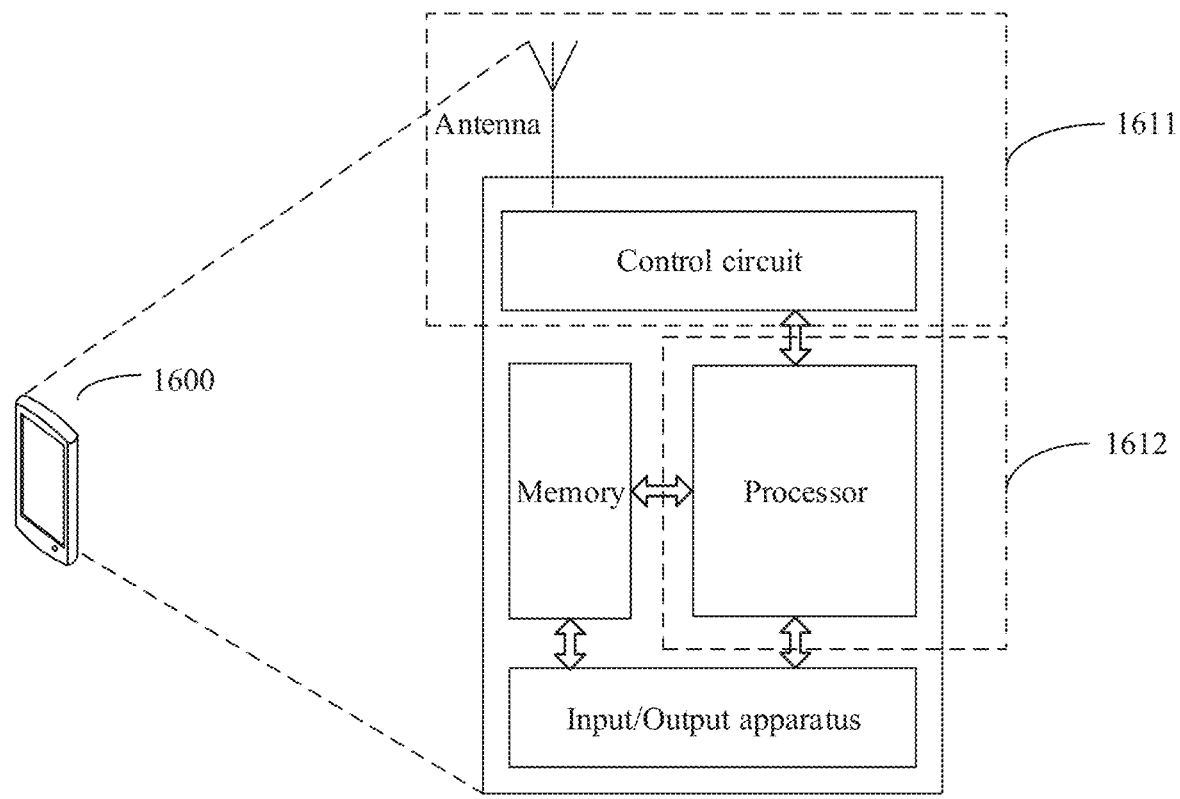
FIG. 16 is a schematic diagram of a structure of a terminal device according to this application.

FIG. 16 is a schematic diagram of a structure of a terminal device according to this application. The terminal device is applicable to the scenario shown in FIG. 1 or FIG. 2. For ease of description, FIG. 16 shows only main components of the terminal device. As shown in FIG. 16, the terminal device 1600 includes a processor, a memory, a control circuit, an antenna, and an input/output apparatus. The processor is mainly configured to: process a communication protocol and communication data, control the entire terminal, execute a software program, and process data of the software program. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in an electromagnetic wave form. The input/output apparatus, such as a touchscreen, a display, and a keyboard, is mainly configured to receive data input by a user and output data to the user.

After the terminal device is powered on, the processor may read the software program in a storage unit, parse and execute instructions of the software program, and process the data of the software program. When data needs to be sent wirelessly, the processor performs baseband processing on the to-be-sent data, and outputs a baseband signal to the radio N8 frequency circuit. The radio frequency circuit processes the baseband signal to obtain a radio frequency signal, and sends the radio frequency signal in an electromagnetic wave form by using the antenna. When data is sent to the terminal device, the radio frequency circuit receives a radio frequency signal by using the antenna, further converts the radio frequency signal into a baseband signal, and outputs the baseband signal to the processor. The processor converts the baseband signal into data, and processes the data.

For ease of description, FIG. 16 shows only one memory and one processor. In an actual terminal device, there may be a plurality of processors and a plurality of memories. The memory may also be referred to as a storage medium, a storage device, or the like. This is not limited in the embodiments of the present application.

In an optional implementation, the processor may include a baseband processor and a central processing unit. The baseband processor is mainly configured to process the communication protocol and the communication data. The central processing unit is mainly configured to: control the entire terminal device, execute the software program, and process the data of the software program. Functions of the baseband processor and the central processing unit are integrated into the processor in FIG. 16. A person skilled in the art may understand that the baseband processor and the central processing unit each may be an independent processor, and are interconnected by using technologies such as a bus. A person skilled in the art can understand that the terminal device may include a plurality of baseband processors to adapt to different network standards, the terminal device may include a plurality of central processing units to enhance a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of software program. The processor executes the software program to implement a baseband processing function.

In an example, the antenna and the control circuit that have a transceiver function may be considered as a transceiver unit 1611 of the terminal device 1600, and the processor that has a processing function may be considered as a processing unit 1612 of the terminal device 1600. As shown in FIG. 16, the terminal device 1600 includes the transceiver 1611 and the processing unit 1612. The transceiver unit may also be referred to as a transceiver, a transceiver device, a transceiver apparatus, or the like. Optionally, a device that is in the transceiver unit 1611 and that is configured to implement a receiving function may be considered as a receiving unit, and a device that is in the transceiver unit 1611 and that is configured to implement a sending function may be considered as a sending unit. That is, the transceiver unit 1611 includes the receiving unit and the sending unit. For example, the receiving unit may also be referred to as a receiving device, a receiver, a receiving circuit, or the like; and the sending unit may be referred to as a transmitting device, a transmitter, a transmitting circuit, or the like. Optionally, the receiving unit and the sending unit may be one integrated unit, or may be a plurality of independent units. The receiving unit and the sending unit may be in one geographical location, or may be distributed in a plurality of geographical locations.

Figure 17:
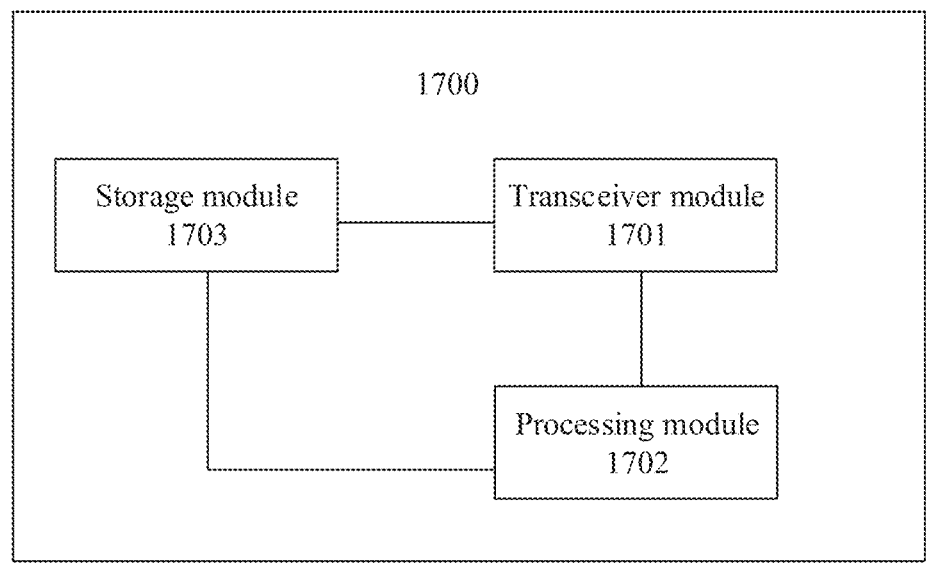
FIG. 17 is a schematic diagram of a structure of another apparatus according to an embodiment of this application.

FIG. 17 is a schematic diagram of a structure of another apparatus according to an embodiment of this application. As shown in FIG. 17, the apparatus 1700 may be a terminal, or may be a component of the terminal (for example, an integrated circuit or a chip). Alternatively, the apparatus may be a network device, or may be a component (for example, an integrated circuit or a chip) of the network device. Alternatively, the apparatus may be another communication module configured to implement the methods in the method embodiments of this application. The apparatus 1700 may include a processing module 1702 (a processing unit). Optionally, the apparatus 1700 may further include a transceiver module 1701 (a transceiver unit) and a storage module 1703 (a storage unit).

In a possible design, one or more modules in FIG. 17 may be implemented by one or more processors, implemented by one or more processors and memories, implemented by one or more processors and transceivers, or implemented by one or more processors, memories, and transceivers. This is not limited in the embodiments of this application. The processor, the memory, and the transceiver may be disposed separately, or may be integrated.

The apparatus has a function of implementing the terminal device described in the embodiments of this application. For example, the apparatus includes a corresponding module, unit, or means used for the terminal device to perform the steps related to the terminal device that are described in the embodiments of this application. The function, the unit, or the means may be implemented by software or hardware, or may be implemented by hardware executing corresponding software, or may be implemented by a combination of software and hardware. For details, refer to the corresponding descriptions in the foregoing corresponding method embodiments.

Alternatively, the apparatus has a function of implementing the network device described in the embodiments of this application. For example, the apparatus includes a corresponding module, unit, or means used for the network device to perform the steps related to the network device that are described in the embodiments of this application. The function, the unit, or the means may be implemented by software or hardware, or may be implemented by hardware executing corresponding software, or may be implemented by a combination of software and hardware. For details, refer to the corresponding descriptions in the foregoing corresponding method embodiments.

Optionally, the modules in the apparatus 1700 in this embodiment of this application may be configured to perform the method described in FIG. 7, FIG. 13, or FIG. 14 in the embodiments of this application.

In a possible implementation, one apparatus 1700 may include a processing module 1702.

The processing module 1702 is configured to: obtain sidelink transmit power and uplink transmit power, where the sidelink transmit power is transmit power of a sidelink in a first time unit, and the uplink transmit power is transmit power of an uplink in the first time unit; and determine actual transmit power of the sidelink in the first time unit based on the sidelink transmit power, the uplink transmit power, and maximum transmit power, where the first time unit includes N first time subunits, M second time subunits in the N first time subunits overlap uplink resources, N is an integer greater than 1, M is a positive integer less than or equal to N, the N first time subunits are time subunits used for sidelink transmission in the first time unit, and the actual transmit power of the sidelink is constant in the N first time subunits.

In the foregoing process, before the sidelink signal is transmitted on the N first symbols in the first slot, if the M second symbols in the N first symbols overlap the uplink resources, the transmit power of the sidelink in the first slot and the uplink transmit power of the uplink in the first slot are first obtained, and then the actual transmit power of the sidelink in the first slot is determined based on the sidelink transmit power, the uplink transmit power, and the maximum transmit power, so that the actual transmit power of the sidelink is constant on the N first symbols. Therefore, power switching does not need to be performed in the first slot, thereby reducing processing complexity for a terminal device; and/or a symbol required for power switching does not need to be reserved in the first slot, thereby reducing a resource waste and improving signal transmission performance. Because the actual transmit power of the sidelink is constant on the N first symbols, a change of a signal phase caused by power switching is avoided, so that a second terminal device can accurately perform channel estimation based on a received pilot, and therefore can accurately receive the sidelink signal sent by the first terminal device on the N first symbols. This improves signal receiving performance of the second terminal device.

In a possible implementation, the sidelink transmit power includes first transmit power and second transmit power, the first transmit power is transmit power of a first channel of the sidelink, and the second transmit power is transmit power of a second channel of the sidelink.

In a possible implementation, the processing module 1702 is specifically configured to: determine third transmit power of the sidelink in the first time unit based on the first transmit power and the second transmit power; and determine the actual transmit power based on the third transmit power, the uplink transmit power, and the maximum transmit power, where the third transmit power of the sidelink is constant in the N first time subunits.

In the foregoing process, the third transmit power is first determined based on the first transmit power and the second transmit power, so that the third transmit power is constant on the N first symbols; and then the actual transmit power of the sidelink is determined based on the third transmit power and the maximum transmit power, so that a sum of the actual transmit power of the sidelink and actual transmit power of the uplink is less than or equal to the maximum transmit power. In this way, on a basis of ensuring that the sum of the actual transmit power of the sidelink and the actual transmit power of the uplink is less than or equal to the maximum transmit power, the actual transmit power of the sidelink may be constant on the N first symbols. Therefore, power switching does not need to be performed in the first slot, thereby reducing complexity for a terminal device, and/or a symbol required for power switching does not need to be reserved in the first slot, thereby reducing a resource waste and improving signal transmission performance. Because the actual transmit power of the sidelink is constant on the N first symbols, a change of a signal phase caused by power jumping is avoided, so that the second terminal device can accurately perform channel estimation based on a received pilot, and therefore can accurately receive the sidelink signal sent by the first terminal device on the N first symbols. This improves signal receiving performance of the second terminal device.

In a possible implementation, the first channel and the second channel occupy different time subunits in the N first time subunits.

The third transmit power meets one of the following:

the third transmit power is the first transmit power or the second transmit power;

the third transmit power is a largest value in the first transmit power and the second transmit power;

the third transmit power is a smallest value in the first transmit power and the second transmit power; or there is a first correspondence between the third transmit power and the first transmit power and second transmit power.

In the foregoing process, when the PSCCH and the PSSCH occupy different symbols in the N first symbols, by using the foregoing method, the determined third transmit power of the sidelink may be constant on the N first symbols, and the third transmit power is less than or equal to the maximum transmit power. In addition, the foregoing manner of determining the third transmit power is simple and convenient, so that efficiency of determining the third transmit power is relatively high.

In a possible implementation, the first channel and the second channel occupy different frequency domain resources.

The third transmit power is a sum of the first transmit power and the second transmit power.

In the foregoing process, through resource multiplexing, by using the foregoing method, the determined third transmit power of the sidelink may be constant on the N first symbols, and the third transmit power is less than or equal to the maximum transmit power. In addition, the foregoing manner of determining the third transmit power is simple and convenient, so that efficiency of determining the third transmit power is relatively high.

In a possible implementation, the N first time subunits include N1 third time subunits and N2 fourth time subunits, where a sum of N1 and N2 is N, N1 is a positive integer less than N, and N2 is a positive integer less than N.

The first channel occupies the N1 third time subunits, and the second channel occupies the N first time subunits.

Frequency domain resources of the first channel overlap some frequency domain resources of the second channel.

The second transmit power includes fourth transmit power and fifth transmit power, the fourth transmit power is transmit power of the second channel in the N1 third time subunits, and the fifth transmit power is transmit power of the second channel in the N2 fourth time subunits.

The third transmit power meets one of the following:

the third transmit power is the fifth transmit power or sixth transmit power, and the sixth transmit power is a sum of the first transmit power and the fourth transmit power;

the third transmit power is a largest value in the fifth transmit power and the sixth transmit power;

the third transmit power is a smallest value in the fifth transmit power and the sixth transmit power; or there is a second correspondence between the third transmit power and the first transmit power, fourth transmit power, and fifth transmit power.

In the foregoing process, through resource multiplexing, by using the foregoing method, the determined third transmit power of the sidelink may be constant on the N first symbols, and the third transmit power is less than or equal to the maximum transmit power. In addition, the foregoing manner of determining the third transmit power is simple and convenient, so that efficiency of determining the third transmit power is relatively high.

In a possible implementation, the processing module 1702 is specifically configured to:

determine, based on the first transmit power, the second transmit power, the uplink transmit power, and the maximum transmit power, seventh transmit power corresponding to the first transmit power and eighth transmit power corresponding to the second transmit power; and determine the actual transmit power of the sidelink based on the seventh transmit power and the eighth transmit power.

In the foregoing process, the seventh transmit power corresponding to the first transmit power and the eighth transmit power corresponding to the second transmit power are determined based on the first transmit power, the second transmit power, the uplink transmit power, and the maximum transmit power, so that a total sum of transmit power corresponding to each first symbol is less than or equal to the maximum transmit power: and then the actual transmit power is determined based on the seventh transmit power and the eighth transmit power, so that the actual transmit power is constant on the N first symbols. In this way, on a basis of ensuring that the sum of the actual transmit power of the sidelink and the actual transmit power of the uplink is less than or equal to the maximum transmit power, the actual transmit power of the sidelink may be constant on the N first symbols. Therefore, power switching does not need to be performed in the first slot, thereby reducing processing complexity for a terminal device; and/or a symbol required for power switching does not need to be reserved in the first slot, thereby reducing a resource waste and improving signal transmission performance. Because the actual transmit power of the sidelink is constant on the N first symbols, a change of a signal phase caused by power jumping is avoided, so that the second terminal device can accurately perform channel estimation based on a received pilot, and therefore can accurately receive the sidelink signal sent by the first terminal device on the N first symbols. This improves signal receiving performance of the second terminal device.

In a possible implementation, the first channel and the second channel occupy different time subunits in the N first time subunits.

The actual transmit power meets one of the following:

the actual transmit power is the seventh transmit power or the eighth transmit power;

the actual transmit power is a largest value in the seventh transmit power and the eighth transmit power;

the actual transmit power is a smallest value in the seventh transmit power and the eighth transmit power; or there is a third correspondence between the actual transmit power and the seventh transmit power and eighth transmit power.

In the foregoing process, when the PSCCH and the PSSCH occupy different symbols in the N first symbols, by using the foregoing method, the determined actual transmit power of the sidelink may be constant on the N first symbols. In addition, the foregoing manner of determining the actual transmit power of the sidelink is simple and convenient, so that efficiency of determining the actual transmit power of the sidelink is relatively high.

In a possible implementation, the first channel and the second channel occupy different frequency domain resources.

The actual transmit power is a sum of the seventh transmit power and the eighth transmit power.

In the foregoing process, through resource multiplexing, by using the foregoing method, the determined actual transmit power of the sidelink may be constant on the N first symbols. In addition, the foregoing manner of determining the actual transmit power of the sidelink is simple and convenient, so that efficiency of determining the actual transmit power of the sidelink is relatively high.

In a possible implementation, the N first time subunits include N3 fifth time subunits and N4 sixth time subunits, where a sum of N3 and N4 is N, N3 is a positive integer less than N, and N4 is a positive integer less than N.

The first channel occupies the N3 fifth time subunits, and the second channel occupies the N first time subunits.

Frequency domain resources of the first channel overlap some frequency domain resources of the second channel.

The eighth transmit power includes ninth transmit power and tenth transmit power, the ninth transmit power is transmit power of the second channel in the N3 fifth time subunits, and the tenth transmit power is transmit power of the second channel in the N4 sixth time subunits.

The actual transmit power meets one of the following:

the actual transmit power is the tenth transmit power or eleventh transmit power, and the eleventh transmit power is a sum of the seventh transmit power and the ninth transmit power;

the actual transmit power is a largest value in the tenth transmit power and the eleventh transmit power;

the actual transmit power is a smallest value in the tenth transmit power and the eleventh transmit power; or there is a fourth correspondence between the actual transmit power and the seventh transmit power, ninth transmit power, and tenth transmit power.

In the foregoing process, through resource multiplexing, by using the foregoing method, the determined actual transmit power of the sidelink may be constant on the N first symbols. In addition, the foregoing manner of determining the actual transmit power of the sidelink is simple and convenient, so that efficiency of determining the actual transmit power of the sidelink is relatively high.

In a second possible design, the apparatus 500 (for example, an integrated circuit, a wireless device, a circuit module, or a terminal device) may include the processor 502 and the transceiver 505.

Optionally, the apparatus 1700 may further implement the methods shown in the embodiments of FIG. 7, FIG. 13, and FIG. 14 in the embodiments of this application.

In a second possible design, one apparatus 1500 (for example, an integrated circuit, a wireless device, a circuit module, or a terminal device) may include a processing module 1702 and a transceiver 1505.

The transceiver 1505 is configured to receive a sidelink signal from a first terminal device in a first time subunit in a first time unit, where actual transmit power of the sidelink signal is related to sidelink transmit power, uplink transmit power, and maximum transmit power, the sidelink transmit power is transmit power of a sidelink of the first terminal device in the first time unit, the uplink transmit power is transmit power of an uplink of the first terminal device in the first time unit, the first time unit includes N first time subunits, M second time subunits in the N first time subunits overlap uplink resources, N is an integer greater than 1, M is a positive integer less than or equal to N, and the actual transmit power of the sidelink signal is constant in the N first time subunits. The processing module 1702 is configured to process the sidelink signal.

In the foregoing process, before the sidelink signal is transmitted on the N first symbols in the first slot, if the M second symbols in the N first symbols overlap the uplink resources, the first terminal device first obtains the transmit power of the sidelink in the first slot and the uplink transmit power of the uplink in the first slot, determines the actual transmit power of the sidelink in the first slot based on the sidelink transmit power, the uplink transmit power, and the maximum transmit power, and sends the sidelink signal to the second terminal device in the first time subunit in the first time unit based on the actual transmit power, so that the actual transmit power of the sidelink is constant on the N first symbols. Therefore, power switching does not need to be performed in the first slot, thereby reducing processing complexity for a terminal device; and/or a symbol required for power switching does not need to be reserved in the first slot, thereby reducing a resource waste and improving signal transmission performance. Because the actual transmit power of the sidelink is constant on the N first symbols, a change of a signal phase caused by power switching is avoided, so that the second terminal device can accurately perform channel estimation based on a received pilot, and therefore can accurately receive the sidelink signal sent by the first terminal device on the N first symbols. This improves signal receiving performance of the second terminal device.

In a possible implementation, the sidelink transmit power includes first transmit power and second transmit power, the first transmit power is transmit power of a first channel of the sidelink, and the second transmit power is transmit power of a second channel of the sidelink.

Optionally, the apparatus 1700 may further implement the method shown in the embodiment of FIG. 7 in the embodiments of this application.

It may be understood that, in some scenarios, some optional features in the embodiments of this application may be independently implemented without depending on another feature, for example, a solution on which the optional features are currently based, to resolve a corresponding technical problem and achieve a corresponding effect. Alternatively, in some scenarios, the optional features are combined with another feature based on a requirement. Correspondingly, an apparatus provided in the embodiments of this application may also correspondingly implement these features or functions. Details are not described herein.

A person skilled in the art may further understand that various illustrative logical blocks and steps that are listed in the embodiments of this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of the embodiments of this application.

It should be understood that the processor in the embodiments of this application may be an integrated circuit chip, and has a signal processing capability. In an implementation process, the steps in the foregoing method embodiments may be completed by using a hardware integrated logic circuit in a processor or instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component.

The technologies described in this application may be implemented in various manners. For example, these technologies may be implemented by using hardware, software, or a combination of hardware and software. For hardware implementation, a processing unit configured to execute these technologies in a communication apparatus (for example, a base station, a terminal, a network entity, or a chip) may be implemented in one or more general-purpose processors, a DSP, a digital signal processor, an ASIC, a programmable logic device, an FPGA, another programmable logic apparatus, a discrete gate or a transistor logic, a discrete hardware component, or any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors with a digital signal processor core, or any other similar configuration.

It may be understood that the memory in the embodiments of this application may be a transitory memory or a non-transitory memory, or may include both a transitory memory and a non-transitory memory. The non-transitory memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The transitory memory may be a random access memory (RAM), and is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct Rambus random access memory (direct Rambus RAM, DR RAM). It should be noted that, the memory in the system and method described in this specification includes but is not limited to these memories and any memory of another proper type.

This application further provides a computer-readable medium. The computer-readable medium stores a computer program. When the computer program is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-dense digital video disc (DVD)), a semiconductor medium (for example, a solid-state drive (SSD)), or the like.

It should be understood that "an embodiment" mentioned in the whole specification means that particular features, structures, or characteristics related to the embodiment are included in at least one embodiment of this application. Therefore, the embodiments in the whole specification are not necessarily same embodiments. In addition, these particular features, structures, or characteristics may be combined in one or more embodiments by using any appropriate manner. It should be understood that sequence numbers of the foregoing processes do not mean execution sequences in the embodiments of this application. The execution sequences of the processes should be determined based on functions and internal logic of the processes, and should not be construed as any limitation to the implementation processes of the embodiments of this application.

It should be further understood that, in this application, "when" and "if" mean that UE or a base station performs corresponding processing in an objective situation, and are not intended to limit time, and the UE or the base station is not necessarily required to have a determining action during implementation, and do not mean any other limitation.

A person of ordinary skill in the art may understand that first, second, and various reference numerals in this application are merely distinguished for convenient description, and are not used to limit a scope of the embodiments of this application, and also indicate a sequence.

In this application, unless otherwise specified, an element represented in a singular form is intended to represent "one or more", but is not intended to represent "one and only one". In this application, unless otherwise specified, "at least one" is intended to represent "one or more", and "a plurality of" is intended to represent "two or more".

In addition, the terms "system" and "network" may be used interchangeably in this specification. The term "and/or" in this specification describes only an association relationship for describing associated objects and represents that three relationships may exist. For example, A and/or B may represent the following three cases: only A exists, both A and B exist, and only B exists. A may be singular or plural, and B may be singular or plural.

The character "/" usually represents an "or" relationship between the associated objects.

The term "at least one of . . . " in this specification indicates all or any combination of listed items. For example, "at least one of A, B, and C" may indicate the following six cases: A exists alone, B exists alone, C exists alone, A and B coexist, B and C coexist, and A, B, and C coexist. A may be singular or plural, B may be singular or plural, and C may be singular or plural.

It should be understood that in the embodiments of this application, "B corresponding to A" indicates that B is associated with A, and B may be determined based on A. However, it should further be understood that determining B based on A does not mean that B is determined based on only A; that is, B may alternatively be determined based on A and/or other information.

The correspondences shown in the tables in this application may be configured, or may be predefined. Values of the information in the tables are merely examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may also be other names that can be understood by a communication apparatus, and values or representation manners of the parameters may also be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may be used.

"Predefine" in this application may be understood as "define", "predefine", "store", "pre-store", "pre-negotiate", "pre-configure", "solidify", or "pre-burn".

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on a particular application and a design constraint of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed systems, apparatuses, and methods may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

Units described as separate parts may or may not be physically separate, and parts displayed as units may or may not be physical units, may be located in one position, or may be distributed on a plurality of network units. Some or all of the units may be selected based on an actual requirement to achieve the objectives of the solutions in the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium, for example, a USB flash drive, a removable hard disk, a read-only memory (ROM), a random access memory (RAM), a magnetic disk, or an optical disc, that can store program code.

For same or similar parts in the embodiments of this application, refer to each other. In the embodiments of this application and the implementations/implementation methods in the embodiments, unless otherwise specified or a logical conflict occurs, terms and/or descriptions are consistent and may be mutually referenced between different embodiments and between the implementations/implementation methods in the embodiments. Technical features in the different embodiments and the implementations/implementation methods in the embodiments may be combined to form a new embodiment, implementation, or implementation method according to an internal logical relationship thereof. The foregoing implementations of this application are not intended to limit the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus comprising at least one processor, and one or more memories coupled to the at least one processor and storing programming instructions for execution by the at least one processor that cause the apparatus to:
   obtain sidelink transmit power and uplink transmit power, wherein the sidelink transmit power is transmit power of a sidelink in a first time unit, and the uplink transmit power is transmit power of an uplink in the first time unit; and
   determine actual transmit power of the sidelink in the first time unit based on the sidelink transmit power, the uplink transmit power, and maximum transmit power, wherein
   the first time unit comprises N first time subunits, M second time subunits in the N first time subunits overlap uplink resources, N is an integer greater than 1, M is a positive integer less than or equal to N, the N first time subunits are time subunits used for sidelink transmission in the first time unit, and the actual transmit power of the sidelink is constant in the N first time subunits.

2. The apparatus according to claim 1, wherein the sidelink transmit power comprises first transmit power and second transmit power, the first transmit power is transmit power of a first channel of the sidelink, and the second transmit power is transmit power of a second channel of the sidelink.

3. The apparatus according to claim 2, wherein determining the actual transmit power of the sidelink in the first time unit based on the sidelink transmit power, the uplink transmit power, and maximum transmit power comprises:
   determine third transmit power of the sidelink in the first time unit based on the first transmit power and the second transmit power; and
   determine the actual transmit power based on the third transmit power, the uplink transmit power, and the maximum transmit power, wherein the third transmit power of the sidelink is constant in the N first time subunits.

4. The apparatus according to claim 3, wherein the first channel of the sidelink and the second channel of the sidelink occupy different time subunits in the N first time subunits; and
   the third transmit power meets one of the following:
     the third transmit power is the first transmit power or the second transmit power;
     the third transmit power is a largest value in the first transmit power and the second transmit power;
     the third transmit power is a smallest value in the first transmit power and the second transmit power; or
     there is a first correspondence between the third transmit power and the first transmit power and the second transmit power.

5. The apparatus according to claim 3, wherein the first channel of the sidelink and the second channel of the sidelink occupy different frequency domain resources; and
   the third transmit power is a sum of the first transmit power and the second transmit power.

6. The apparatus according to claim 3, wherein:
   the N first time subunits comprise N1 third time subunits and N2 fourth time subunits, wherein a sum of N1 and N2 is N, N1 is a positive integer less than N, and N2 is a positive integer less than N;
   the first channel of the sidelink occupies the N1 third time subunits, and the second channel of the sidelink occupies the N first time subunits;
   frequency domain resources of the first channel of the sidelink overlap some frequency domain resources of the second channel of the sidelink;
   the second transmit power comprises fourth transmit power and fifth transmit power, the fourth transmit power is transmit power of the second channel of the sidelink in the N1 third time subunits, and the fifth transmit power is transmit power of the second channel of the sidelink in the N2 fourth time subunits; and
   the third transmit power meets one of the following:
     the third transmit power is the fifth transmit power or sixth transmit power, and the sixth transmit power is a sum of the first transmit power and the fourth transmit power;
     the third transmit power is a largest value in the fifth transmit power and the sixth transmit power;
     the third transmit power is a smallest value in the fifth transmit power and the sixth transmit power; or
     there is a second correspondence between the third transmit power and the first transmit power, the fourth transmit power, and the fifth transmit power.

7. The apparatus according to claim 2, wherein determining the actual transmit power of the sidelink in the first time unit based on the sidelink transmit power, the uplink transmit power, and maximum transmit power comprises:
   determine, based on the first transmit power, the second transmit power, the uplink transmit power, and the maximum transmit power, seventh transmit power corresponding to the first transmit power and eighth transmit power corresponding to the second transmit power; and
   determine the actual transmit power of the sidelink based on the seventh transmit power and the eighth transmit power.

8. The apparatus according to claim 7, wherein the first channel of the sidelink and the second channel of the sidelink occupy different time subunits in the N first time subunits; and
   the actual transmit power meets one of the following:
     the actual transmit power is the seventh transmit power or the eighth transmit power;
     the actual transmit power is a largest value in the seventh transmit power and the eighth transmit power;
     the actual transmit power is a smallest value in the seventh transmit power and the eighth transmit power; or there is a third correspondence between the actual transmit power and the seventh transmit power and the eighth transmit power.

9. The apparatus according to claim 7, wherein the first channel of the sidelink and the second channel of the sidelink occupy different frequency domain resources; and
the actual transmit power is a sum of the seventh transmit power and the eighth transmit power.

10. The apparatus according to claim 7, wherein:
the N first time subunits comprise N3 fifth time subunits and N4 sixth time subunits, wherein a sum of N3 and N4 is N, N3 is a positive integer less than N, and N4 is a positive integer less than N;
the first channel of the sidelink occupies the N3 fifth time subunits, and the second channel of the sidelink occupies the N first time subunits;
frequency domain resources of the first channel of the sidelink overlap some frequency domain resources of the second channel of the sidelink;
the eighth transmit power comprises ninth transmit power and tenth transmit power, the ninth transmit power is transmit power of the second channel of the sidelink in the N3 fifth time subunits, and the tenth transmit power is transmit power of the second channel of the sidelink in the N4 sixth time subunits; and
the actual transmit power meets one of the following:
the actual transmit power is the tenth transmit power or eleventh transmit power, and the eleventh transmit power is a sum of the seventh transmit power and the ninth transmit power;
the actual transmit power is a largest value in the tenth transmit power and the eleventh transmit power;
the actual transmit power is a smallest value in the tenth transmit power and the eleventh transmit power; or
there is a fourth correspondence between the actual transmit power and the seventh transmit power, the ninth transmit power, and the tenth transmit power.

11. A communication method, comprising:
obtaining sidelink transmit power and uplink transmit power, wherein the sidelink transmit power is transmit power of a sidelink in a first time unit, and the uplink transmit power is transmit power of an uplink in the first time unit; and
determining actual transmit power of the sidelink in the first time unit based on the sidelink transmit power, the uplink transmit power, and maximum transmit power, wherein
the first time unit comprises N first time subunits, M second time subunits in the N first time subunits overlap uplink resources, N is an integer greater than 1, M is a positive integer less than or equal to N, the N first time subunits are time subunits used for sidelink transmission in the first time unit, and the actual transmit power of the sidelink is constant in the N first time subunits.

12. The method according to claim 11, wherein the sidelink transmit power comprises first transmit power and second transmit power, the first transmit power is transmit power of a first channel of the sidelink, and the second transmit power is transmit power of a second channel of the sidelink.

13. The method according to claim 12, wherein the determining actual transmit power of the sidelink in the first time unit based on the sidelink transmit power, the uplink transmit power, and maximum transmit power comprises:

determining third transmit power of the sidelink in the first time unit based on the first transmit power and the second transmit power; and
determining the actual transmit power based on the third transmit power, the uplink transmit power, and the maximum transmit power, wherein
the third transmit power of the sidelink is constant in the N first time subunits.

14. The method according to claim 13, wherein the first channel of the sidelink and the second channel of the sidelink occupy different time subunits in the N first time subunits; and
the third transmit power meets one of the following:
the third transmit power is the first transmit power or the second transmit power;
the third transmit power is a largest value in the first transmit power and the second transmit power;
the third transmit power is a smallest value in the first transmit power and the second transmit power; or
there is a first correspondence between the third transmit power and the first transmit power and the second transmit power.

15. The method according to claim 12, wherein the determining actual transmit power of the sidelink in the first time unit based on the sidelink transmit power, the uplink transmit power, and maximum transmit power comprises:
determining, based on the first transmit power, the second transmit power, the uplink transmit power, and the maximum transmit power, fourth transmit power corresponding to the first transmit power and fifth transmit power corresponding to the second transmit power; and
determining the actual transmit power of the sidelink based on the fourth transmit power and the fifth transmit power.

16. A non-transitory computer readable medium storing one or more instructions that, when executed by one or more processors of a first node, cause the first node to:
obtain sidelink transmit power and uplink transmit power, wherein the sidelink transmit power is transmit power of a sidelink in a first time unit, and the uplink transmit power is transmit power of an uplink in the first time unit; and
determine actual transmit power of the sidelink in the first time unit based on the sidelink transmit power, the uplink transmit power, and maximum transmit power, wherein
the first time unit comprises N first time subunits, M second time subunits in the N first time subunits overlap uplink resources, N is an integer greater than 1, M is a positive integer less than or equal to N, the N first time subunits are time subunits used for sidelink transmission in the first time unit, and the actual transmit power of the sidelink is constant in the N first time subunits.

17. The non-transitory computer readable medium according to claim 16, wherein the sidelink transmit power comprises first transmit power and second transmit power, the first transmit power is transmit power of a first channel of the sidelink, and the second transmit power is transmit power of a second channel of the sidelink.

18. The non-transitory computer readable medium according to claim 17, wherein determining the actual transmit power of the sidelink in the first time unit based on the sidelink transmit power, the uplink transmit power, and maximum transmit power comprises:

determine third transmit power of the sidelink in the first time unit based on the first transmit power and the second transmit power; and determine the actual transmit power based on the third transmit power, the uplink transmit power, and the maximum transmit power, wherein the third transmit power of the sidelink is constant in the N first time subunits.

19. The non-transitory computer readable medium according to claim 18, wherein the first channel and the second channel occupy different time subunits in the N first time subunits; and the third transmit power meets one of the following:
  the third transmit power is the first transmit power or the second transmit power;
  the third transmit power is a largest value in the first transmit power and the second transmit power;
  the third transmit power is a smallest value in the first transmit power and the second transmit power; or
  there is a first correspondence between the third transmit power and the first transmit power and the second transmit power.

20. The non-transitory computer readable medium according to claim 17, wherein determining the actual transmit power of the sidelink in the first time unit based on the sidelink transmit power, the uplink transmit power, and maximum transmit power comprises:

determine, based on the first transmit power, the second transmit power, the uplink transmit power, and the maximum transmit power, fourth transmit power corresponding to the first transmit power and fifth transmit power corresponding to the second transmit power; and determine the actual transmit power of the sidelink based on the fourth transmit power and the fifth transmit power.

* * * * *